(12) United States Patent
Xue et al.

(10) Patent No.: US 12,356,399 B2
(45) Date of Patent: Jul. 8, 2025

(54) SCHEDULING SWITCHING METHOD AND APPARATUS

(71) Applicant: Huawei Technologies Co., Ltd., Shenzhen (CN)

(72) Inventors: Yifan Xue, Beijing (CN); Jian Wang, Beijing (CN); Wenwen Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 828 days.

(21) Appl. No.: 17/607,682

(22) PCT Filed: Apr. 24, 2020

(86) PCT No.: PCT/CN2020/086528
§ 371 (c)(1),
(2) Date: Oct. 29, 2021

(87) PCT Pub. No.: WO2020/221111
PCT Pub. Date: Nov. 5, 2020

(65) Prior Publication Data
US 2022/0232599 A1    Jul. 21, 2022

(30) Foreign Application Priority Data

Apr. 30, 2019  (CN) .................... 201910364535.X
Jun. 10, 2019  (CN) .................... 201910498052.9

(51) Int. Cl.
*H04W 72/1273*    (2023.01)
*H04L 27/26*      (2006.01)
(Continued)

(52) U.S. Cl.
CPC ... *H04W 72/1273* (2013.01); *H04L 27/26025* (2021.01); *H04W 72/0446* (2013.01); *H04W 72/542* (2023.01)

(58) Field of Classification Search
None
See application file for complete search history.

(56) References Cited

U.S. PATENT DOCUMENTS

2006/0034224 A1   2/2006  Nakamata et al.
2012/0052899 A1*  3/2012  Wang ................. H04W 52/226
                                                 455/513
(Continued)

FOREIGN PATENT DOCUMENTS

CN    101860948 A    10/2010
CN    109451792 A     3/2019
(Continued)

OTHER PUBLICATIONS

Sharetechnote, 5G/NR—PDSCH <https://web.archive.org/web/20190416083519/https://www.sharetechnote.com/html/5G/5G_PDSCH.html#Mapping_to_VRB>.*
(Continued)

*Primary Examiner* — Andrew C Oh
(74) *Attorney, Agent, or Firm* — Conley Rose, P.C.

(57) ABSTRACT

A scheduling switching method includes receiving, by a terminal, a switching indication from a network device, where the switching indication indicates the terminal to switch from a first scheduling mode to a second scheduling mode. The method further includes determining an application time of the second scheduling mode such that the terminal schedules a data channel or triggers a reference signal using the second scheduling mode when the application time arrives.

14 Claims, 18 Drawing Sheets

(51) Int. Cl.
*H04W 72/0446* (2023.01)
*H04W 72/542* (2023.01)

(56) References Cited

U.S. PATENT DOCUMENTS

| | | | | |
|---|---|---|---|---|
| 2012/0250638 | A1* | 10/2012 | Wang | H04W 72/542 |
| | | | | 370/329 |
| 2013/0201825 | A1 | 8/2013 | Masputra et al. | |
| 2015/0365790 | A1 | 12/2015 | Edge et al. | |
| 2016/0255582 | A1 | 9/2016 | Wang et al. | |
| 2017/0078115 | A1 | 3/2017 | Zhou | |
| 2017/0237546 | A1 | 8/2017 | Yang et al. | |
| 2018/0343653 | A1* | 11/2018 | Guo | H04L 5/0053 |
| 2019/0090299 | A1* | 3/2019 | Ang | H04W 52/0229 |
| 2019/0104543 | A1 | 4/2019 | Park | |
| 2019/0320422 | A1* | 10/2019 | Al-Imari | H04W 72/23 |
| 2020/0068610 | A1 | 2/2020 | Li et al. | |
| 2020/0120683 | A1* | 4/2020 | Kakishima | H04L 5/0051 |
| 2020/0178144 | A1 | 6/2020 | Zhou et al. | |
| 2020/0295882 | A1 | 9/2020 | Wang et al. | |
| 2021/0044403 | A1* | 2/2021 | Zhang | H04L 5/0035 |
| 2021/0099978 | A1 | 4/2021 | Tang | |
| 2021/0235481 | A1* | 7/2021 | Takeda | H04L 5/0053 |
| 2022/0232599 | A1 | 7/2022 | Xue et al. | |

FOREIGN PATENT DOCUMENTS

| | | | | |
|---|---|---|---|---|
| CN | 109586877 | A | | 4/2019 |
| CN | 109600845 | A | | 4/2019 |
| CN | 111193576 | A * | 5/2020 | ........... H04L 1/1607 |
| CN | 111757431 | A * | 10/2020 | ........ H04W 52/0212 |
| CN | 111757434 | A * | 10/2020 | ......... H04L 27/2602 |
| CN | 111757473 | A * | 10/2020 | ....... H04L 27/26025 |
| CN | 111837430 | A * | 10/2020 | |
| CN | 112385283 | A * | 2/2021 | ........... H04L 5/0044 |
| CN | 113661752 | A * | 11/2021 | ........... H04L 5/0044 |
| CN | 111431682 | B * | 2/2022 | ........... H04L 5/0044 |
| CN | 111435890 | B * | 3/2023 | ........... H04L 5/0044 |
| CN | 111770572 | B * | 8/2023 | ........... H04L 1/1607 |
| JP | 2004350195 | A * | 12/2004 | |
| JP | 7201843 | B2 | 1/2023 | |
| JP | 7240493 | B2 * | 3/2023 | ........ H04W 52/0216 |
| KR | 20070044056 | A | | 4/2007 |
| KR | 20140116466 | A | | 10/2014 |
| KR | 20170007375 | A | | 1/2017 |
| RU | 2658340 | C1 | | 6/2018 |
| WO | WO-2012155638 | A1 * | 11/2012 | ........... H04L 1/1812 |
| WO | 2013119092 | A1 | | 8/2013 |
| WO | WO-2015143170 | A1 * | 9/2015 | .......... H04W 52/383 |
| WO | WO-2018059277 | A1 * | 4/2018 | |
| WO | 2019028776 | A1 | | 2/2019 |
| WO | 2019050379 | A1 | | 3/2019 |
| WO | WO-2019223436 | A1 * | 11/2019 | |
| WO | WO-2020087292 | A1 * | 5/2020 | |
| WO | WO-2020192765 | A1 * | 10/2020 | ....... H04L 27/26025 |

OTHER PUBLICATIONS

EGPP TS 25.331 V15.4.0, Sep. 2018, "3rd Generation Partnership Project; Technical Specification Group Radio Access Network; Radio Resource Control (RRC); Protocol specification (Release 15)," 2316 pages.

3GPP TS 36.331 V15.5.1, Apr. 2019, "3rd Generation Partnership Project; Technical Specification Group Radio Access Network; Evolved Universal Terrestrial Radio Access (E-UTRA); Radio Resource Control (RRC); Protocol specification (Release 15)," 948 pages.

3GPP TS 38.212 V15.5.0, Mar. 2019, "3rd Generation Partnership Project; Technical Specification Group Radio Access Network; NR; Multiplexing and channel coding (Release 15)," 101 pages.

3GPP TS 38.214 V15.5.0, Mar. 2019, "3rd Generation Partnership Project; Technical Specification Group Radio Access Network; NR; Physical layer procedures for data (Release 15)," 103 pages.

R1-1713266, Guangdong OPPO Mobile Telecom, "Remaining issues on bandwidth part configuration and activation," 3GPP TSG RAN WG1 Meeting #90, Prague, Czech Republic, Aug. 21-25, 2017, 6 pages.

R1-1802844, Qualcomm Incorporated, "Remaining Issues on BWP," 3GPP TSG RAN WG1 Meeting #92, Athens, Greece, Feb. 26-Mar. 2, 2018, 24 pages.

R1-1813447, Qualcomm Incorporated, "UE Adaptation to the Traffic and UE Power Consumption Characteristics," 3GPP TSG-RAN WG1 Meeting #95, Nov. 12-16, 2018, Spokane, Washington, USA, 20 pages.

R1-1905032, Qualcomm Incorporated, "Cross-slot scheduling power saving techniques," 3GPP TSG-RAN WG1 #96, Xi'an, China, Apr. 8-12, 2019, 12 pages.

R1-1906006, Huawei et al., "Procedure of cross-slot scheduling for UE power saving," 3GPP TSG RAN WG1 #97, Reno, USA, May 13-17, 2019, 12 pages.

R1-1907346, Apple Inc., "Cross Slot Scheduling for UE Power Saving," 3GPP TSG RAN WG1 #97, Reno, USA, May 13-17, 2019, 10 pages.

R1-1908070, Huawei et al., "Procedure of cross-slot scheduling for UE power saving," 3GPP TSG RAN WG1 Meeting #98, Prague, Czech Republic, Aug. 26-30, 2019, 12 pages.

R1-1903987, Huawei et al., "Procedure of cross-slot scheduling for UE power saving," 3GPP TSG RAN WGI #96bis, Xi'an, China, Apr. 8-12, 2019, 4 pages, XP051707078.

MediaTek Inc., Enabling Cross-Slot Scheduling for NR, 3GPP TSG RAN WG1 Meeting #96b-Bis, Xi'an, China, Apr. 8-12, 2019, R1-1904488, 10 pages.

Ericsson, "Procedure for cross-slot scheduling technique," R1-1905467, 3GPP TSG-RAN WG1 Meeting #96bis, Xi'an, China, Apr. 8-12, 2019, 6 pages.

* cited by examiner

SCHEDULING SWITCHING METHOD AND APPARATUS

CROSS-REFERENCE TO RELATED APPLICATIONS

This is a U.S. National Stage of International Patent Application No. PCT/CN2020/086528 filed on Apr. 24, 2020, which claims priority to Chinese Patent Application No. 201910364535.X filed on Apr. 30, 2019, and claims priority to Chinese Patent Application No. 201910498052.9 filed on Jun. 10, 2019. All of the aforementioned patent applications are hereby incorporated by reference in their entireties.

TECHNICAL FIELD

Embodiments of this application relate to the field of communications technologies, and in particular, to a scheduling switching method and an apparatus.

BACKGROUND

In Rel-15 stipulated by the 3rd generation partnership project (3rd generation partnership project, 3GPP), to schedule a data channel of a terminal, a base station first sends scheduling information, and schedules the data channel of the terminal by using the scheduling information (for example, schedules a physical downlink control channel (physical downlink shared channel, PDSCH) of the terminal by using scheduling information of the PDSCH that is sent through a physical downlink control channel (physical downlink control channel, PDCCH), or schedules a physical downlink control channel (physical downlink shared channel, PUSCH) of the terminal by using scheduling information of the PUSCH that is sent through the PDCCH). The scheduling information may indicate a transmission parameter of the data channel, for example, a time domain resource location of the data channel. The terminal may receive the data channel at the time domain resource location of the data channel based on an indication of the scheduling information.

The foregoing scheduling process may involve the following two scheduling modes based on a time domain location relationship of the data channel and the PDCCH: same-slot scheduling (single slot scheduling), where the PDCCH and the data channel are located in a same slot; and cross-slot scheduling (cross-slot scheduling), where the data channel and the PDCCH are located in different slots. For example, the terminal may receive the data channel in a next slot of a slot occupied by the PDCCH.

To reduce power consumption of the terminal and ensure good user experience, the 3rd generation partnership project (3rd generation partnership project, 3GPP) initiates a project for reducing the power consumption of the terminal in Rel-16, and discusses how to reduce the power consumption of the terminal through dynamic switching of a scheduling mode. For example, in same-slot scheduling, the terminal needs to enable a radio frequency module of the terminal in real time, to ensure smooth transmission of the data channel. In cross-slot scheduling, before transmitting data on the data channel, the terminal may disable the radio frequency module of the terminal, to reduce the power consumption of the terminal and save power for the terminal. However, how to specifically indicate the scheduling mode of the terminal and application time of the scheduling mode has not been discussed.

SUMMARY

Embodiments of this application provide a scheduling switching method and an apparatus, to indicate to switch a scheduling mode of a terminal and clarify application time of a scheduling mode.

To achieve the foregoing objective, the following technical solutions are used in the embodiments of this application.

According to a first aspect, an embodiment of this application provides a scheduling switching method. A terminal receives switching indication that is sent by a network device and that is used to indicate the terminal to switch from a first scheduling mode to a second scheduling mode, and determines application time of the second scheduling mode, so that the terminal schedules a data channel and/or triggers time of a reference signal by using the second scheduling mode when the application time of the second scheduling mode arrives.

The switching indication may include one or more values of a minimum value of K0, a minimum value of K2, a minimum value of an aperiodic CSI-RS triggering offset, and a minimum value of an aperiodic SRS triggering offset. Alternatively, the switching indication may include one or more indexes. The index may be used to indicate a minimum value of K0, a minimum value of K2, a minimum value of an aperiodic CSI-RS triggering offset, or a minimum value of an aperiodic SRS triggering offset. K0 is a slot offset between a slot in which a PDCCH is located and a slot in which a PDSCH scheduled by using the PDCCH is located. K2 is a slot offset between a slot in which a PDCCH is located and a slot in which a PUSCH scheduled by using the PDCCH is located. The aperiodic CSI-RS triggering offset is a slot offset between a slot in which a PDCCH is located and a slot in which an aperiodic CSI-RS triggered by using the PDCCH is located. The aperiodic SRS triggering offset is a slot offset between a slot in which a PDCCH is located and a slot in which an aperiodic SRS triggered by using the PDCCH is located.

The first scheduling mode is different from the second scheduling mode. The first scheduling mode is same-slot scheduling, and the second scheduling mode is cross-slot scheduling. The first scheduling mode is cross-slot scheduling, and the second scheduling mode is same-slot scheduling. Alternatively, both the first scheduling mode and the second scheduling mode are cross-slot scheduling, but a slot offset, in the first scheduling mode, between a slot occupied by a PDCCH and a slot occupied by a data channel scheduled by using the PDCCH is different from a slot offset, in the first scheduling mode, between a slot occupied by a PDCCH and a slot occupied by a data channel scheduled by using the PDCCH. In same-slot scheduling, to ensure transmission reliability of a data channel and/or a reference signal, the terminal needs to always enable a radio frequency module of the terminal to buffer the data channel and/or the reference signaling. However, in cross-slot scheduling, the terminal may temporarily disable the radio frequency module of the terminal to save energy.

In the method according to the first aspect, the terminal may receive the switching indication that is sent by the network device and that is used to indicate to switch a scheduling mode of the terminal, and determine the application time of a switched scheduling mode after receiving the switching indication, so that the terminal schedules the data channel and/or triggers the reference signal by using the scheduling mode when the application time of the switched scheduling mode arrives. Particularly, when the switched scheduling mode is cross-slot scheduling, the terminal disables the radio frequency module of the terminal to enter a power saving state.

With reference to the first aspect, in a first possible design of the first aspect, the switching indication is included in a PDCCH, and the application time of the second scheduling mode is: a next symbol of a last symbol occupied by feedback information of the PDCCH; a next slot of a slot occupied by feedback information of the PDCCH; or a first scheduling information monitoring occasion after a time domain location occupied by feedback information of the PDCCH. The feedback information of the PDCCH is used to indicate whether the terminal correctly receives the PDCCH. A scheduling information monitoring occasion is an occasion on which the terminal monitors a PDCCH used to schedule a data channel.

The next symbol of the last symbol occupied by the feedback information of the PDCCH may be a symbol adjacent to the last symbol occupied by the feedback information of the PDCCH, or may be any symbol after the last symbol occupied by the feedback information of the PDCCH. This is not limited in this application.

The next slot of the slot occupied by the feedback information of the PDCCH may be a slot after the slot occupied by the feedback information of the PDCCH and adjacent to the slot occupied by the feedback information of the PDCCH, or may be any slot after the slot occupied by the feedback information of the PDCCH.

The first scheduling information monitoring occasion after the time domain location occupied by the feedback information of the PDCCH may be a scheduling information monitoring occasion that appears for the first time after the time domain location occupied by the feedback information of the PDCCH, or may be any other scheduling information monitoring occasion after the time domain location occupied by the feedback information of the PDCCH.

Based on this possible design, the second scheduling mode may take effect after the feedback information of the PDCCH is sent, to ensure reliability or accuracy of receiving, by the terminal, the PDCCH including the switching indication.

With reference to the first aspect, in a second possible design of the first aspect, the switching indication is included in a PDCCH, the PDCCH is used to schedule a downlink data channel of the terminal, and the application time of the second scheduling mode is: a next symbol of a last symbol occupied by feedback information of the downlink data channel; a next slot of a slot occupied by feedback information of the downlink data channel; or a first scheduling information monitoring occasion after a time domain location occupied by feedback information of the downlink data channel. The feedback information of the data channel is used to indicate whether the terminal receives the data channel. A scheduling information monitoring occasion is an occasion on which the terminal monitors a PDCCH used to schedule a data channel.

The next symbol of the last symbol occupied by the feedback information of the downlink data channel may be a symbol adjacent to the last symbol occupied by the feedback information of the downlink data channel, or may be any symbol after the last symbol occupied by the feedback information of the downlink data channel.

The next slot of the slot occupied by the feedback information of the downlink data channel may be a slot after the slot occupied by the feedback information of the downlink data channel and adjacent to the slot occupied by the feedback information of the downlink data channel, or may be any slot after the slot occupied by the feedback information of the downlink data channel.

The first scheduling information monitoring occasion after the time domain location occupied by the feedback information of the downlink data channel may be a scheduling information monitoring occasion that appears for the first time after the time domain location occupied by the feedback information of the downlink data channel, or may be any other scheduling information monitoring occasion after the time domain location occupied by the feedback information of the downlink data channel. For example, the first scheduling information monitoring occasion after the time domain location occupied by the feedback information of the downlink data channel may be an $N^{th}$ scheduling information monitoring occasion after the time domain location occupied by the feedback information of the downlink data channel.

Based on this possible design, the second scheduling mode may take effect only after the feedback information of the downlink data channel scheduled by using the PDCCH including the switching indication is transmitted, to ensure reliability or accuracy of receiving, by the terminal, the downlink data channel scheduled by using the PDCCH including the switching indication.

In a third possible design of the first aspect, the switching indication is included in a PDCCH, the PDCCH is used to schedule an uplink data channel of the terminal, and the application time of the second scheduling mode is: a next symbol of a last symbol occupied by the uplink data channel, a next slot of a slot occupied by the uplink data channel; or a first scheduling information monitoring occasion after a time domain location occupied by the uplink data channel. A scheduling information monitoring occasion is an occasion on which the terminal monitors a PDCCH used to schedule a data channel.

The next symbol of the last symbol occupied by the uplink data channel may be a symbol adjacent to the last symbol occupied by the uplink data channel, or any symbol after the last symbol occupied by the uplink data channel.

The next slot of the slot occupied by the uplink data channel may be a slot after the slot occupied by the uplink data channel and adjacent to the slot occupied by the uplink data channel, or any slot after the slot occupied by the uplink data channel.

The first scheduling information monitoring occasion after the time domain location occupied by the uplink data channel may be a scheduling information monitoring occasion that appears for the first time after the time domain location occupied by the uplink data channel, or may be any other scheduling information monitoring occasion after the time domain location occupied by the uplink data channel.

Based on this possible design, the second scheduling mode may take effect after the uplink data channel scheduled by using the PDCCH including the switching indication is transmitted, to ensure reliability or accuracy of smoothly sending, by the terminal, the uplink data channel scheduled by using the PDCCH including the switching indication.

With reference to the first aspect, in a fourth possible design of the first aspect, the switching indication is included in a PDCCH, the PDCCH is located in an $N^{th}$ slot, N is an integer, and the application time of the second scheduling mode is: an $(N+M)^{th}$ slot, or a first scheduling information monitoring occasion not earlier than an $(N+M)^{th}$ slot. M is determined based on an applicable minimum value of a slot offset when the terminal receives the switching indication. The slot offset is a slot offset between a slot occupied by a PDCCH used to schedule a data channel and a slot occupied by a data channel scheduled by using the PDCCH used to schedule a data channel.

M is equal to the minimum value, M is equal to a sum of the minimum value and a first value; or M is a maximum value between a second value and the minimum value.

Based on this possible design, the application time of the second scheduling mode may be determined based on the slot occupied by the PDCCH including the switching indication and a capability of processing the PDCCH by the terminal, to ensure, as much as possible, that the second scheduling mode takes effect after the terminal parses the PDCCH including the switching indication.

With reference to the fourth possible design of the first aspect, in a fifth possible design of the first aspect, the switching indication is included in a MAC CE, and the MAC CE is included in a PDSCH. The application time of the second scheduling mode is later than a slot occupied by feedback information of the PDSCH. An offset between the application time of the second scheduling mode and the slot occupied by the feedback information of the PDSCH is first duration. The feedback information of the PDSCH is used to indicate whether the terminal correctly receives the PDSCH.

The first duration is related to time at which a physical layer of the terminal receives the PDSCH and transmits the PDSCH to a MAC layer of the terminal.

Based on this possible design, the second scheduling mode may take effect after the terminal obtains, from the PDSCH, the MAC CE including the switching indication, to ensure reliability or accuracy of receiving by the terminal, the MAC CE including the switching indication.

With reference to the first aspect, in a sixth possible design of the first aspect, the method further includes: The terminal receives an application indication. The application indication is used to indicate the application time of the second scheduling mode. That the terminal determines application time of the second scheduling mode includes: The terminal determines the application time of the second scheduling mode based on the application indication.

Based on this possible design, the network device may directly indicate the application time of the second scheduling mode to the terminal, so that the terminal determines the application time of the second scheduling mode based on the indication of the network device. This is simple and easy to implement.

With reference to the sixth possible design of the first aspect, in a seventh possible design of the first aspect, the application indication is included in a PDCCH or a PDSCH. For example, the application indication may be included in DCI of the PDCCH, or the application indication is included in MAC CE of the PDSCH.

Based on this possible design, the network device may indicate the application time of the second scheduling mode to the terminal by using the PDCCH or the PDSCH. Indication manners are flexible and diversified.

With reference to the first aspect, in an eighth possible design of the first aspect, the application time of the second scheduling mode is: a next symbol of a last symbol occupied by a data channel scheduled by using first scheduling information: a next slot of a slot occupied by a data channel scheduled by using first scheduling information; or a first scheduling information monitoring occasion after a time domain location occupied by a data channel scheduled by using first scheduling information. A time domain location of the first scheduling information is not later than a time domain location occupied by the switching indication. A scheduling information monitoring occasion is an occasion on which the terminal monitors a PDCCH used to schedule a data channel.

The next symbol of the last symbol occupied by the data channel scheduled by using the first scheduling information may be a symbol adjacent to the last symbol occupied by the data channel scheduled by using the first scheduling information, or may be any symbol after the last symbol occupied by the data channel scheduled by using the first scheduling information.

The next slot of the slot occupied by the data channel scheduled by using the first scheduling information may be a slot that is after the slot occupied by the data channel scheduled by using the first scheduling information and that is adjacent to the slot occupied by the data channel scheduled by using the first scheduling information, or may be any slot after the slot occupied by the data channel scheduled by using the first scheduling information.

The first scheduling information monitoring occasion after the time domain location occupied by the data channel scheduled by using the first scheduling information may be a scheduling information monitoring occasion that appears for the first time after the time domain location occupied by the data channel scheduled by using the first scheduling information, or may be any other scheduling information monitoring occasion after the time domain location occupied by the data channel scheduled by using the first scheduling information. For example, the first scheduling information monitoring occasion after the time domain location occupied by the data channel scheduled by using the first scheduling information is an $N^{th}$ scheduling information monitoring occasion after the time domain location occupied by the data channel scheduled by using the first scheduling information, where N is a positive integer.

Based on this possible design, the second scheduling mode may take effect after a data channel scheduled by using scheduling information that is not later than the switching indication is transmitted, to ensure reliability and accuracy of data channel transmission.

With reference to the first aspect, in a ninth possible design of the first aspect, the switching indication is included in a PDCCH, and the application time of the second scheduling mode is: a next symbol of a last symbol occupied by feedback information of a downlink data channel scheduled by using first scheduling information; a next slot of a slot occupied by feedback information of a downlink data channel scheduled by using first scheduling information; or a first scheduling information monitoring occasion after a time domain location occupied by feedback information of a downlink data channel scheduled by using first scheduling information. A time domain location of the first scheduling information is not later than a time domain location occupied by the switching indication. A scheduling information monitoring occasion is an occasion on which the terminal starts to monitor a PDCCH.

The next symbol of the last symbol occupied by the feedback information of the downlink data channel scheduled by using the first scheduling information may be a symbol adjacent to the last symbol occupied by the feedback information of the downlink data channel scheduled by using the first scheduling information, or may be any symbol after the last symbol occupied by the feedback information of the downlink data channel scheduled by using the first scheduling information.

The next slot of the slot occupied by the feedback signal of the downlink data channel scheduled by using the first scheduling information may be a slot that is after the slot occupied by the feedback signal of the downlink data channel scheduled by using the first scheduling information and that is adjacent to the slot occupied by the feedback signal of the downlink data channel scheduled by using the first scheduling information, or may be any slot after the slot occupied by the feedback signal of the downlink data channel scheduled by using the first scheduling information.

The first scheduling information monitoring occasion after the time domain location occupied by the feedback information of the downlink data channel scheduled by using the first scheduling information may be a scheduling information monitoring occasion that appears for the first time after the time domain location occupied by the feedback information of the downlink data channel scheduled by using the first scheduling information, or may be any other scheduling information monitoring occasion after the time domain location occupied by the feedback information of the downlink data channel scheduled by using the first scheduling information.

Based on this possible design, the second scheduling mode may take effect after feedback information corresponding to a downlink data channel scheduled by using scheduling information that is not later than the switching indication is transmitted, to ensure transmission reliability of the downlink data channel.

With reference to the eighth possible design of the first aspect or the seventh possible design of the first aspect, in a tenth possible design of the first aspect, the first scheduling information is scheduling information that schedules a last transmitted data channel in all scheduling information not later than the switching indication.

Based on this possible design, the second scheduling mode may take effect after all data channels scheduled by using the scheduling information that is not later than the switching indication are transmitted, to ensure reliability of all scheduling that is not later than the switching indication.

With reference to any one of the first aspect or the possible designs of the first aspect, in an eleventh possible design of the first aspect, the first scheduling mode and the second scheduling mode are indicated in at least one of the following parameters: an applicable minimum value of K0, an applicable minimum value of K2, an applicable minimum value of an aperiodic CSI-RS triggering offset, and an applicable minimum value of an aperiodic SRS triggering offset. K0 is a slot offset between a slot in which a PDCCH is located and a slot in which a PDSCH scheduled by using the PDCCH is located. K2 is a slot offset between a slot in which a PDCCH is located and a slot in which a PUSCH scheduled by using the PDCCH is located. The aperiodic CSI-RS triggering offset is a slot offset between a slot in which a PDCCH is located and a slot in which an aperiodic CSI-RS triggered by using the PDCCH is located. The aperiodic SRS triggering offset is a slot offset between a slot in which a PDCCH is located and a slot in which an aperiodic SRS triggered by using the PDCCH is located.

Based on this possible design, the scheduling mode of the terminal may be indicated by any value of the applicable minimum value of K0, the applicable minimum value of K2, the applicable minimum value of the aperiodic CSI-RS triggering offset, and the applicable minimum value of the aperiodic SRS triggering offset. This is simple and easy to implement.

With reference to any one of the first aspect or the possible designs of the first aspect, in still another possible design, the switching indication is included in the PDCCH. The switching indication is further used to indicate the terminal to switch from a first BWP to a second BWP. That the terminal determines application time of the second scheduling mode includes: The terminal determines the application time of the second scheduling mode on a target BWP based on the slot N in which the PDCCH is located, an applicable minimum slot offset, and a target coefficient. N is a natural number. The target coefficient is determined based on system parameter numerology of the target BWP and numerology of a first downlink BWP. The first downlink BWP is an active downlink BWP when the terminal receives the switching indication.

Based on this possible design, when a BWP of the terminal is switched, the application time of the second scheduling mode is determined based on a system parameter of a BWP used by the terminal after switching and a system parameter of a downlink BWP currently activated by the terminal, to avoid a problem in which system parameters of BWPs are different, that is, when subcarrier spacings of the BWPs of the terminal change, the application time of the scheduling mode changes.

With reference to any one of the first aspect or the possible designs of the first aspect, in still another possible design, the application time of the second scheduling mode is not earlier than a $Q^{th}$ slot. Q is equal to $\lceil (N+M) \times \text{Target coefficient} \rceil$. M is equal to the applicable minimum slot offset, M is equal to a sum of the applicable minimum slot offset and the first value, or M is a maximum value between the second value and the applicable minimum slot offset.

Based on this possible design, the second scheduling mode may take effect on the target BWP based on the minimum scheduling slot offset in the $Q^{th}$ slot after the slot in which the terminal receives the switching indication, to ensure that the second scheduling mode takes effect after the terminal parses the PDCCH including the switching indication. This improves accuracy of receiving the PDCCH.

With reference to any one of the first aspect or the possible designs of the first aspect, in still another possible design, that the application time of the second scheduling mode is not earlier than the $Q^{th}$ slot includes: The application time of the second scheduling mode is a start location of the $Q^{th}$ slot.

Based on this possible design, the start location of the $Q^{th}$ slot may be used as the application time of the scheduling mode, that is, the second scheduling mode takes effect as soon as the $Q^{th}$ slot arrives. This is simple and easy to implement.

With reference to any one of the first aspect or the possible designs of the first aspect, in still another possible design, the target coefficient is equal to $$\frac{2^{\mu_T}}{2^{\mu_1}} \cdot \mu_T$$

is the parameter numerology of the target BWP. $\mu_1$ is the numerology of the first downlink BWP.

Based on this possible design, a ratio of system parameter of the BWP may be directly used as the target coefficient. This is simple and easy to implement.

With reference to any one of the first aspect or the possible designs of the first aspect, in still another possible design, the first BWP is the first downlink BWP, the second BWP is a second downlink BWP, the first scheduling mode is a first downlink scheduling mode, the second scheduling mode is a second downlink scheduling mode, and the target BWP is the second downlink BWP. The first BWP is the first downlink BWP, the second BWP is a second downlink BWP, the first scheduling mode is a first uplink scheduling mode, the second scheduling mode is a second uplink scheduling mode, and the target BWP is a first uplink BWP. The first BWP is a first uplink BWP, the second BWP is a second uplink BWP, the first scheduling mode is a first downlink scheduling mode, the second scheduling mode is a second downlink scheduling mode, and the target BWP is the first downlink BWP. Alternatively, the first BWP is a first uplink BWP, the second BWP is a second uplink BWP, the first scheduling mode is a first uplink scheduling mode, the second scheduling mode is a second uplink scheduling mode, and the target BWP is the second uplink BWP.

Based on this possible design, the scheduling method provided in this application may be performed in a plurality of cases such as an uplink scheduling mode and an uplink BWP are switched, an uplink scheduling mode and a downlink BWP are switched, a downlink scheduling mode and an uplink BWP are switched, or a downlink scheduling mode and a downlink BWP are switched. There are various application scenarios. This improves applicability of the scheduling mode provided in this embodiment of this application.

With reference to any one of the first aspect or the possible designs of the first aspect, in still another possible design, the switching indication is further used to indicate one or more of the following parameters: PDCCH skipping of the terminal, a period in which the terminal monitors the PDCCH, a multiple-input multiple-output MIMO parameter of the terminal, and search space and/or a CORESET monitored by the terminal. Application time of the one or more parameters is the same as the application time of the second scheduling mode.

Based on this possible design, when the network device indicates to switch the scheduling mode and switch the BWP, other parameter information of the terminal is indicated. It is specified the application time of the other parameter information is the same as the application time of the scheduling mode. This is simple and easy to implement.

According to a second aspect, this application provides a communications apparatus. The communications apparatus may be a terminal, a chip in a terminal, or a system-on-a-chip; or may be a functional module that is in a terminal and that is configured to implement the method according to any one of the first aspect or the possible designs of the first aspect. The communications apparatus may implement functions performed by the terminal in the foregoing aspect or the possible designs, and the functions may be implemented by hardware executing corresponding software. The hardware or the software includes one or more modules corresponding to the foregoing functions. For example, the communications apparatus may include a receiving unit and a determining unit.

The receiving unit is configured to receive a switching indication that is sent by a network device and that is used to indicate the terminal to switch from a first scheduling mode to a second scheduling mode.

The determining unit is configured to determine application time of the second scheduling mode.

For a specific implementation of the communications apparatus, refer to behavior and a function of the terminal in the scheduling switching method according to any one of the first aspect or the possible designs of the first aspect. Details are not repeated herein again. Therefore, the provided communications apparatus can achieve same beneficial effects as any one of the first aspect or the possible designs of the first aspect.

According to a third aspect, a communications apparatus is provided. The communications apparatus may be a terminal, a chip in a terminal, or a system-on-a-chip. The communications apparatus may implement functions performed by the terminal in the foregoing aspect or the possible designs, and the functions may be implemented by hardware. In a possible design, the communications apparatus may include a processor and a communications interface. The processor may be configured to support the communications apparatus in implementing the function according to any one of the first aspect or the possible designs of the first aspect. For example, the processor may receive, through the communications interface, a switching indication that is sent by a network device and that is used to indicate a terminal to switch from a first scheduling mode to the second scheduling mode, and determine application time of the second scheduling mode. In still another possible design, the communications apparatus may further include a memory. The memory is configured to store a computer-executable instruction and data that are necessary for the communications apparatus. When the communications apparatus runs, the processor executes the computer-executable instruction stored in the memory, so that the communications apparatus performs the scheduling switching method according to any one of the first aspect or the possible designs of the first aspect.

According to a fourth aspect, a computer-readable storage medium is provided. The computer-readable storage medium may be a readable non-volatile storage medium. The computer-readable storage medium stores instructions. When the instructions are run on a computer, the computer is enabled to perform the scheduling switching method according to any one of the first aspect or the possible designs of the foregoing aspects.

According to a fifth aspect, a computer program product including instructions is provided. When the computer program product runs on a computer, the computer is enabled to perform the scheduling switching method according to any one of the first aspect or the possible designs of the foregoing aspects.

According to a sixth aspect, a communications apparatus is provided. The communications apparatus may be a terminal, a chip in a terminal, or a system-on-a-chip. The communications apparatus includes one or more processors and one or more memories. The one or more memories are coupled to the one or more processors, and the one or more memories are configured to store computer program code. The computer program code includes computer instructions. When the one or more processors execute the computer instructions, the communications apparatus is enabled to perform the scheduling switching method according to any one of the first aspect or the possible designs of the first aspect.

For technical effects achieved by any one of the designs of the third aspect to the sixth aspect, refer to the technical effects achieved by any one of the first aspect or the possible designs of the first aspect. Details are not described again.

According to a seventh aspect, an embodiment of this application provides a communications system including the terminal and the network device according to any one of the second aspect to the sixth aspect.

According to an eighth aspect, an embodiment of this application provides still another scheduling method. The method includes: A terminal receives minimum slot offset indication information sent by a network device. The minimum slot offset indication information is used to indicate a minimum slot offset of a target BWP. The terminal determines the minimum slot offset of the target BWP based on the minimum slot offset indication information and system parameter numerology of the target BWP. The minimum slot offset of the target BWP is based on the numerology of the target BWP.

Based on the eighth aspect, the terminal may determine the minimum slot offset of the target BWP based on the minimum slot offset information related to the target BWP, indicated by the network device. It should be noted that the target BWP may be a BWP used by the terminal after switching, or may be an active BWP when the terminal receives the minimum slot offset indication information. This is not limited.

With reference to the eighth aspect, in a possible design, the minimum slot offset indication information includes a value corresponding to the minimum slot offset of the target BWP. Based on this possible design, the value (value) of the minimum slot offset associated with the target BWP may be indicated to the terminal, so that the terminal directly determines the minimum time offset of the target BWP based on the value. This is simple and easy to implement.

With reference to the eighth aspect, in a possible design, the minimum slot offset indication information includes a value corresponding to a reference minimum slot offset. That the terminal determines the minimum slot offset of the target BWP based on the minimum slot offset indication information and numerology of the target BWP includes: The terminal determines the minimum slot offset of the target BWP based on the value corresponding to the reference minimum slot offset, reference numerology, and the numerology of the target BWP.

Based on this possible design, the value (value) of the reference minimum slot offset corresponding to the reference numerology may be indicated to the terminal, so that the terminal indirectly determines the minimum time offset of the target BWP based on the value of the reference minimum slot offset and a proportional relationship between the reference numerology and the numerology of the target BWP. This is simple and easy to implement.

With reference to the eighth aspect, in a possible design, the minimum slot offset indication information includes a first index. That the terminal determines the minimum slot offset of the target BWP based on the minimum slot offset indication information and numerology of the target BWP includes: The terminal determines the minimum slot offset of the target BWP based on the first index, a first correspondence, and the numerology of the target BWP. The first correspondence includes a correspondence between an index and a minimum slot offset of the target BWP.

Based on this possible design, the index corresponding to a value of the minimum slot offset of the target BWP may be indicated to the terminal, so that the terminal indirectly determines the value of the minimum slot offset based on the index, and determines the minimum time offset of the target BWP based on the value of the minimum slot offset, and a proportional relationship between reference numerology and the numerology of the target BWP. This is simple and easy to implement.

With reference to the eighth aspect, in a possible design, the minimum slot offset indication information includes a second index. That the terminal determines the minimum slot offset of the target BWP based on the minimum slot offset indication information and numerology of the target BWP includes: The terminal determines the minimum slot offset of the target BWP based on the second index, a second correspondence, reference numerology and the numerology of the target BWP. The second correspondence includes a correspondence between an index and a reference minimum slot offset.

Based on this possible design, the index corresponding to the reference minimum slot offset may be indicated to the terminal, so that the terminal indirectly determines the reference minimum slot offset based on the index, and further determines the minimum time offset of the target BWP based on the reference minimum time offset and a proportional relationship between the reference numerology and the numerology of the target BWP. This is simple and easy. The minimum time offset of the target BWP is determined. This is simple and easy.

According to a ninth aspect, this application provides a communications apparatus. The communications apparatus may be a terminal, a chip in a terminal, or a system-on-a-chip; or may be a functional module that is in a terminal and that is configured to implement the method according to any one of the eighth aspect or the possible designs of the eighth aspect. The communications apparatus may implement functions performed by the terminal in the foregoing aspect or the possible designs, and the functions may be implemented by hardware executing corresponding software. The hardware or the software includes one or more modules corresponding to the foregoing functions. For example, the communications apparatus may include a receiving unit and a determining unit.

The receiving unit is configured to receive minimum slot offset indication information sent by a network device. The minimum slot offset indication information is used to indicate a minimum slot offset of a target BWP.

The determining unit is configured to determine the minimum slot offset of the target BWP based on the minimum slot offset indication information and system parameter numerology of the target BWP. The minimum slot offset of the target BWP is based on the numerology of the target BWP.

For a specific implementation of the communications apparatus, refer to behavior and a function of the terminal in the scheduling switching method according to any one of the eighth aspect or the possible designs of the eighth aspect. Details are not repeated herein again. Therefore, the provided communications apparatus can achieve same beneficial effects as any one of the eighth aspect or the possible designs of the eighth aspect.

According to a tenth aspect, a communications apparatus is provided. The communications apparatus may be a terminal, a chip in a terminal, or a system-on-a-chip. The communications apparatus may implement functions performed by the terminal in the foregoing aspect or the possible designs, and the functions may be implemented by hardware. In a possible design, the communications apparatus may include a processor and a communications interface. The processor may be configured to support the communications apparatus in implementing the function according to any one of the eighth aspect or the possible designs of the eighth aspect. For example, the processor may receive, through the communications interface, minimum slot offset indication information sent by a network device. The minimum slot offset indication information is used to indicate a minimum slot offset of a target BWP. The processor determines the minimum slot offset of the target BWP based on the minimum slot offset indication information and system parameter numerology of the target BWP. The minimum slot offset of the target BWP is based on the numerology of the target BWP. In still another possible design, the communications apparatus may further include a memory. The memory is configured to store a computer-executable instruction and data that are necessary for the communications apparatus. When the communications apparatus runs, the processor executes the computer-executable instruction stored in the memory, so that the communications apparatus performs the scheduling switching method according to any one of the eighth aspect or the possible designs of the eighth aspect.

According to an eleventh aspect, a computer-readable storage medium is provided. The computer-readable storage medium may be a readable non-volatile storage medium. The computer-readable storage medium stores instructions. When the instructions are run on a computer, the computer is enabled to perform the scheduling switching method according to any one of the eighth aspect or the possible designs of the foregoing aspects.

According to a twelfth aspect, a computer program product including instructions is provided. When the computer program product runs on a computer, the computer is enabled to perform the scheduling switching method according to any one of the eighth aspect or the possible designs of the foregoing aspects.

According to a thirteenth aspect, a communications apparatus is provided. The communications apparatus may be a terminal, a chip in a terminal, or a system-on-a-chip. The communications apparatus includes one or more processors and one or more memories. The one or more memories are coupled to the one or more processors, and the one or more memories are configured to store computer program code. The computer program code includes computer instructions. When the one or more processors execute the computer instructions, the communications apparatus is enabled to perform the scheduling switching method according to any one of the eighth aspect or the possible designs of the eighth aspect.

For technical effects achieved by any one of the designs of the ninth aspect to the thirteenth aspect, refer to the technical effects achieved by any one of the eighth aspect or the possible designs of the eighth aspect. Details are not described again.

According to a fourteenth aspect, an embodiment of this application provides a communications system, including the terminal and the network device according to any one of the ninth aspect to the thirteenth aspect.

According to a fifteenth aspect, an embodiment of this application provides still another scheduling method. The method includes: A terminal receives a switching indication sent by a network device. The switching indication is used to indicate to switch the terminal from a first bandwidth part BWP to a second BWP. The terminal determines a minimum slot offset of the second BWP based on a minimum slot offset of the first BWP, system parameter numerology of the first BWP, and numerology of the second BWP.

Based on the fifteenth aspect, when a BWP is switched, a minimum slot offset of a BWP used after switching may be determined based on a system parameter of the BWP used before switching and a system parameter of the BWP used after switching. In this way, when a subcarrier spacing of the BWP used before switching and a subcarrier spacing of the BWP used after switching are different, the minimum slot offset of the BWP used after switching may be adjusted in a timely manner to ensure same time lengths of the minimum slot offsets.

With reference to the fifteenth aspect, in a possible design, that the terminal determines a minimum slot offset of the second BWP based on a minimum slot offset of the first BWP, numerology of the first BWP, and numerology of the second BWP includes: The terminal determines the minimum slot offset of the second BWP based on the minimum slot offset of the first BWP, and a first coefficient. The first coefficient is determined based on the numerology of the second BWP and the numerology of the first BWP.

With reference to the possible design of the fifteenth aspect, in a possible design, the first coefficient is equal to $$\frac{2^{\mu_2}}{2^{\mu_1}},$$

where $\mu_2$ is the parameter numerology of the second BWP, and $\mu_1$ is numerology of the first downlink BWP.

Based on this possible design, the minimum slot offset of the BWP used after switching may be determined based on a ratio of the system parameter of the BWP used before switching and the system parameter of the BWP used after switching. This is simple and easy to implement.

According to a sixteenth aspect, this application provides a communications apparatus. The communications apparatus may be a terminal, a chip in a terminal, or a system-on-a-chip; or may be a functional module that is in a terminal and that is configured to implement the method according to any one of the fifteenth aspect or the possible designs of the fifteenth aspect. The communications apparatus may implement functions performed by the terminal in the foregoing aspect or the possible designs, and the functions may be implemented by hardware executing corresponding software. The hardware or the software includes one or more modules corresponding to the foregoing functions. For example, the communications apparatus may include a receiving unit and a determining unit.

The receiving unit is configured to receive a switching indication sent by a network device. The switching indication is used to indicate to switch a terminal from the first bandwidth part BWP to a second BWP.

The determining unit is configured to determine a minimum slot offset of the second BWP based on a minimum slot offset of the first BWP, system parameter numerology of the first BWP, and numerology of the second BWP.

For a specific implementation of the communications apparatus, refer to behavior and a function of the terminal in the scheduling switching method according to any one of the fifteenth aspect or the possible designs of the fifteenth aspect. Details are not repeated herein again. Therefore, the provided communications apparatus can achieve same beneficial effects as any one of the fifteenth aspect or the possible designs of the fifteenth aspect.

According to a seventeenth aspect, a communications apparatus is provided. The communications apparatus may be a terminal, a chip in a terminal, or a system-on-a-chip. The communications apparatus may implement functions performed by the terminal in the foregoing aspect or the possible designs, and the functions may be implemented by hardware. In a possible design, the communications apparatus may include a processor and a communications interface. The processor may be configured to support the communications apparatus in implementing the function in any one of the fifteenth aspect or the possible designs of the fifteenth aspect. For example, the processor may receive, through the communications interface, a switching indication sent by a network device. The switching indication is used to indicate to switch a terminal from a first bandwidth part BWP to a second BWP. The processor determines a minimum slot offset of the second BWP based on a minimum slot offset of the first BWP, system parameter numerology of the first BWP, and numerology of the second BWP. In still another possible design, the communications apparatus may further include a memory. The memory is configured to store a computer-executable instruction and data that are necessary for the communications apparatus. When the communications apparatus runs, the processor executes the computer-executable instruction stored in the memory, so that the communications apparatus performs the scheduling switching method according to any one of the fifteenth aspect or the possible designs of the fifteenth aspect.

According to an eighteenth aspect, a computer-readable storage medium is provided. The computer-readable storage medium may be a readable non-volatile storage medium. The computer-readable storage medium stores instructions. When the instructions are run on a computer, the computer is enabled to perform the scheduling switching method according to any one of the fifteenth aspect or the possible designs of the foregoing aspect.

According to a nineteenth aspect, a computer program product including instructions is provided. When the computer program product runs on a computer, the computer is enabled to perform the scheduling switching method according to any one of the fifteenth aspect or the possible designs of the foregoing aspect.

According to a twentieth aspect, a communications apparatus is provided. The communications apparatus may be a terminal, a chip in a terminal, or a system-on-a-chip. The communications apparatus includes one or more processors and one or more memories. The one or more memories are coupled to the one or more processors, and the one or more memories are configured to store computer program code. The computer program code includes computer instructions. When the one or more processors execute the computer instructions, the communications apparatus is enabled to perform the scheduling switching method according to any one of the fifteenth aspect or the possible designs of the fifteenth aspect.

For technical effects achieved by any one of the designs of the fifteenth aspect to the twentieth aspect, refer to the technical effects achieved by any one of the fifteenth aspect or the possible designs of the fifteenth aspect. Details are not described again.

According to a twenty-first aspect, an embodiment of this application provides a communications system including the terminal and the network device according to any one of the fifteenth aspect to the nineteenth aspect.

DESCRIPTION OF EMBODIMENTS

Figure 1:
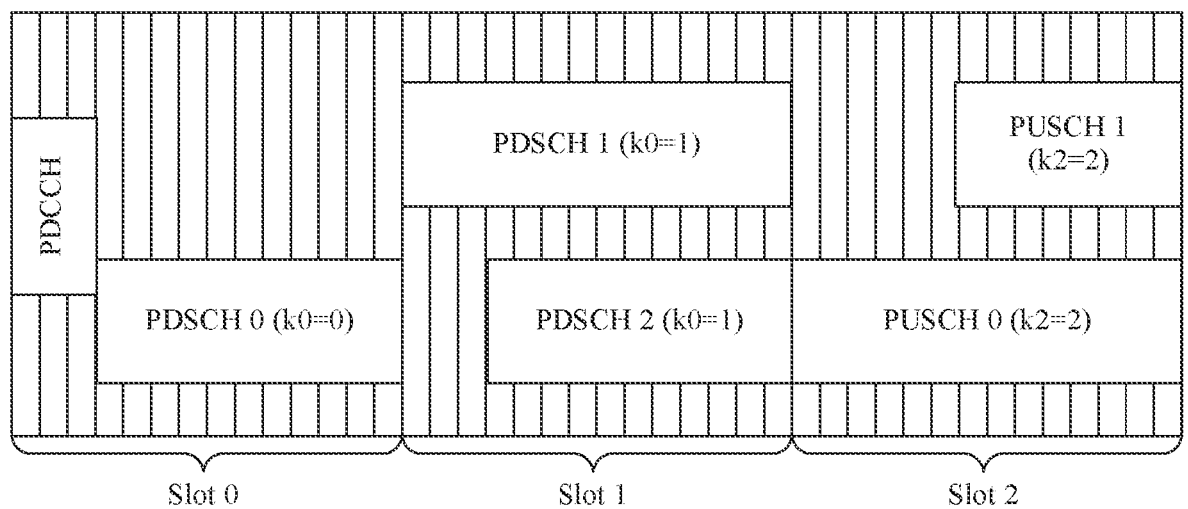
FIG. 1 is a schematic diagram of PDCCH scheduling.

To facilitate understanding of a method provided in embodiments of this application, some terms in the embodiments of this application are explained before the embodiments of this application are described.

Physical downlink control channel (physical downlink control channel, PDCCH): A physical downlink control channel is mainly used to carry downlink control information (downlink control information, DCI). The DCI may include common control information (for example, system information) and user-specific information (for example, a downlink resource allocation indication, uplink scheduling, a random access response, and an uplink power control parameter). The PDCCH may be used to schedule a data channel by using the DCI carried by the PDCCH. For example, the DCI may be used to indicate a transmission parameter (for example, a time domain resource location of the data channel) of the data channel. Before transmitting the data channel, a network device may send the PDCCH to a terminal. After receiving the PDCCH, the terminal may first demodulate the DCI in the PDCCH, and then transmit the data channel at the time domain resource location indicated by using the DCI.

Data channel: A data channel may be used to carry data. In the 3GPP protocol, data channels are classified into a physical uplink data channel (physical uplink shared channel, PUSCH) (or referred to as an uplink data channel) and a physical downlink data channel (physical downlink channel, PDSCH) (or referred to as a downlink data channel) based on different data carried in the data channels. The PUSCH is used to carry data (or referred to as uplink data) sent from a terminal to a network device. The PDSCH is used to carry data (or referred to as downlink data) sent from the network device to the terminal.

Further, the PDCCH may further indicate a time domain resource location of a channel state information reference signal (channel state information reference signal, CSI-RS) by using the DCI carried by the PDCCH, to trigger sending of an aperiodic (nonperiodic) CSI-RS: the PDCCH may indicate a time domain resource location of a sounding reference signal (sounding reference signal, SRS) by using the DCI carried by the PDCCH, to trigger sending of an aperiodic SRS: and/or the like. For example, a PDCCH is used to trigger sending of a CSI-RS. A network device may send the PDCCH to a terminal, and DCI carried by the PDCCH is used to indicate a time domain resource location of the CSI-RS. After receiving the PDCCH, the terminal may demodulate the DCI in the PDCCH, and receive, at the time domain resource location indicated by using the DCI, the CSI-RS sent by the network device.

CSI-RS: A CSI-RS is used by a terminal to measure a state of a channel between the terminal and a network device, and the CSI-RS may include one or more channel state measurement resources. For example, the network device may send, to the terminal, DCI used to indicate a time domain resource location of a CSI-RS and the CSI-RS. The terminal receives the CSI-RS at the time domain resource location indicated by using the DCI, measures a channel state measurement resource included in the CSI-RS, and reports channel state information (channel state information, CSI) to the network device based on a measurement result.

SRS: An SRS is used by a network device to measure information about a channel between the network device and a terminal. For example, the network device may send, to the terminal, DCI used to indicate a time domain resource location of an SRS. The terminal receives the DCI, and sends, at the time domain resource location indicated by using the DCI, the SRS to the network device through some or all antennas of the terminal. The network device receives the SRS, and measures the information about the channel between the network device and the terminal based on the received SRS.

Bandwidth part (bandwidth part, BWP): A bandwidth part is used to transmit a signal. In the 3GPP standard, a bandwidth part may be classified into two types based on a direction of the signal transmitted on the BWP: an uplink bandwidth part (uplink bandwidth part, UP BWP) and a downlink bandwidth part (downlink bandwidth part, DL BWP). The UP BWP may be used to transmit a signal sent from a terminal to a network device, that is, the terminal may send an uplink signal on the UL BWP: The downlink BWP may be used to transmit a signal sent from a network device to a terminal, and the terminal may receive a downlink signal on the DL BWP.

Different BWP parameters may be configured for different BWPs, and a BWP parameter may include numerology (a system parameter or a parameter) of a BWP. The numerology corresponds to parameters such as a subcarrier spacing of the BWP, a slot length of the BWP, and a cyclic prefix (cyclic prefix, CP) length of the BWP. The subcarrier spacing of the BWP is equal to $2^{\mu} \times 15$ [kHz], where is the numerology of the BWP. Larger numerology of the BWP corresponds to a larger subcarrier spacing of the BWP and a shorter symbol length. For example, when the subcarrier spacing of the BWP is 15 kHz, a slot length corresponding to the BWP is 1 ms. When the subcarrier spacing of the BWP is 30 kHz, a slot length corresponding to the BWP is 0.5 ms.

For example, the following Table a is a BWP parameter table. As shown in Table a, numerology may include five values from 0 to 4, and subcarrier spacings corresponding to the five values are 15 kHz, 30 kHz, 60 kHz, 120 kHz, and 240 kHz respectively.

TABLE a

| numerology | Subcarrier spacing (kHz) |
|---|---|
| 0 | 15 |
| 1 | 30 |
| 2 | 60 |
| 3 | 120 |
| 4 | 240 |

In the 3GPP standard, when a terminal works in one cell, there is only one active UL BWP and one active DL BWP. In other words, the terminal works in only one active UL BWP and one active DL BWP at a same moment. An active BWP may change, that is, the BWP may be switched at any time. For example, a network device configures two DL BWPs: a DL BWP 1 and a DL BWP 2 for a terminal, and the DL BWP 1 is an active DL BWP. In this case, the network device may send a BWP switching indication through a PDCCH, to indicate the terminal to switch from the DL BWP 1 to the DL BWP 2. Likewise, the network device may also indicate, by using the PDCCH, the terminal to perform switching on an active UL BWP. Numerology of a BWP used before switching may be different from numerology of a BWP used after switching.

One PDCCH may occupy one or more symbols in one slot (slot). A slot occupied by the PDCCH, a start location of symbols occupied by the PDCCH in the slot, and a quantity of symbols occupied by the PDCCH in the slot are not limited in the embodiments of this application. Optionally, when the PDCCH is used to schedule a data channel, the network device pre-configures a scheduling information monitoring occasion (scheduling information monitoring occasion) for the terminal. The terminal starts to monitor the PDCCH when the scheduling information monitoring occasion configured by the network device arrives. The scheduling information monitoring occasion may be periodically configured for the terminal, so that the terminal periodically monitors the PDCCH.

The slot occupied by the PDCCH may be the same as or different from a slot occupied by the data channel scheduled by using the PDCCH and/or a slot occupied by a reference signal triggered by using the PDCCH. In the 3GPP protocol, scheduling modes of the terminal are classified into: same-slot scheduling (single slot scheduling) and cross-slot scheduling (cross-slot scheduling) scheduling based on the slot occupied by the PDCCH and the slot occupied by the data channel scheduled by using the PDCCH and/or the slot occupied by the reference signal triggered by using the PDCCH. Same-slot scheduling may indicate that the PDCCH and the data channel scheduled by using the PDCCH and/or the reference signal triggered by using the PDCCH are located in a same slot. Cross-slot scheduling may indicate that the PDCCH and the data channel scheduled by using the PDCCH and/or the reference signal triggered by using the PDCCH are located in different slots. For example, when the PDCCH is used to schedule a PDSCH, the PDCCH and the PDSCH scheduled by using the PDCCH may be located in a same slot, that is, same-slot scheduling; or may be located in different slots, that is, cross-slot scheduling. In the 3GPP protocol, K0 is used to indicate whether the PDCCH and the PDSCH scheduled by using the PDCCH are of same-slot scheduling or cross-slot scheduling. K0 is a slot offset between a slot in which the PDCCH is located and a slot in which the PDSCH scheduled by using the PDCCH is located. K0 has a value set, and the value set is configured by a network device for a terminal. For example, the value set may be {0, 1, 2, . . . }. If K0=0, it indicates that the PDCCH and the PDSCH are in the same slot, that is, "same-slot scheduling". If K0>0, it indicates that the PDCCH and the PDSCH are not in the same slot, that is, "cross-slot scheduling". The network device may directly indicate K0 to the terminal, or the network device configures a time domain resource allocation (time domain resource allocation, TDRA) table for the terminal. The TDRA table includes an index (index) and K0 corresponding to the index. The network device may indicate the index to the terminal to indirectly indicate K0 to the terminal.

For example, the following Table 1 is a schematic diagram of a TDRA table configured by a network device for a terminal when a PDCCH is used to schedule a PDSCH. The TDRA table includes a correspondence between an index and K0. As shown in Table 1, when an index is 0, K0 is 0; when an index is 1. K0 is 1: and when an index is 2, K0 is 1. When the network device schedules the PDSCH for the terminal by using the PDCCH, the network device may configure the TDRA table shown in Table 1 for the terminal. Subsequently, if the network device indicates the index 1 to the terminal, the terminal may search Table 1 by using the index 1 as an index, to determine that K0 corresponding to the index 1 is 1. Therefore, the PDCCH and PDSCH are in different slots, that is, cross-slot scheduling.

TABLE 1

| Index (index) | K0 |
|---|---|
| 0 | 0 |
| 1 | 1 |
| 2 | 1 |

When the PDCCH is used to schedule a PUSCH, the PDCCH and the PUSCH scheduled by using the PDCCH may be located in a same slot, that is, same-slot scheduling, or may be located in different slots, that is, cross-slot scheduling. In the 3GPP protocol, K2 is used to indicate whether the PDCCH and the PUSCH scheduled by using the PDCCH are of same-slot scheduling or cross-slot scheduling. K2 is a slot offset between a slot in which the PDCCH is located and a slot in which the PUSCH scheduled by using the PDCCH is located. K2 has a value set, and the value set is configured by a network device for a terminal. For example, the value set may be {0, 1, 2, . . . }. If K2=0, it indicates that the PDCCH and the PUSCH are in the same slot, that is, "same-slot scheduling". If K2>0, it indicates that the PDCCH and the PUSCH are not in the same slot, that is, "cross-slot scheduling". The network device may directly indicate K2 to the terminal, or the network device configures a TDRA table for the terminal. The TDRA table includes an index (index) and K2 corresponding to the index. The network device may indicate the index to the terminal to indirectly indicate K2 to the terminal.

For example, the following Table 2 is a schematic diagram of a TDRA table configured by a network device for a terminal when a PDCCH is used to schedule a PUSCH. The TDRA table includes a correspondence between an index and K2. As shown in Table 2, when an index is 0, K2 is 0. When an index is 1, K2 is 2. When the network device schedules the PUSCH to the terminal by using the PDCCH, the network device may configure the TDRA table shown in Table 2 for the terminal. Subsequently, if the network device indicates the index 1 to the terminal, the terminal may search Table 2 by using the index 1 as an index, to determine that K2 corresponding to the index 1 is 2. Therefore, the PDCCH and PDSCH are in different slots, and have an offset of two slots, that is, cross-slot scheduling.

TABLE 2

| Index (index) | K2 |
|---|---|
| 0 | 2 |
| 1 | 2 |

It should be noted that Table 1 and Table 2 are merely example tables. In addition to content shown in Table 1 and Table 2, Table 1 and Table 2 may further include other content, for example, may further include a starting and length indication value (starting and length indication value), a mapping type (mapping type), and the like. This is not limited in this application.

When the PDCCH is used to trigger a CSI-RS, the PDCCH and the CSI-RS triggered by using the PDCCH may be located in a same slot, that is, same-slot scheduling, or may be located in different slots, that is, cross-slot scheduling. In the 3GPP protocol, an aperiodic CSI-RS triggering offset (triggering offset) is used to indicate whether the PDCCH and the CSI-RS scheduled by using the PDCCH are of same-slot scheduling or cross-slot scheduling. The aperiodic CSI-RS triggering offset is a slot offset between a slot in which the PDCCH is located and a slot in which the CSI-RS triggered by using the PDCCH is located. A value of the aperiodic CSI-RS triggering offset may be included in a value set {0, 1, 2 . . . }. The value set may be configured by a network device for a terminal. If the aperiodic CSI-RS triggering offset is equal to 0, it indicates that the PDCCH and the CSI-RS triggered by using the PDCCH are in the same slot, that is, "same-slot scheduling". If the aperiodic CSI-RS triggering offset is greater than 0, it indicates that the PDCCH and the CSI-RS triggered by using the PDCCH are in the different slots, that is, "cross-slot scheduling". The network device may directly indicate the aperiodic CSI-RS triggering offset to the terminal, or the network device indicates the aperiodic CSI-RS triggering offset to the terminal in another manner. This is not limited.

When the PDCCH is used to trigger an SRS, the PDCCH and the SRS triggered by using the PDCCH may be located in a same slot, that is, same-slot scheduling, or may be located in different slots, that is, cross-slot scheduling. In the 3GPP protocol, an aperiodic SRS triggering offset (triggering offset) is used to indicate whether the PDCCH and the SRS scheduled by using the PDCCH are of same-slot scheduling or cross-slot scheduling. The aperiodic SRS triggering offset is a slot offset between a slot in which the PDCCH is located and a slot in which the SRS triggered by using the PDCCH is located. A value of the aperiodic SRS triggering offset may be included in a value set {0, 1, 2 . . . }. The value set may be configured by a network device for a terminal. If the aperiodic SRS triggering offset is equal to 0, it indicates that the PDCCH and the SRS triggered by using the PDCCH are in the same slot, that is, "same-slot scheduling". If the aperiodic SRS triggering offset is greater than 0, it indicates that the PDCCH and the SRS triggered by using the PDCCH are in the different slots, that is, "cross-slot scheduling". The network device may directly indicate the aperiodic SRS triggering offset to the terminal, or the network device indicates the aperiodic SRS triggering offset to the terminal in another manner.

For example, a PDCCH occupies a slot 0, and the PDCCH is used to schedule a PDSCH and a PUSCH. As shown in FIG. 1, a location of a slot occupied by the PDSCH changes with K0, and a location of a slot occupied by the PUSCH changes with K2. For example, when the PDCCH is used to schedule a PDSCH 0, K0=0 and it indicates that a slot offset between the slot occupied by the PDCCH and a slot occupied by the PDSCH 0 scheduled by using the PDCCH is 0. Therefore, the PDSCH 0 is also located in a $0^{th}$ slot, that is, the slot 0 in FIG. 1. When the PDCCH is used to schedule a PDSCH 1, K0=1 and it indicates that a slot offset between the slot occupied by the PDCCH and a slot occupied by the PDSCH 1 scheduled by using the PDCCH is 1. Therefore, the PDSCH 1 is located in a $(0+1=1)^{st}$ slot, that is, a slot 1. When the PDCCH is used to schedule a PDSCH 2, K0=1 and it indicates that a slot offset between the slot occupied by the PDCCH and a slot occupied by the PDSCH 2 scheduled by using the PDCCH is 1. Therefore, the PDSCH 1 is located in the $(0+1=1)^{st}$ slot, that is, the slot 1. When the PDCCH is used to schedule a PUSCH 0, K2=2 and it indicates that a slot offset between the slot occupied by the PDCCH and a slot occupied by the PUSCH 0 scheduled by using the PDCCH is 2. Therefore, the PUSCH 0 is located in a $(0+2=2)^{nd}$ slot, namely, a slot 2. When the PDCCH is used to schedule a PUSCH 1, K2=2 and it indicates that a slot offset between the slot occupied by the PDCCH and a slot occupied by the PUSCH 1 scheduled by using the PDCCH is 2. Therefore, the PUSCH 0 is located in the $(0+2=2)^{nd}$ slot, namely, the slot 2.

Currently, to reduce power consumption of a terminal, optimization may be performed in two aspects. 1. When a service is carried (in other words, data needs to be transmitted), data transmission efficiency is improved. 2. When no service is carried (in other words, no data needs to be transmitted), power consumption of the terminal is reduced. As for 2, it is mentioned in a report of the international telecommunication union-radio communications sector (international telecommunication union-radiocommunicationssector, ITU-R) that the power consumption of the terminal may be reduced by increasing a proportion in which the terminal is in a sleep state.

Figure 2:
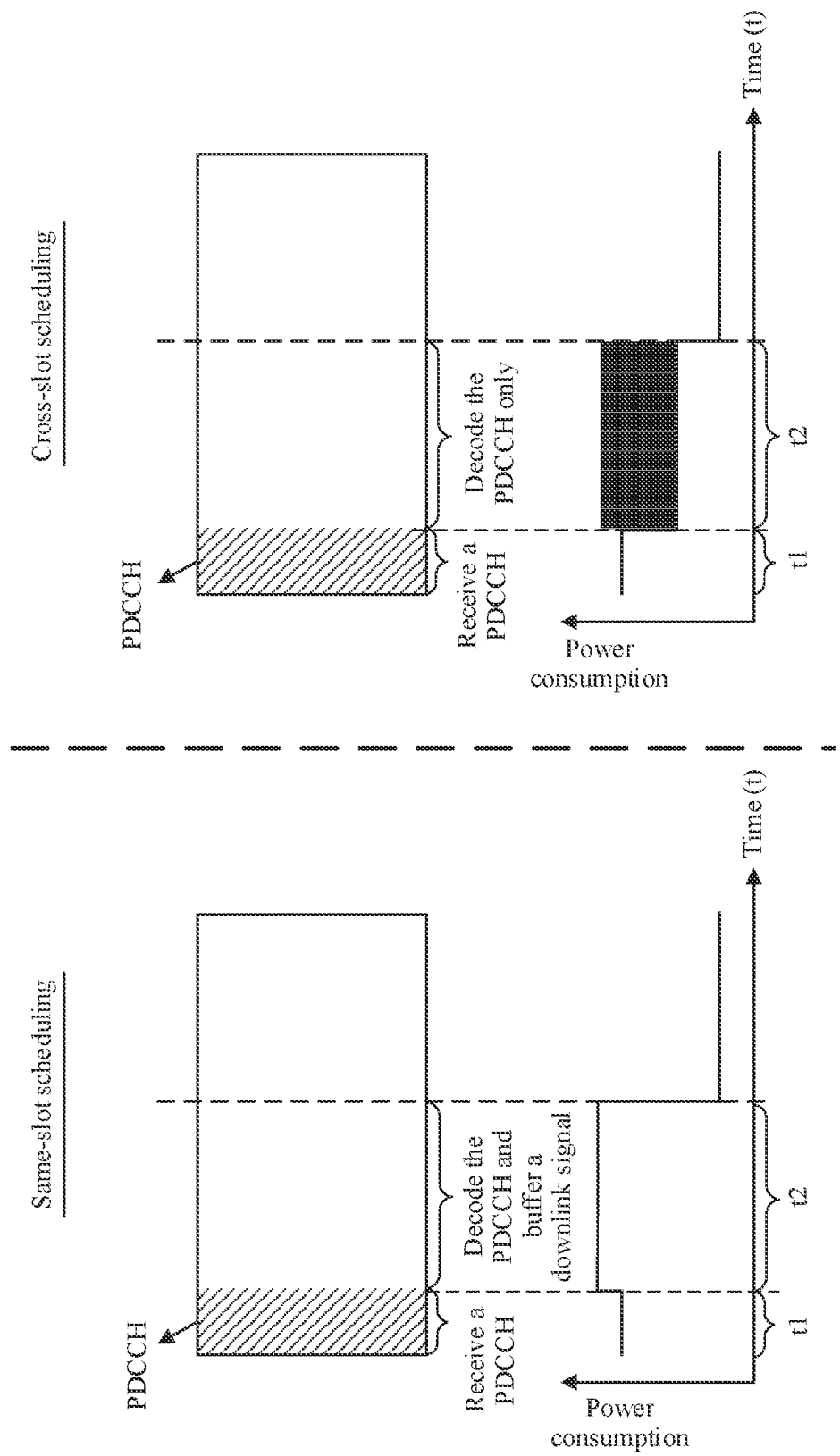
FIG. 2 is a schematic diagram of saving power for a terminal according to an embodiment of this application.

For example, as shown in FIG. 2, a terminal receives a PDCCH in a time period t1. As shown on the left side of FIG. 2, if the terminal does not know whether same-slot scheduling exists in a current slot (as long as a TDRA table configured by a base station includes K0=0, same-slot scheduling may exist), to avoid a data loss and/or a signal loss, after receiving the PDCCH, the terminal needs to buffer data and/or a signal when decoding the PDCCH. In a time period t2 shown on the left side of FIG. 2, the terminal needs to enable a radio frequency module of the terminal at all time to buffer the data and/or the signal. As shown on the right side of FIG. 2, if a terminal can know in advance that cross-slot scheduling is performed between a PDCCH and a data channel, and there is no data channel scheduled by using the PDCCH and/or a reference signal triggered by using the PDCCH in a current slot. In a process in which the terminal decodes the PDCCH after receiving the PDCCH, the terminal may disable a radio frequency module of the terminal, and not buffer any data and/or a signal, to save power. As shown on the right side of FIG. 2, a shadow part corresponding to a time period t2 is the power saved for the terminal.

According to the foregoing description, when there is no data service for the terminal, the terminal should be in a "cross-slot scheduling" state to reduce power consumption (a prerequisite is that all K0s>0). When a data service arrives for the terminal, the terminal should be in a "same-slot scheduling" state, to ensure that the data is transmitted quickly and reduce a delay. To enable a scheduling mode of the terminal to quickly match a current service type of the terminal, dynamic signaling may be used to indicate switching of the scheduling mode, for example, indicate a "valid (valid)" subset in a TDRA table. For example, there are three rows in the table. In a first row, K0=0, and in last two rows, K0>0. The dynamic signaling may be used to indicate that only the last two rows are valid. Alternatively, a network device configures a plurality of TDRA tables (for example, configures a plurality of TDRA tables shown in Table 1), to dynamically indicate a "valid (valid)" table. For example, two TDRA tables are configured. In a first TDRA table, there is K0=0. In a second TDRA table, all K0s≥2. Alternatively, a network device dynamically indicates a minimum value of K0. For example, the network device dynamically indicates that the minimum value of K0 is 3. However, this solution merely briefly describes how to indicate the scheduling mode, but does not specify application time of the scheduling mode in detail. If the application time of the scheduling mode is not explicitly specified, signaling blurry is caused between the network device and the terminal. For example, in the foregoing method in which the two TDRA tables are configured to dynamically indicate which one is valid, the network device and the terminal may consider, at a specific time point, that different tables are valid. To resolve this problem, the embodiments of this application provide a scheduling switching mode, to clarify application time for switching the scheduling mode.

The scheduling switching method provided in the embodiments of this application is described in detail below with reference to the accompanying drawings.

The scheduling switching method provided in the embodiments of this application may be applicable to a communications system that supports a plurality of scheduling modes, for example, may be applicable to any one of a 4th generation ($4^{th}$ generation, 4G) system, a long term evolution (long term evolution, LTE) system, a 5th generation (5th generation, 5G) system, a new radio (new radio, NR) system, or an NR-vehicle-to-everything (vehicle-toeverything, V2X) system, and may be further applicable to another next-generation communications system. This is not limited. The following uses a communications system shown in FIG. 3 as an example to describe the method provided in the embodiments of this application.

Figure 3:
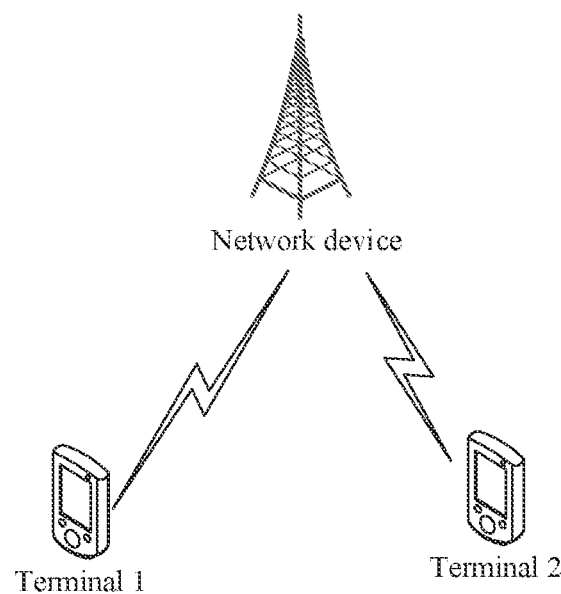
FIG. 3 is a simplified schematic diagram of a system architecture according to an embodiment of this application.

FIG. 3 is a schematic diagram of the communications system according to an embodiment of this application. As shown in FIG. 3, the communications system may include a network device and a plurality of terminals (for example, a terminal 1 and a terminal 2). The terminal may be located in a coverage area of the network device, and is connected to the network device. In the system shown in FIG. 3, the terminal may receive a PDCCH sent by the network device; and send a PUSCH to the network device or receive a PDSCH sent by the network device based on an indication of DCI included in the PDCCH, or receive a CSI-RS sent by the network device or report an SRS to the network device based on an indication of DCI included in the PDCCH.

The network device is mainly configured to implement functions such as resource scheduling, radio resource management, and radio access control of the terminal. Specifically, the network device may be any node of a small base station, a wireless access point, a transmit and receive point (transmission receive point, TRP), a transmission point (transmission point, TP), and another access node. In the embodiments of this application, an apparatus used to implement a function of the network device may be a network device, or may be an apparatus or a functional module that can support a network device in implementing the function, for example, a chip system. The following describes, by using an example in which the apparatus used to implement the function of the network device is the network device, the scheduling switching method provided in the embodiments of this application.

A terminal may be terminal equipment (terminal equipment), user equipment (user equipment, UE), a mobile station (mobile station, MS), a mobile terminal (mobile terminal, MT), or the like. For example, the terminal in FIG. 3 may be a mobile phone (mobile phone), a tablet computer, or a computer with a wireless transceiver function, or may be a virtual reality (virtual reality, VR) terminal, an augmented reality (augmented reality, AR) terminal, a wireless terminal in industrial control, a wireless terminal in unmanned driving, a wireless terminal in telemedicine, a wireless terminal in a smart grid, a wireless terminal in a smart city (smart city), a smart household, an in-vehicle terminal, or the like. In the embodiments of this application, an apparatus for implementing a function of the terminal may be a terminal, or may be an apparatus that can support the terminal in implementing the function, for example, a chip system. The following describes, by using an example in which the apparatus for implementing the function of the terminal is the terminal, the scheduling switching method provided in the embodiments of this application.

In the system shown in FIG. 3, the network device may send switching indication to the terminal, to indicate the terminal to switch from a first scheduling mode to a second scheduling mode, for example, switch from same-slot scheduling to cross-slot scheduling, or switch from cross-slot scheduling to same-slot scheduling. After receiving the switching indication, the terminal may determine application time of the second scheduling mode, and schedule a data channel and/or trigger a reference signal by using the second scheduling mode when the application time of the second scheduling mode arrives. Especially, when the second scheduling mode is cross-slot scheduling, the terminal disables a radio frequency module of the terminal, to save power. Specifically, for this process, refer to description in the embodiment corresponding to FIG. 5.

It should be noted that FIG. 3 is merely an example framework diagram. A quantity of nodes included in FIG. 3 is not limited. In addition to the function nodes shown in FIG. 3, the communications system shown in FIG. 3 may further include another node, for example, a core network device, a gateway device, or an application server. This is not limited.

Figure 4:
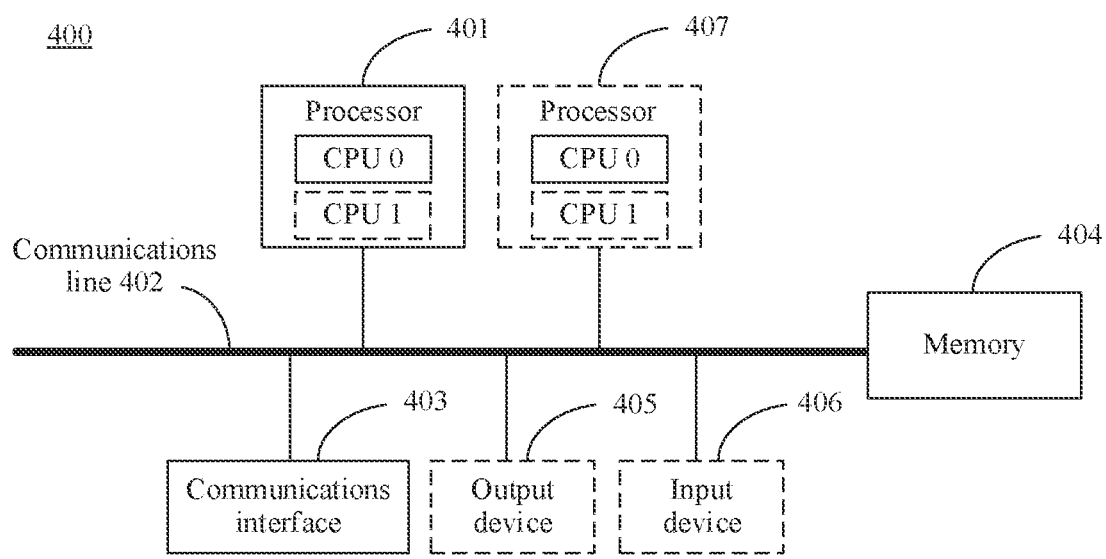
FIG. 4 is a schematic diagram of a communications apparatus according to an embodiment of this application.

In specific implementation, a terminal shown in FIG. 4 may use a composition structure shown in FIG. 4 or include components shown in FIG. 4.

FIG. 4 is a schematic composition diagram of a communications apparatus 400 according to an embodiment of this application. The communications apparatus 400 may be a terminal, a chip in a terminal, or a system-on-a-chip. The communications apparatus 400 may include a processor 401, a communications line 402, and a communications interface 403. Further, the communications apparatus 400 may further include a memory 404. The processor 401, the memory 404, and the communications interface 403 may be connected to each other through the communications line 402.

The processor 401 may be a central processing unit (central processing unit, CPU), a general purpose processor, a network processor (network processor, NP), a digital signal processor (digital signal processing, DSP), a microprocessor, a microcontroller, a programmable logic device (programmable logic device, PLD), or any combination thereof. The processor 401 may alternatively be any other apparatus having a processing function, for example, a circuit, a component, or a software module.

The communications line 402 is configured to transmit information between the components included in the communications apparatus 400.

The communications interface 403 is configured to communicate with another device or another communications network. The another communications network may be the Ethernet, a radio access network (radio access network, RAN), a wireless local area network (wireless local area networks, WLAN), or the like. The communications interface 403 may be a radio frequency module, a transceiver, or any apparatus that can implement communication. In this embodiment of this application, only an example in which the communications interface 403 is the radio frequency module is used for description. The radio frequency module may include an antenna, a radio frequency circuit, and the like. The radio frequency circuit may include a radio frequency integrated chip, a power amplifier, and the like.

The memory 404 is configured to store instructions. The instructions may be computer programs.

The memory 404 may be a read-only memory (read-only memory, ROM) or another type of static storage device capable of storing static information and/or an instruction, may be a random access memory (random access memory, RAM) or another type of dynamic storage device capable of storing information and/or an instruction, or may be an electrically erasable programmable read-only memory (electrically erasable programmable read-only memory, EEPROM), a compact disc read-only memory (compact disc read-only memory, CD-ROM), another compact disc storage, an optical disc storage (including a compressed optical disc, a laser disc, an optical disc, a digital versatile disc, a Blu-ray optical disc, and the like), a magnetic disk storage medium, another magnetic storage device, or the like.

It should be noted that the memory 404 may be independent of the processor 401, or may be integrated with the processor 401. The memory 404 may be configured to store instructions, program code, data, or the like. The memory 404 may be located inside the communications apparatus 400, or may be located outside the communications apparatus 400. This is not limited.

The processor 401 is configured to execute the instructions stored in the memory 404, to implement a scheduling switching method provided in the following embodiments of this application. For example, when the communications apparatus 400 is the terminal, the chip in the terminal, or the system-on-a-chip, the processor 401 may execute the instructions stored in the memory 404, to implement steps performed by a terminal in the following embodiments of this application. For another example, when the communications apparatus 400 is a functional entity, a chip in a functional entity, or a system-on-a-chip, the processor 401 may execute the instructions stored in the memory 404, to implement steps performed by a functional entity in the following embodiments of this application.

In an example, the processor 401 may include one or more CPUs, for example, a CPU 0 and a CPU 1 in FIG. 4.

In an optional implementation, the communications apparatus 400 includes a plurality of processors. For example, in addition to the processor 401 in FIG. 4, the communications apparatus 400 may further include a processor 407.

In an optional implementation, the communications apparatus 400 further includes an output device 405 and an input device 406. For example, the input device 406 is a device, such as a keyboard, a mouse, a microphone, or a joystick, and the output device 405 is device, such as a display or a speaker (speaker).

It should be noted that the communications apparatus 400 may be a desktop computer, a portable computer, a network server, a mobile phone, a tablet computer, a wireless terminal, an embedded device, a chip system, or a device having a structure similar to that in FIG. 4. In addition, the composition structure shown in FIG. 4 does not constitute a limitation on the communications apparatus. In addition to the components shown in FIG. 4, the communications apparatus may include more or fewer components than those shown in the figure, or some components may be combined, or different component arrangements may be used.

In the embodiments of this application, a chip system may include a chip, or may include a chip and another discrete component.

In addition, for actions, terms, and the like in the embodiments of this application, refer to each other. This is not limited. In the embodiments of this application, names of messages exchanged between the devices, names of parameters in the messages, and the like are merely examples, and other names may also be used in specific implementation. This is not limited. For example, a switching indication in the following embodiment may also be described as a power saving signal (power saving signal). This is not limited.

The following describes, with reference to the communications system shown in FIG. 3, the scheduling switching method provided in the embodiments of this application.

Figure 5:
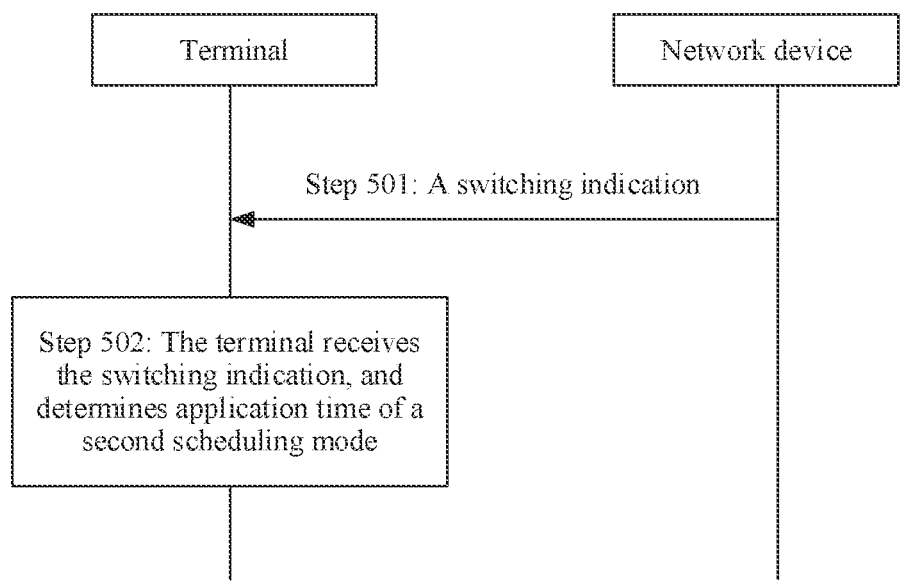
FIG. 5 is a schematic diagram of a scheduling switching mode according to an embodiment of this application.

FIG. 5 is a flowchart of a scheduling switching method according to an embodiment of this application. As shown in FIG. 5, the method may include step 501 and step 502.

Step 501: A network device sends a switching indication to a terminal.

The network device may be the network device in FIG. 3, and the terminal may be any terminal in the system shown in FIG. 3.

The switching indication may be used to indicate the terminal to switch from a first scheduling mode to a second scheduling mode. The first scheduling mode is different from the second scheduling mode. The first scheduling mode may be same-slot scheduling, and the second scheduling mode may be cross-slot scheduling. Alternatively, the first scheduling mode is cross-slot scheduling, and the second scheduling mode is same-slot scheduling. Alternatively, both the first scheduling mode and the second scheduling mode are cross-slot scheduling, but a slot offset, in the first scheduling mode, between a slot occupied by a PDCCH and a slot occupied by a data channel scheduled by using the PDCCH is different from a slot offset, in the first scheduling mode, between a slot occupied by a PDCCH and a slot occupied by a data channel scheduled by using the PDCCH. For example, K0 is 1 in the first scheduling mode, and K0 is 2 in the second scheduling mode. This is not limited in this application. For descriptions related to same-slot scheduling and cross-slot scheduling, refer to the foregoing descriptions. Details are not described again.

In a possible design, the switching indication may include an indicator used to clarify the second scheduling mode. The indicator may be a binary bit number. For example, when the switching indication includes a binary bit 0, it indicates that a scheduling mode of the terminal is same-slot scheduling. When the switching indication includes a binary bit 1, it indicates that a scheduling mode of the terminal is cross-slot scheduling.

In another possible design, the switching indication may include a parameter corresponding to the second scheduling mode. For example, the switching indication may include any one or more of the following parameters: a minimum value of K0, a minimum value of K2, a minimum value of an aperiodic CSI-RS triggering offset, and a minimum value of an aperiodic SRS triggering offset. The terminal may determine, based on the parameter included in the switching indication, a scheduling mode to be switched to. For example, if the switching indication includes a minimum value of K0, and the minimum value of K0 is greater than 0, the terminal determines to switch to cross-slot scheduling. If the switching indication includes a minimum value of K0, and the minimum value of K0 is equal to 0, it is determined that both same-slot scheduling and cross-slot scheduling may exist. If the switching indication includes K0, and K0 is equal to 0, the terminal determines to switch to same-slot scheduling.

In still another possible design, the switching indication may include an index (index), and the index may be used to indicate the second scheduling mode. For example, the index (index) may correspond to a minimum value of K0, a minimum value of K2, a minimum value of an aperiodic CSI-RS triggering offset, or a minimum value of an aperiodic SRS triggering offset. The terminal may determine the minimum value of K0, the minimum value of K2, the minimum value of the aperiodic CSI-RS triggering offset, or the minimum value of the aperiodic SRS triggering offset by using the index, so that the terminal determines a scheduling mode of the terminal based on the minimum value of K0, the minimum value of K2, the minimum value of the aperiodic CSI-RS triggering offset, or the minimum value of the aperiodic SRS triggering offset.

For example, the network device may send the switching indication to the terminal through a communication link between the network device and the terminal. Specifically, the switching indication may be sent to the terminal through a PDCCH. For example, the switching indication may be sent to the terminal by using a field in DCI transmitted through the PDCCH, or the switching indication may be sent to the terminal by using other signaling. For example, the switching indication may be sent to the terminal by using a media access control control element (media access control control element, MAC CE) transmitted on a PDSCH. This is not limited in this application.

It should be noted that a name of the switching indication is not limited in this embodiment of this application. Optionally, the switching indication may alternatively be named another message. For example, the switching indication may alternatively be named a power saving signal. This is not limited in this application.

Step 502: The terminal receives the switching indication, and determines application time of the second scheduling mode.

For example, w % ben the switching indication is sent to the terminal by using the DCI transmitted through the PDCCH, the terminal may receive the PDCCH sent by the network device, and obtain the switching indication from the DCI included in the PDCCH. When the switching indication is sent to the terminal by using the MAC CE transmitted on the PDSCH, the terminal may receive the PDSCH sent by the network device, and obtain the switching indication from the MAC CE included in the PDSCH.

The application time of the second scheduling mode may be time at which the terminal may schedule a data channel (for example, a PDSCH or a PUSCH) and/or trigger a reference signal (for example, a CSI-RS or an SRS) by using the second scheduling mode, or time at which the second scheduling mode starts to take effect. When the application time of the second scheduling mode arrives or after the application time of the second scheduling mode arrives and before a next switching indication arrives, the terminal may adjust a functional module (for example, a radio frequency module, or a processing module configured to demodulate the PDCCH) of the terminal, and schedule the data channel and/or trigger the reference signal by using the second scheduling mode. For example, when the second scheduling mode is cross-slot scheduling, the terminal may disable the radio frequency module of the terminal after the application time of the second scheduling mode (or at the application time of the second scheduling mode), to save power for the terminal.

In this embodiment of this application, to ensure reliability of sending the switching indication, reliability of a data channel transmitted between the terminal and the network device, and the like, the application time of the second scheduling mode may be determined based on one or more factors such as whether the terminal correctly receives the PDCCH, whether the terminal correctly receives the data channel scheduled by using the PDCCH, and a capability of processing the PDCCH by the terminal. Specifically, for a process of determining the application time of the second scheduling mode, refer to the following manner 1 to manner 7.

Based on the manner shown in FIG. 5, after receiving the switching indication, the terminal may clarify the application time of the scheduling mode used after switching, so that the terminal schedules the data channel and/or triggers the reference signal by using the second scheduling mode when the application time of the second scheduling mode arrives. Especially, when the second scheduling mode is cross-slot scheduling, if the terminal expects that the terminal is in a power saving state, the terminal may disable the radio frequency module of the terminal in a time period (for example, a time period after the terminal receives the PDCCH for scheduling data and before the terminal completes demodulation of the PDCCH) after the application time of the second scheduling mode, to enter the power saving state.

The following describes several possible values of the application time of the second scheduling mode with reference to the following Manner 1 to Manner 6:

Manner 1: The switching indication is included in a PDCCH. The PDCCH may not be used to schedule a data channel and/or trigger a reference signal, or may be used to schedule a data channel and/or trigger a reference signal. This is not limited in this application.

That the switching indication is included in a PDCCH may also be described as that the switching indication is carried on a PDCCH, the switching indication is sent to the terminal through a PDCCH, the switching indication is included in DCI in a PDCCH and is a field in the DCI, the switching indication is sent to the terminal by using DCI in a PDCCH, the switching indication is DCI in a PDCCH, or the like. This is not limited in this application.

In Manner 1, to ensure reliability (or accuracy) of the switching indication included in the PDCCH, the PDCCH may correspondingly have feedback information. Once the terminal receives the PDCCH, the terminal feeds back a receiving status to the network device, so that the network device learns whether the terminal correctly receives the PDCCH. If learning that the terminal does not correctly receive the PDCCH, the network device resends a PDCCH including the switching indication.

The feedback information corresponding to the PDCCH including the switching indication may be referred to as feedback information of the PDCCH. The feedback information of the PDCCH may be included in a PUCCH or a PUSCH. The feedback information of the PDCCH may occupy one or more symbols in one slot, and one symbol may occupy tens of microseconds (us). The feedback information of the PDCCH may be used to indicate whether the terminal correctly receives the PDCCH including the switching indication. The feedback information of the PDCCH may be acknowledgment (acknowledge, ACK) or negative acknowledgment (non-acknowledge, NACK). If the terminal correctly receives the PDCCH, the terminal sends the ACK to the network device. Otherwise, if the terminal does not correctly receive the PDCCH including the switching indication, the terminal sends the NACK to the network device, so that the network device retransmits the switching indication, to ensure reliability of the switching indication included in the PDCCH. For example, the terminal may verify, in a cyclic redundancy check (cyclic redundancy check, CRC) manner, whether the terminal correctly receives the PDCCH including the switching indication. Details are not described herein.

To avoid a problem that the reliability of the switching indication included in the PDCCH is reduced because the terminal cannot send the feedback information of the PDCCH to the network device, in Manner 1, the application time of the second scheduling mode may be after the feedback information of the PDCCH including the switching indication is sent.

Specifically, the application time of the second scheduling mode may be designed as shown in the following (1.1), (1.2), or (1.3).

(1.1) The application time of the second scheduling mode is a next symbol (symbol) of a last symbol occupied by the feedback information of the PDCCH.

The next symbol of the last symbol occupied by the feedback information of the PDCCH may be a symbol adjacent to the last symbol occupied by the feedback information of the PDCCH, or may be any symbol after the last symbol occupied by the feedback information of the PDCCH. This is not limited in this application.

The symbol in this embodiment of this application has a specific length, and a time length of one symbol may be tens of microseconds (us). For example, the time length of the symbol may be 71 us. When the time length of the symbol is tens of us, that the application time of the second scheduling mode is the next symbol of the last symbol occupied by the feedback information of the PDCCH may include: The application time of the second scheduling mode is a start moment of the next symbol of the last symbol occupied by the feedback information of the PDCCH, or is any other moment of the next symbol of the last symbol occupied by the feedback information of the PDCCH. For example, the application time of the second scheduling mode may be a $Q^{th}$ us of the next symbol of the last symbol occupied by the feedback information of the PDCCH, where Q is a positive integer.

Figure 6A:
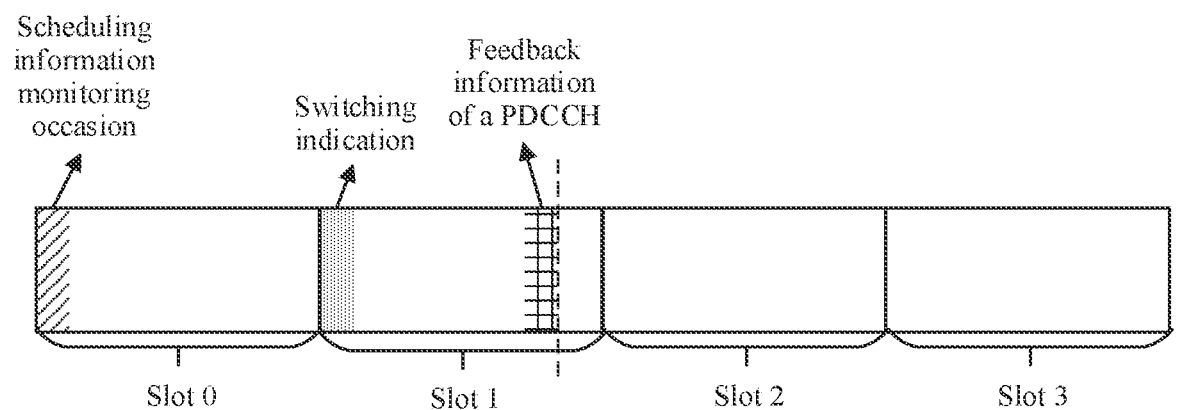
FIG. 6a is a schematic diagram of application time of a scheduling mode according to an embodiment of this application.

For example, each slot includes 14 symbols. As shown in FIG. 6a, a terminal receives, on a first symbol in a slot 1, a PDCCH including a switching indication, and sends, on a twelfth symbol in the slot 1, feedback information of the PDCCH including the switching indication to a network device. As shown by a dashed line in FIG. 6a, application time of a second scheduling mode may be a thirteenth symbol or a fourteenth symbol after the twelfth symbol in the slot 1. For example, the application time of the second scheduling mode is the thirteenth symbol in the slot 1, and a time length of each symbol is 71 us. The application time of the second scheduling mode may be specifically a $1^{st}$ us of the thirteenth symbol, may be a $50^{th}$ us of the thirteenth symbol, or may be a $71^{st}$ us of the thirteenth symbol. This is not limited in this application.

(1.2) The application time of the second scheduling mode is a next slot of a slot occupied by the feedback information of the PDCCH.

The next slot of the slot occupied by the feedback information of the PDCCH may be a slot after the slot occupied by the feedback information of the PDCCH and adjacent to the slot occupied by the feedback information of the PDCCH, or may be any slot after the slot occupied by the feedback information of the PDCCH. This is not limited in this application.

The slot in this embodiment of this application may include a plurality of symbols. For example, one slot may include 12 or 14 symbols. When one slot includes a plurality of symbols, that the application time of the second scheduling mode is the next slot of the slot occupied by the feedback information of the PDCCH may include: The application time of the second scheduling mode is a start symbol in the next slot of the slot occupied by the feedback information of the PDCCH; or is any other symbol in the next slot of the slot occupied by the feedback information of the PDCCH. For example, the application time of the second scheduling mode may be an $R^{th}$ symbol in the next slot of the slot occupied by the feedback information of the PDCCH, where R is a positive integer. Alternatively, when one slot includes a plurality of symbols, and a time length of one symbol is dozens of us, that the application time of the second scheduling mode is the next slot of the slot occupied by the feedback information of the PDCCH may include: The application time of the second scheduling mode is a start moment of a symbol (for example, a start symbol or any other symbol, for example, an $R^{th}$ symbol) in the next slot of the slot occupied by the feedback information of the PDCCH, or the application time of the second scheduling mode is any other moment in a symbol in the next slot of the slot occupied by the feedback information of the PDCCH. For example, the application time of the second scheduling mode is a $Q^{th}$ us of the symbol, where Q is an integer.

Figure 6B:
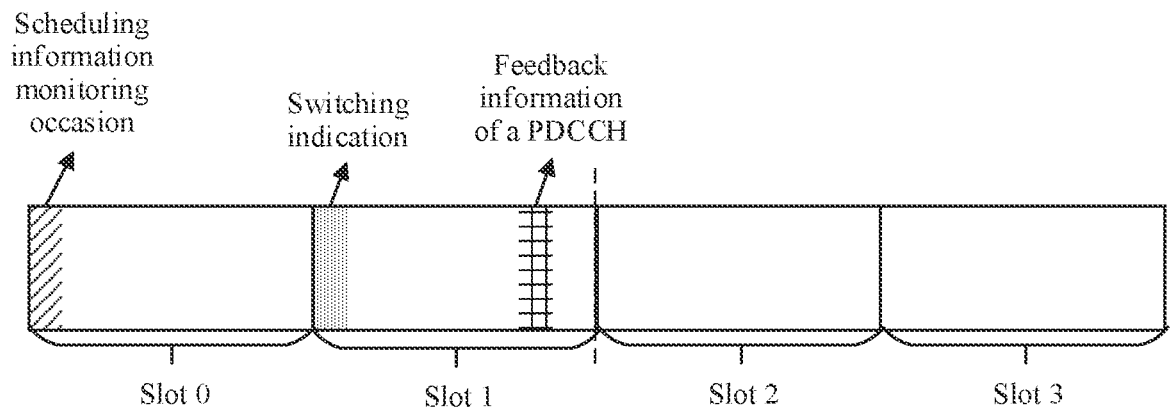
FIG. 6b is a schematic diagram of application time of a scheduling mode according to an embodiment of this application.

For example, each slot includes 14 symbols. As shown in FIG. 6b, a terminal receives, on a first symbol in a slot 1, a PDCCH including a switching indication, and sends, in the slot 1, feedback information of the PDCCH including the switching indication to a network device. As shown by a dashed line in FIG. 6b, application time of a second scheduling mode may be a next slot of the slot 1, namely, a slot 2. For example, when the slot includes 14 symbols, the application time of the second scheduling mode may be a first symbol in the slot 2, may be a tenth symbol in the slot 2, or may be a fourteenth symbol in the slot 2. Alternatively, when a time length of each symbol is tens of us, the application time of the second scheduling mode may be a $1^{st}$ us of the first symbol in the slot 2, or may be a $10^{th}$ us of the first symbol in the slot 2, or may be a $50^{th}$ us of the first symbol in the slot 2.

(1.3) The application time of the second scheduling mode is a first scheduling information monitoring occasion after a time domain location occupied by the feedback information of the PDCCH.

A scheduling information monitoring occasion (scheduling information monitoring occasion) may be an occasion on which a terminal monitors a PDCCH used to schedule a data channel. The scheduling information monitoring occasion may occupy one or more symbols in one slot. This is not limited in this application. The terminal may start to monitor the PDCCH used to schedule the data channel when the scheduling information monitoring occasion arrives. In actual application, the network device may configure a plurality of scheduling information monitoring occasions for the terminal. There is one or more slots between two adjacent scheduling information monitoring occasions, so that the terminal periodically monitors the PDCCH used to schedule the data channel.

To avoid a problem that the data channel cannot be correctly transmitted because the terminal cannot detect the PDCCH used to schedule the data channel, the second scheduling mode starts to take effect when the first scheduling information monitoring occasion after the time domain location occupied by the feedback information of the PDCCH arrives. When the first scheduling information monitoring occasion occupies a plurality of symbols, that the application time of the second scheduling mode is the first scheduling information monitoring occasion after the time domain location occupied by the feedback information of the PDCCH may include: The application time of the second scheduling mode is a start symbol of the first scheduling information monitoring occasion after the time domain location occupied by the feedback information of the PDCCH, or may be any other symbol of the first scheduling information monitoring occasion.

When the first scheduling information monitoring occasion occupies a plurality of symbols, and each symbol occupies dozens of us, that the application time of the second scheduling mode is the first scheduling information monitoring occasion after the time domain location occupied by the feedback information of the PDCCH may include: The application time of the second scheduling mode is a start moment of a symbol (for example, a start symbol or any other symbol) of the first scheduling information monitoring occasion after the time domain location occupied by the feedback information of the PDCCH, or the application time of the second scheduling mode is any other moment of a symbol (for example, a start symbol or any other symbol) of the first scheduling information monitoring occasion after the time domain location occupied by the feedback information of the PDCCH. This is not limited in this application.

It should be noted that, in (1.3), the first scheduling information monitoring occasion after the time domain location occupied by the feedback information of the PDCCH may be a scheduling information monitoring occasion that appears for the first time after the time domain location occupied by the feedback information of the PDCCH, or may be any other scheduling information monitoring occasion after the time domain location occupied by the feedback information of the PDCCH. For example, the first scheduling information monitoring occasion after the time domain location occupied by the feedback information of the PDCCH may be an $N^{th}$ scheduling information monitoring occasion after the time domain location occupied by the feedback information of the PDCCH, where N is a positive integer.

Figure 6C:
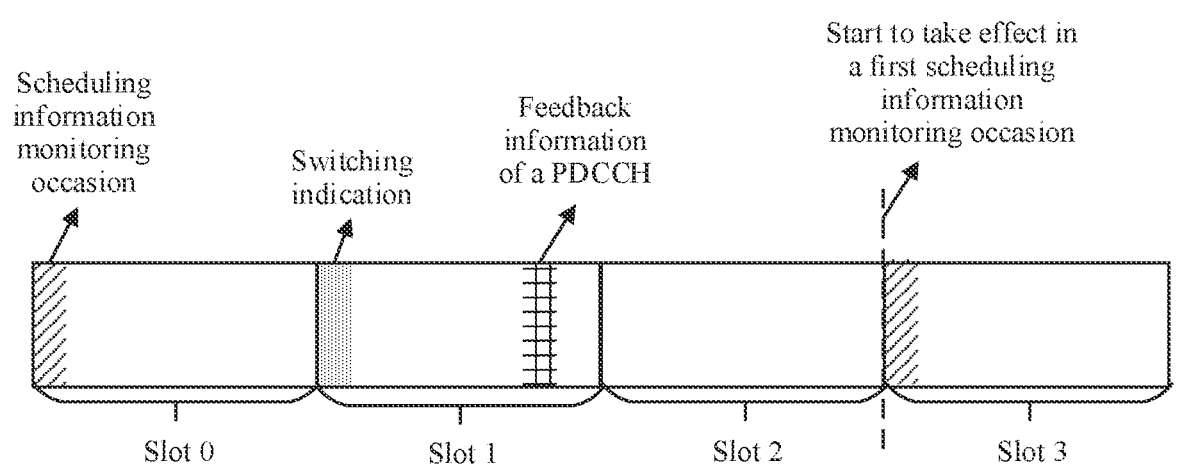
FIG. 6c is a schematic diagram of application time of a scheduling mode according to an embodiment of this application.

For example, each slot includes 14 symbols. As shown in FIG. 6c, a terminal receives, on a first symbol in a slot 1, a PDCCH including a switching indication, and sends, in the slot 1, feedback information of the PDCCH including DCI to a network device. If a first scheduling information monitoring occasion after a time domain location occupied by the feedback information of the PDCCH including the DCI is located in a slot 3. As shown by a dashed line in FIG. 6c, application time of a second scheduling mode may be the slot 3. For example, each slot includes 14 symbols, and the application time of the second scheduling mode may be a start symbol in the slot 3, for example, may be a first symbol in the slot 3, may be a tenth symbol in the slot 3, or may be a fourteenth symbol in the slot 3. Alternatively, for example, a time length of each symbol is tens of us, and the application time of the second scheduling mode may be a $1^{st}$ us of the first symbol in the slot 3, may be a $10^{th}$ us of the first symbol in the slot 3, or may be a $50^{th}$ us of the first symbol in the slot 3.

Manner 2: The switching indication is included in a PDCCH. In addition to the switching indication, the PDCCH may further include scheduling information. The scheduling information is used to schedule a downlink data channel (for example, a PDSCH) of the terminal.

That the switching indication is included in a PDCCH may also be described as that the switching indication is carried on a PDCCH, the switching indication is sent to the terminal through a PDCCH, the switching indication is included in DCI in a PDCCH and is a field in the DCI, the switching indication is sent to the terminal by using DCI in a PDCCH, the switching indication is DCI in a PDCCH, or the like. This is not limited in this application.

In Manner 2, to ensure reliability of the downlink data channel scheduled by using the PDCCH, the terminal needs to send feedback information of the downlink data channel to the network device. For example, once the terminal receives the downlink data channel scheduled by using the PDCCH, the terminal feeds back a receiving status to the network device, so that the network device learns whether the terminal correctly receives the downlink data channel scheduled by using the PDCCH. If the network device learns that the terminal does not correctly receive the downlink data channel scheduled by using the PDCCH, the network device resends a downlink data channel to the terminal, to ensure transmission reliability of the downlink data channel.

The feedback information of the downlink data channel may be included in a PUCCH or a PUSCH. The feedback information of the downlink data channel may occupy one or more symbols in one slot, and one symbol may occupy tens of microseconds (us). The feedback information of the downlink data channel may be used to indicate whether the terminal correctly receives the downlink data channel scheduled by using the PDCCH including the switching indication. The feedback information of the downlink data channel may be ACK or NACK. If the terminal correctly receives the downlink data channel, the terminal sends the ACK to the network device. Otherwise, if the terminal does not correctly receive the downlink data channel, the terminal sends the NACK to the network device, so that the network device retransmits the downlink data channel, to ensure the transmission reliability of the downlink data channel. Specifically, the terminal may determine, by using the conventional technology, whether the terminal correctly receives the downlink data channel scheduled by using the PDCCH. Details are not described herein.

To avoid a problem that reliability of the downlink data channel is reduced because the terminal cannot send the feedback information of the downlink data channel to the network device, in Manner 2, the application time of the second scheduling mode may be after the feedback information of the downlink data channel scheduled by using the PDCCH is sent.

Specifically, the application time of the second scheduling mode may be designed as shown in the following (2.1), (2.2), or (2.3).

(2.1) The application time of the second scheduling mode is a next symbol of a last symbol occupied by the feedback information of the downlink data channel.

The next symbol of the last symbol occupied by the feedback information of the downlink data channel may be a symbol adjacent to the last symbol occupied by the feedback information of the downlink data channel, or may be any symbol after the last symbol occupied by the feedback information of the downlink data channel. This is not limited in this application.

When a time length of a symbol is tens of us, that the application time of the second scheduling mode is the next symbol of the last symbol occupied by the feedback information of the downlink data channel may include: The application time of the second scheduling mode is a start moment of the next symbol of the last symbol occupied by the feedback information of the downlink data channel, or is another moment of the next symbol of the last symbol occupied by the feedback information of the downlink data channel. For example, the application time of the second scheduling mode may be a $Q^{th}$ us of the next symbol of the last symbol occupied by the feedback information of the downlink data channel, where Q is a positive integer.

Figure 7A:
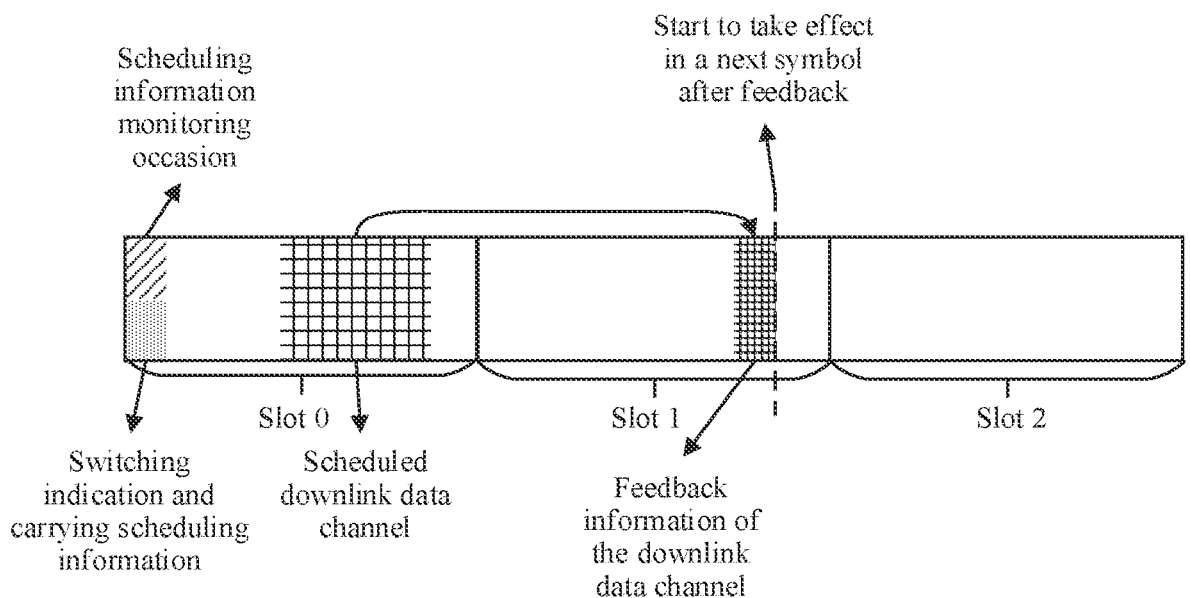
FIG. 7a is a schematic diagram of application time of a scheduling mode according to an embodiment of this application.

For example, each slot includes 14 symbols. As shown in FIG. 7a, a terminal detects, on a first symbol in a slot 0, a PDCCH including a switching indication, a downlink data channel scheduled by using the PDCCH is located in the slot 0, and feedback information of the downlink data channel is located on a twelfth symbol in a slot 1. As shown by a dashed line in FIG. 7a, application time of a second scheduling mode may be a next symbol after the twelfth symbol in the slot 1, for example, a thirteenth symbol or a fourteenth symbol in the slot 1. For example, the application time of the second scheduling mode is the thirteenth symbol in the slot 1, and a time length of each symbol is 71 us. The application time of the second scheduling mode may be specifically a start moment of the thirteenth symbol, for example, may be a $1^{st}$ us of the thirteenth symbol, may be a $50^{th}$ us of the thirteenth symbol, or may be a $71^{st}$ us of the thirteenth symbol. This is not limited in this application.

(2.2) The application time of the second scheduling mode is a next slot of a slot occupied by the feedback information of the downlink data channel.

The next slot of the slot occupied by the feedback information of the downlink data channel may be a slot after the slot occupied by the feedback information of the downlink data channel and adjacent to the slot occupied by the feedback information of the downlink data channel, or may be any slot after the slot occupied by the feedback information of the downlink data channel. This is not limited in this application.

The slot in this embodiment of this application may include a plurality of symbols, for example, may include 12 or 14 symbols. When one slot includes a plurality of symbols, that the application time of the second scheduling mode is the next slot of the slot occupied by the feedback information of the downlink data channel may include: The application time of the second scheduling mode is a start symbol in the next slot of the slot occupied by the feedback information of the downlink data channel; or is any other symbol in the next slot of the slot occupied by the feedback information of the downlink data channel. For example, the application time of the second scheduling mode may be an $R^{th}$ symbol in the next slot of the slot occupied by the feedback information of the downlink data channel, where R is a positive integer. Alternatively, when the slot occupied by the feedback information of the downlink data channel includes a plurality of symbols, and a time length of each symbol is tens of us, that the application time of the second scheduling mode is the next slot of the slot occupied by the feedback information of the downlink data channel may include: The application time of the second scheduling mode is a start moment of a symbol (for example, a start symbol or any other symbol) in the next slot of the slot occupied by the feedback information of the downlink data channel, or another moment of a symbol in the next slot of the slot occupied by the feedback information of the downlink data channel. For example, the application time of the second scheduling mode is a $Q^{th}$ us of the symbol in the next slot of the slot occupied by the feedback information of the downlink data channel, where Q is an integer.

Figure 7B:
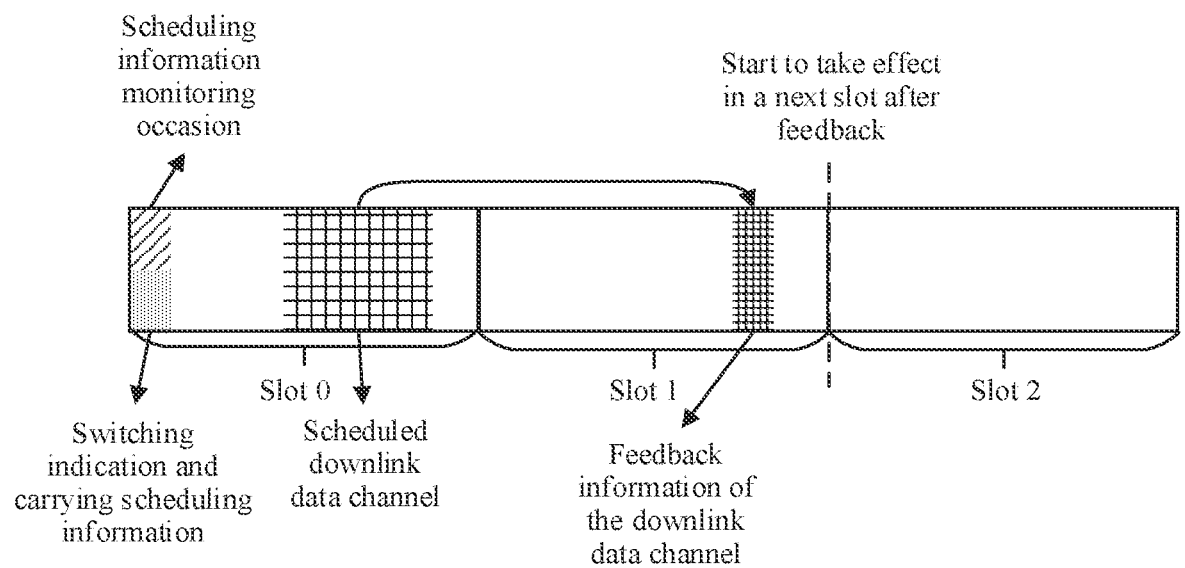
FIG. 7b is a schematic diagram of application time of a scheduling mode according to an embodiment of this application.

For example, each slot includes 14 symbols. As shown in FIG. 7b, a terminal detects, on a first symbol in a slot 0, a PDCCH including a switching indication, a downlink data channel scheduled by using the PDCCH including the switching indication is located in the slot 0, and feedback information of the downlink data channel is located on a twelfth symbol in a slot 1. As shown by a dashed line in FIG. 7b, application time of a second scheduling mode may be a next slot of the slot 1, for example, may be a start moment of a slot 2. Specifically, when the slot includes 14 symbols, the application time of the second scheduling mode may be a start symbol in the slot 2, for example, may be a first symbol, may be a tenth symbol in the slot 2, or may be a fourteenth symbol in the slot 2. Alternatively, when a time length of each symbol is tens of us, the application time of the second scheduling mode may be a start moment of the first symbol in the slot 2, for example, may be a $1^{st}$ us of the first symbol in the slot 2, may be a $10^{th}$ us of the first symbol in the slot 2, or may be a $50^{th}$ us of the first symbol in the slot 2.

(2.3) The application time of the second scheduling mode is a first scheduling information monitoring occasion after a time domain location occupied by the feedback information of the downlink data channel.

Descriptions related to the scheduling information monitoring occasion are described in Manner 1, and details are not described again. It should be noted that, in (2.3), the first scheduling information monitoring occasion after the time domain location occupied by the feedback information of the downlink data channel may be a scheduling information monitoring occasion that appears for the first time after the time domain location occupied by the feedback information of the downlink data channel, or may be any other scheduling information monitoring occasion after the time domain location occupied by the feedback information of the downlink data channel. For example, the first scheduling information monitoring occasion after the time domain location occupied by the feedback information of the downlink data channel may be an $N^{th}$ scheduling information monitoring occasion after the time domain location occupied by the feedback information of the downlink data channel, where N is a positive integer.

To avoid a problem that the data channel cannot be correctly transmitted because the terminal cannot detect the PDCCH used to schedule the data channel, the second scheduling mode starts to take effect when the first scheduling information monitoring occasion after the time domain location occupied by the feedback information of the downlink data channel arrives.

When the first scheduling information monitoring occasion occupies a plurality of symbols, that the application time of the second scheduling mode is the first scheduling information monitoring occasion after the time domain location occupied by the feedback information of the downlink data channel may include: The application time of the second scheduling mode is a start symbol of the first scheduling information monitoring occasion after the time domain location occupied by the feedback information of the downlink data channel, or may be any other symbol of the first scheduling information monitoring occasion after the time domain location occupied by the feedback information of the downlink data channel.

When the first scheduling information monitoring occasion occupies a plurality of symbols, and each symbol occupies dozens of us, that the application time of the second scheduling mode is the first scheduling information monitoring occasion after the time domain location occupied by the feedback information of the downlink data channel may include: The application time of the second scheduling mode is a start moment of a symbol (for example, a start symbol or any other symbol) of the first scheduling information monitoring occasion after the time domain location occupied by the feedback information of the downlink data channel, or the application time of the second scheduling mode is any other moment of a symbol (for example, a start symbol or any other symbol) of the first scheduling information monitoring occasion after the time domain location occupied by the feedback information of the downlink data channel. This is not limited in this application.

Figure 7C:
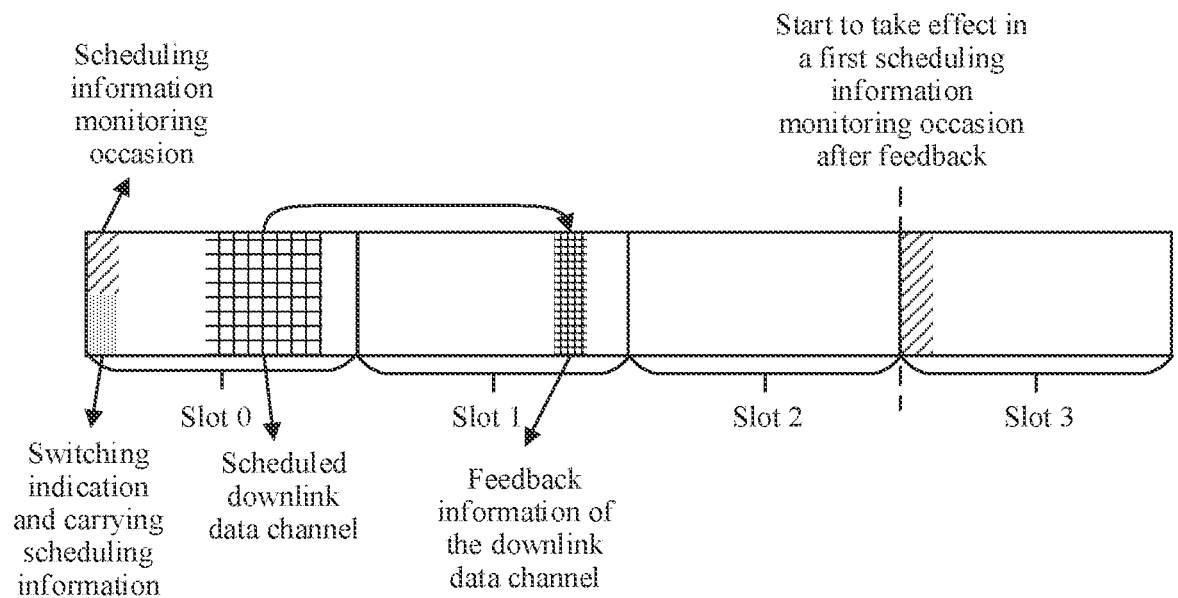
FIG. 7c is a schematic diagram of application time of a scheduling mode according to an embodiment of this application.

For example, as shown in FIG. 7c, a terminal detects, in a first symbol in a slot 0, a PDCCH including a switching indication, a downlink data channel scheduled by using the PDCCH including the switching indication is located in the slot 0, and feedback information of the downlink data channel is located in a twelfth symbol in a slot 1. If a first scheduling information monitoring occasion after a time domain location occupied by the feedback information of the downlink data channel is located in a slot 3. As shown by a dashed line in FIG. 7c, application time of a second scheduling mode may be a start moment or another moment in the slot 3. For example, each slot includes 14 symbols, and the application time of the second scheduling mode may be a first symbol in the slot 3, may be a tenth symbol in the slot 3, or may be a fourteenth symbol in the slot 3. Alternatively, for example, a time length of each symbol is tens of us, and the application time of the second scheduling mode may be a $1^{st}$ us of the first symbol in the slot 3, may be a $10^{th}$ us of the first symbol in the slot 3, or may be a $71^{st}$ us of the first symbol in the slot 3.

Manner 3: The switching indication is included in a PDCCH. In addition to the switching indication, the PDCCH may further include scheduling information. The scheduling information is used to schedule an uplink data channel (for example, a PUSCH).

That the switching indication is included in a PDCCH may also be described as that the switching indication is carried on a PDCCH, the switching indication is sent to the terminal through a PDCCH, the switching indication is included in DCI in a PDCCH and is a field in the DCI, the switching indication is sent to the terminal by using DCI in a PDCCH, the switching indication is DCI in a PDCCH, or the like. This is not limited in this application.

In Manner 3, to ensure reliability of the uplink data channel scheduled by using the PDCCH, the second scheduling mode takes effect after the terminal receives the uplink data channel scheduled by using the PDCCH.

Specifically, the application time of the second scheduling mode may be designed as shown in the following (3.1), (3.2), or (3.3).

(3.1) The application time of the second scheduling mode is a next symbol of a last symbol occupied by the uplink data channel.

The next symbol of the last symbol occupied by the uplink data channel may be a symbol adjacent to the last symbol occupied by the uplink data channel, or may be any symbol after the last symbol occupied by the uplink data channel. This is not limited in this application.

When a time length of a symbol is tens of us, that the application time of the second scheduling mode is the next symbol of the last symbol occupied by the uplink data channel may include: The application time of the second scheduling mode is a start moment of the next symbol of the last symbol occupied by the uplink data channel, or is another moment of the next symbol of the last symbol occupied by the feedback information of a downlink data channel. For example, the application time of the second scheduling mode may be a $Q^{th}$ us of the next symbol of the last symbol occupied by the feedback information of the downlink data channel, where Q is a positive integer.

Figure 8A:
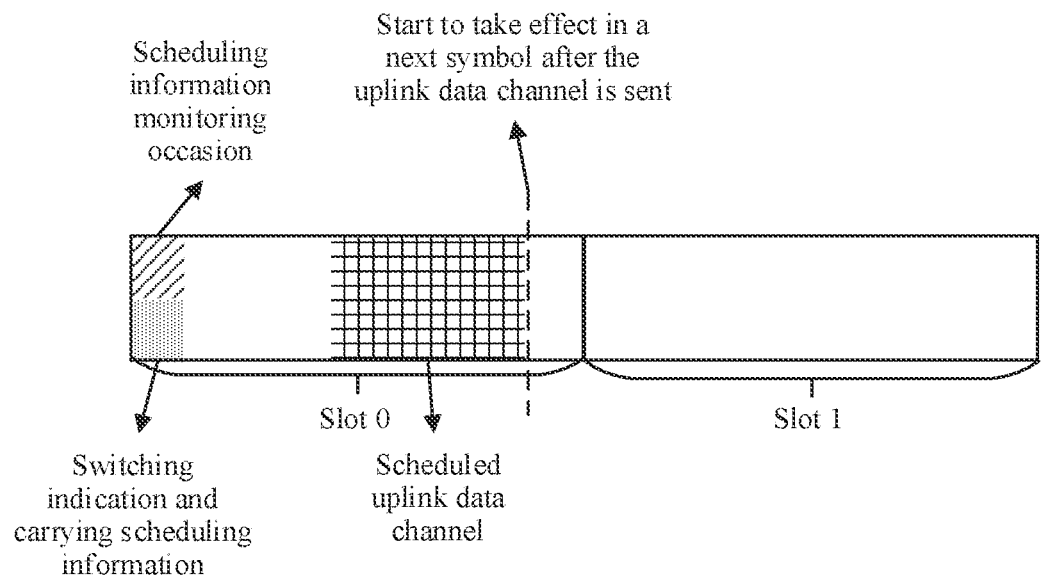
FIG. 8a is a schematic diagram of application time of a scheduling mode according to an embodiment of this application.

For example, each slot includes 14 symbols. As shown in FIG. 8*a*, a terminal detects, on a first symbol in a slot 0, a PDCCH including a switching indication, and an uplink data channel scheduled by using the PDCCH including the switching indication is located in a twelfth symbol in the slot 0. As shown by a dashed line in FIG. 8*a*, application time of a second scheduling mode may be a next symbol after the twelfth symbol in the slot 0, for example, a thirteenth symbol or a fourteenth symbol in the slot 0. For example, the application time of the second scheduling mode is the thirteenth symbol in the slot 0, and a time length of each symbol is 71 us. The application time of the second scheduling mode may be specifically a start moment of the thirteenth symbol in the slot 0, for example, may be a $1^{st}$ us of the thirteenth symbol, may be a $50^{th}$ us of the thirteenth symbol, or may be a $71^{st}$ us of the thirteenth symbol. This is not limited in this application.

(3.2) The application time of the second scheduling mode is a next slot of a slot occupied by the uplink data channel.

The next slot of the slot occupied by the uplink data channel may be a slot after the slot occupied by the uplink data channel and adjacent to the slot occupied by the uplink data channel, or may be any slot after the slot occupied by the uplink data channel. This is not limited in this application.

The slot in this embodiment of this application may include a plurality of symbols, for example, include 12 or 14 symbols. When one slot includes a plurality of symbols, that the application time of the second scheduling mode is the next slot of the slot occupied by the uplink data channel may include: The application time of the second scheduling mode is a start symbol in the next slot of the slot occupied by the uplink data channel, or is any other symbol in the next slot of the slot occupied by the uplink data channel. For example, the application time of the second scheduling mode may be an $R^{th}$ symbol in the next slot of the slot occupied by the uplink data channel, where R is a positive integer.

When the slot occupied by the uplink data channel includes a plurality of symbols, and a time length of each symbol is tens of us, that the application time of the second scheduling mode is the next slot of the slot occupied by the uplink data channel may include: The application time of the second scheduling mode is a start moment of a symbol (for example, a start symbol or any other symbol) in the next slot of the slot occupied by the uplink data channel, or any other moment of a symbol in the next slot of the slot occupied by the uplink data channel. For example, the application time of the second scheduling mode is a $Q^{th}$ us of the symbol in the next slot of the slot occupied by the uplink data channel, where Q is an integer.

Figure 8B:
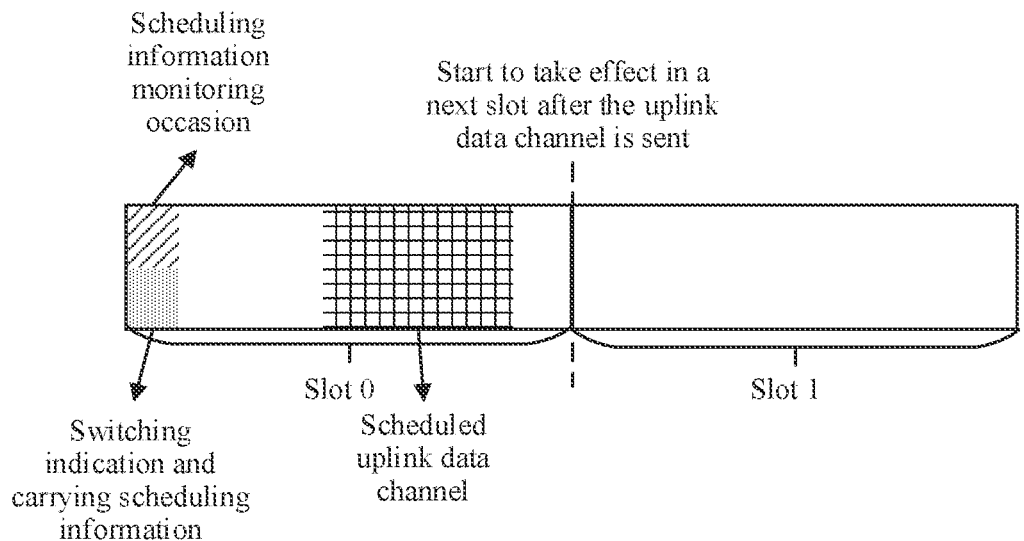
FIG. 8b is a schematic diagram of application time of a scheduling mode according to an embodiment of this application.

For example, each slot includes 14 symbols. As shown in FIG. 8*b*, a terminal detects, on a first symbol in a slot 0, a PDCCH including a switching indication, and an uplink data channel scheduled by using the PDCCH including the switching indication is located in a twelfth symbol in the slot 0. As shown by a dashed line in FIG. 8*b*, application time of a second scheduling mode may be a next slot of a slot 1, for example, may be a start moment of the slot 1. Specifically, when the slot includes 14 symbols, the application time of the second scheduling mode may be a start symbol in the slot 1, for example, may be a first symbol in the slot 1, may be a tenth symbol in the slot 1, or may be a fourteenth symbol in the slot 1. Alternatively, when a time length of each symbol is tens of us, the application time of the second scheduling mode may be a start moment of the first symbol in the slot 1, for example, may be a $1^{st}$ us of the first symbol in the slot 1, may be a $10^{th}$ us of the first symbol in the slot 1, or may be a $71^{st}$ us of the first symbol in the slot 1.

(3.3) The application time of the second scheduling mode is a first scheduling information monitoring occasion after a time domain location occupied by the uplink data channel.

Descriptions related to the scheduling information monitoring occasion are described in Manner 1, and details are not described again. It should be noted that, in (3.3), the first scheduling information monitoring occasion after the time domain location occupied by the uplink data channel may be a scheduling information monitoring occasion that appears for the first time after the time domain location occupied by the uplink data channel, or may be any other scheduling information monitoring occasion after the time domain location occupied by the uplink data channel. For example, the first scheduling information monitoring occasion after the time domain location occupied by the uplink data channel may be an $N^{th}$ scheduling information monitoring occasion after the time domain location occupied by the uplink data channel, where N is a positive integer.

To avoid a problem that the data channel cannot be correctly transmitted because the terminal cannot detect the PDCCH used to schedule the data channel, the second scheduling mode starts to take effect when the first scheduling information monitoring occasion after the time domain location occupied by the uplink data channel arrives.

When the first scheduling information monitoring occasion occupies a plurality of symbols, that the application time of the second scheduling mode is the first scheduling information monitoring occasion after the time domain location occupied by the uplink data channel may include: The application time of the second scheduling mode is a start symbol of the first scheduling information monitoring occasion after the time domain location occupied by the uplink data channel, or may be any other symbol of the first scheduling information monitoring occasion after the time domain location occupied by the uplink data channel. Alternatively, when the first scheduling information monitoring occasion occupies a plurality of symbols, and each symbol occupies dozens of us, that the application time of the second scheduling mode is the first scheduling information monitoring occasion after the time domain location occupied by the uplink data channel may include: The application time of the second scheduling mode is a start moment of a symbol (for example, a start symbol or any other symbol) of the first scheduling information monitoring occasion after the time domain location occupied by the uplink data channel, or the application time of the second scheduling mode is any other moment of a symbol (for example, a start symbol or any other symbol) of the first scheduling information monitoring occasion after the time domain location occupied by the uplink data channel. This is not limited in this application.

Figure 8C:
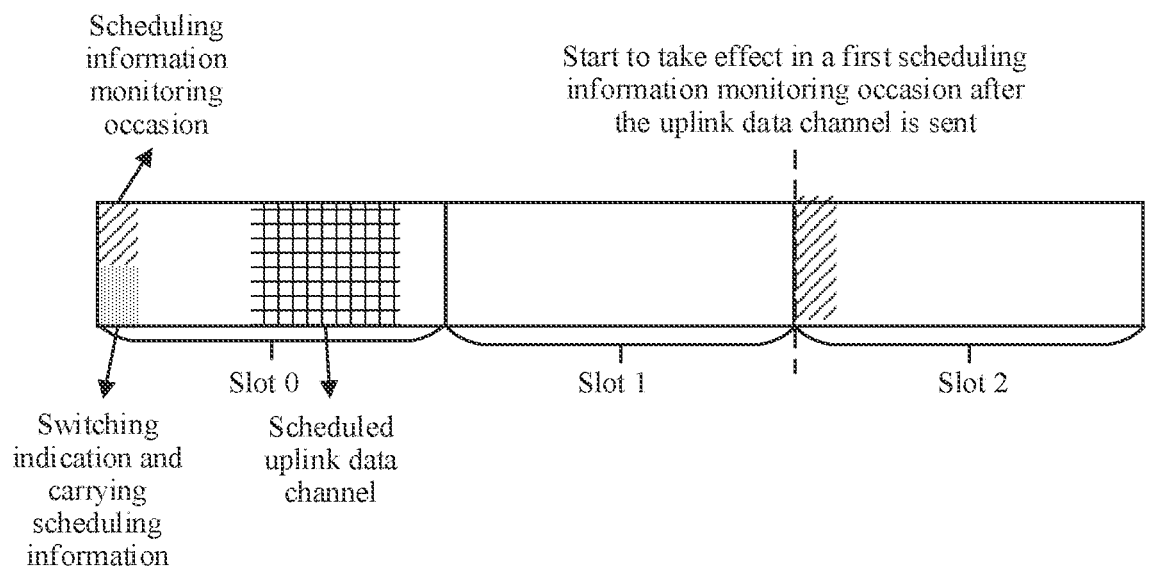
FIG. 8c is a schematic diagram of application time of a scheduling mode according to an embodiment of this application.

For example, as shown in FIG. 8c, a terminal detects, on a first symbol in a slot 0, a PDCCH including a switching indication, an uplink data channel scheduled by using the PDCCH including the switching indication is located in a twelfth symbol in the slot 0, and a first scheduling information monitoring occasion after a time domain location occupied by the uplink data channel is located in a slot 2. As shown by a dashed line in FIG. 8c, application time of a second scheduling mode may be a start moment or another moment of the slot 2. For example, each slot includes 14 symbols, and the application time of the second scheduling mode may be a first symbol in the slot 2, may be a tenth symbol in the slot 2, or may be a fourteenth symbol in the slot 2. Alternatively, for example, a time length of each symbol is tens of us, and the application time of the second scheduling mode may be a $1^{st}$ us of the first symbol in the slot 2, may be a $10^{th}$ us of the first symbol in the slot 2, or may be a $71^{st}$ us of the first symbol in the slot 2.

It should be noted that, in the foregoing Manner 2 or Manner 3, the application time of the second scheduling mode is described by using an example in which the PDCCH including the switching indication is used to schedule the data channel. It may be understood that, when the PDCCH including the switching indication is further used to trigger a reference signal, for example, trigger a CSI-RS and/or an SRS, in order not to affect triggering of the CSI-RS and/or the SRS, the second scheduling mode needs to take effect after the CSI-RS and/or the SRS is triggered. For example, the application time of the second scheduling mode may be a next symbol of a last symbol occupied by the reference signal triggered by using the PDCCH, the application time of the second scheduling mode may be a next slot of a slot occupied by the reference signal triggered by using the PDCCH, or the application time of the second scheduling mode may be a first scheduling information monitoring occasion after a time domain location occupied by the reference signal triggered by using the PDCCH.

Manner 4: The switching indication is included in a PDCCH, and the PDCCH is in an $N^{th}$ slot. For example, the PDCCH may occupy one or more symbols in the $N^{th}$ slot, where N is an integer. The PDCCH including the switching indication may be used to schedule a data channel and/or a reference signal, or may not be used to schedule a data channel and/or a reference signal. This is not limited in this application.

In Manner 4, the application time of the second scheduling mode is related to a speed of processing the PDCCH by the terminal. The speed of processing the PDCCH by the terminal is related to one or more values of a minimum value of K0, a minimum value of K2, a minimum value of an aperiodic CSI-RS triggering offset, and a minimum value of an aperiodic SRS triggering offset that correspond to the PDCCH. For example, the speed of processing the PDCCH by the terminal is related to the minimum value of K0 corresponding to the PDCCH. When the minimum value of K0 is relatively large, the speed of processing the PDCCH by the terminal is relatively slow, and the application time of the second scheduling mode is relatively later. When the minimum value of K0 is relatively small, the speed of processing the PDCCH by the terminal is relatively high, and the application time of the second scheduling mode is relatively early.

Specifically, the application time of the second scheduling mode may be designed as shown in the following (4.1), or (4.2).

(4.1) The application time of the second scheduling mode is an $(N+M)^{th}$ slot.

N may be used to indicate a location of a slot occupied by the PDCCH. Specifically, N may be an index corresponding to the slot occupied by the PDCCH. For example, if the slot occupied by the PDCCH is a slot 0, N is 0.

For example, when each slot includes a plurality of symbols, that the application time of the second scheduling mode is the $(N+M)^{th}$ slot may include: The application time of the second scheduling mode is a start symbol in the $(N+M)^{th}$ slot, or any other symbol in the $(N+M)^{th}$ slot, for example, may be an $R^{th}$ symbol in the $(N+M)^{th}$ slot, where R is an integer. Alternatively, when a time length of each symbol is tens of us, that the application time of the second scheduling mode is the $(N+M)^{th}$ slot may include: The application time of the second scheduling mode is a start moment of a symbol (for example, a start symbol or any other symbol) in the $(N+M)^{th}$ slot, or any other moment of a symbol in the $(N+M)^{th}$ slot, for example, may be a $Q^{th}$ us of the symbol in the $(N+M)^{th}$ slot, where Q is an integer.

(4.2) The application time of the second scheduling mode is not earlier than a first scheduling information monitoring occasion of an $(N+M)^{th}$ slot.

Descriptions related to the scheduling information monitoring occasion are described in Manner 1, and details are not described again.

When the first scheduling information monitoring occasion occupies a plurality of symbols, that the application time of the second scheduling mode is not earlier than the first scheduling information monitoring occasion of the $(N+M)^{th}$ slot may include: The application time of the second scheduling mode is not earlier than a start symbol of the first scheduling information monitoring occasion of the $(N+M)^{th}$ slot, or not earlier than any other symbol of the first scheduling information monitoring occasion of the $(N+M)^{th}$ slot. Alternatively, when the first scheduling information monitoring occasion occupies a plurality of symbols, and each symbol occupies dozens of us, that the application time of the second scheduling mode is not earlier than the first scheduling information monitoring occasion of the $(N+M)^{th}$ slot may include: The application time of the second scheduling mode is not earlier than a start moment of a symbol (for example, a start symbol or any other symbol) of the first scheduling information monitoring occasion of the $(N+M)^{th}$ slot, or the application time of the second scheduling mode is not earlier than any other moment of a symbol (for example, a start symbol or any other symbol) of the first scheduling information monitoring occasion of the $(N+M)^{th}$ slot. This is not limited in this application.

M is determined based on an applicable minimum value (min value) of a slot offset when the terminal receives the switching indication, and the slot offset is a slot offset between a slot occupied by a PDCCH used to schedule a data channel (and/or a reference signal) and a slot occupied by a data channel (and/or a reference signal) scheduled by using the PDCCH used to schedule a data channel. For example, the minimum value may be a minimum value of K0, a minimum value of K2, a minimum value of an aperiodic CSI-RS triggering offset, or a minimum value of an aperiodic SRS triggering offset. A slot corresponding to M is not earlier than a slot corresponding to the minimum value. For example, the minimum value may be indicated to the terminal with reference to a TDRA table configured by the network device for the terminal. For example, the network device may configure the TDRA table for the terminal, and indicate a plurality of indexes in the TDRA table to the terminal, so that the terminal determines the minimum value from a plurality of values that are in the TDRA table and that correspond to the plurality of indexes. For example, the TDRA table configured by the network device for the terminal is shown in Table 1. The network device indicates, to the terminal, that first three rows: an index 0, an index 1, and an index 2 in the TDRA table all valid. Therefore, Table 1 is queried to determine that the minimum value is 0.

Specifically, a relationship between M and the minimum value may be described as shown in (4.2.1), (4.2.2), or (4.2.3).

(4.2.1) M is equal to the minimum value.

When the application time of the second scheduling mode is defined by using a slot as a granularity, the application time of the second scheduling mode may be an $(N+M)^{th}$ slot after an $N^{th}$ slot. For example, if a slot occupied by the PDCCH including the switching indication is a slot 0, and the minimum value is 2, the application time of the second scheduling mode is a slot 2.

It should be noted that, when each slot includes a plurality of symbols, and the application time of the second scheduling mode is defined by using a symbol as a granularity, M may be equal to a product of the minimum value and (a quantity of symbols included in each slot). In this case, the application time of the second scheduling mode may be a symbol that is after a last symbol occupied by the PDCCH including the switching indication and whose offset from the last symbol occupied by the PDCCH including the switching indication is the product of the minimum value and (the quantity of symbols included in each slot). For example, if the PDCCH including the switching indication occupies a slot 0, the last symbol occupied by the PDCCH is a fifth symbol in the slot 0, the minimum value is 2, and each slot includes 14 symbols, there is an offset of 28 symbols between the application time of the second scheduling mode and the fifth symbol in the slot 0. Therefore, the application time of the second scheduling mode may be a tenth symbol in a slot 2.

(4.2.2) M is equal to a sum of the minimum value and a first value.

The first value may be referred to as an additional application delay. The first value may be in a unit of a slot, and the first value may be one slot. Alternatively, the first value may be in a unit of a symbol. For example, the first value may be 14 symbols or 12 symbols.

When the application time of the second scheduling mode is defined by using a slot as a granularity, the first value is in a unit of a slot, and the application time of the second scheduling mode may be an (N+minimum value+first value) $^{th}$ slot after an $N^{th}$ slot. For example, if a slot occupied by the PDCCH including the switching indication is a slot 0, and the minimum value is 2, the application time of the second scheduling mode is a slot 3.

It should be noted that, when each slot includes a plurality of symbols, and the application time of the second scheduling mode is defined by using a symbol as a granularity, the first value is in a unit of a symbol, and M may be equal to a sum of the first value and a product of the minimum value and (a quantity of symbols included in each slot). In this case, the application time of the second scheduling mode may be a symbol that is after a last symbol occupied by the PDCCH including the switching indication and whose offset from the last symbol occupied by the PDCCH including the switching indication is the sum of the first value and the product of the minimum value and (the quantity of symbols included in each slot). For example, if the PDCCH including the switching indication occupies a slot 0, the last symbol occupied by the PDCCH is a fifth symbol in the slot 0, the minimum value is 2, each slot includes 14 symbols, and the first value is 12 symbols, there is an offset of 40 symbols between the application time of the second scheduling mode and the fifth symbol in the slot 0. Therefore, the application time of the second scheduling mode may be an eighth symbol in a slot 3.

(4.2.3) The slot corresponding to M is not earlier than the slot corresponding to the minimum value, and the slot corresponding to M is not earlier than a slot corresponding to a second value. Specifically, M may be a maximum value between the second value and the minimum value.

The second value may be referred to as a minimum switching value, and the second value is related to a capability of demodulating the PDCCH by the terminal. A stronger demodulation capability of the terminal means a smaller second value, and a weaker demodulation capability of the terminal means a larger second value. The second value is also related to a subcarrier spacing currently configured for the terminal. A smaller subcarrier spacing means a longer slot length and a smaller second value. A larger subcarrier spacing means a shorter slot length and a larger second value.

The second value may be in a unit of a slot. For example, the second value may be one (slot) or another value. Alternatively; the first value may be in a unit of a symbol. For example, the first value may be 14 symbols or 12 symbols.

When the application time of the second scheduling mode is defined by using a slot as a granularity, the second value is in a unit of a slot, and the application time of the second scheduling mode may be a max (the second value, the minimum value)$^{th}$ slot after an $N^{th}$ slot. For example, if a slot occupied by the PDCCH including the switching indication is a slot 0, the minimum value is 2, and the second value is 1, the application time of the second scheduling mode is a slot 2.

It should be noted that, when each slot includes a plurality of symbols, and the application time of the second scheduling mode is defined by using a symbol as a granularity, the second value is in a unit of a symbol, and M may be equal to a max (the second value, a product of the minimum value and (a quantity of symbols included in each slot)). In this case, the application time of the second scheduling mode may be a symbol that is after a last symbol occupied by the PDCCH including the switching indication and whose offset from the last symbol occupied by the PDCCH including the switching indication is the max (the second value, the product of the minimum value and (the quantity of symbols included in each slot)). For example, if the PDCCH including the switching indication occupies a slot 0, the last symbol occupied by the PDCCH is a fifth symbol in the slot 0, the minimum value is 2, each slot includes 14 symbols, and the second value is 12 symbols, there is an offset of 28 symbols between the application time of the second scheduling mode and the fifth symbol in the slot 0. Therefore, the application time of the second scheduling mode may be a tenth symbol in a slot 2.

Figure 9A:
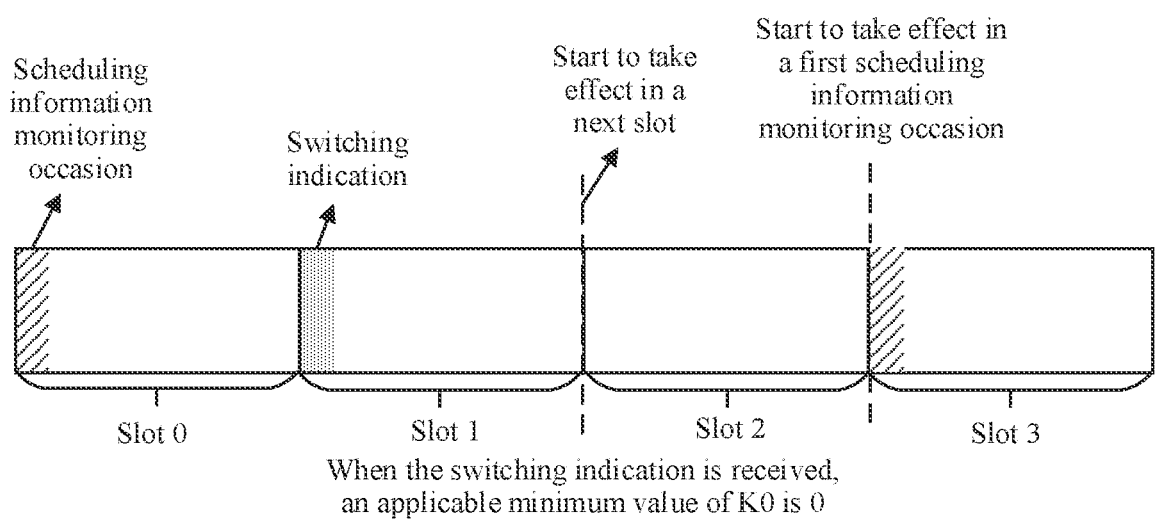
FIG. 9a is a schematic diagram of application time of a scheduling mode according to an embodiment of this application.

For example, as shown in FIG. 9a, a terminal detects scheduling information in a slot 0 and a slot 3, and receives, on a tenth symbol in a slot 1, a PDCCH including a switching indication. When the terminal receives the PDCCH including the switching indication, an applicable minimum value of K0 is 0. Assuming that a second value uses a slot as a granularity, the second value is 1 (a quantity of symbols), and M=max(1, minimum value of K0)=1. Therefore, application time of a second scheduling mode may be a $(1+1)^{nd}$ slot, namely, the slot 2. Alternatively, application time of a second scheduling mode takes effect not earlier than a first scheduling information monitoring occasion of the slot 2. Alternatively, assuming that M=minimum value of K0+1=1, application time of a second scheduling mode may be a $(1+1)^{nd}$ slot, namely, the slot 2. Alternatively, application time of a second scheduling mode takes effect not earlier than a first scheduling information monitoring occasion of the slot 2. Assuming that a second value uses a symbol as a granularity, application time of a second scheduling mode uses a symbol as a granularity, the second value are five symbols, a first value are eight symbols, and each slot includes 14 symbols, M=max (5, 0)=5. The application time of the second scheduling mode may be a first symbol in the slot 2. Alternatively, assuming that M=8+product of a minimum value of K0 and a quantity of symbols included in each slot=8, the application time of the second scheduling mode may be a fourth symbol in the slot 2.

Figure 9B:
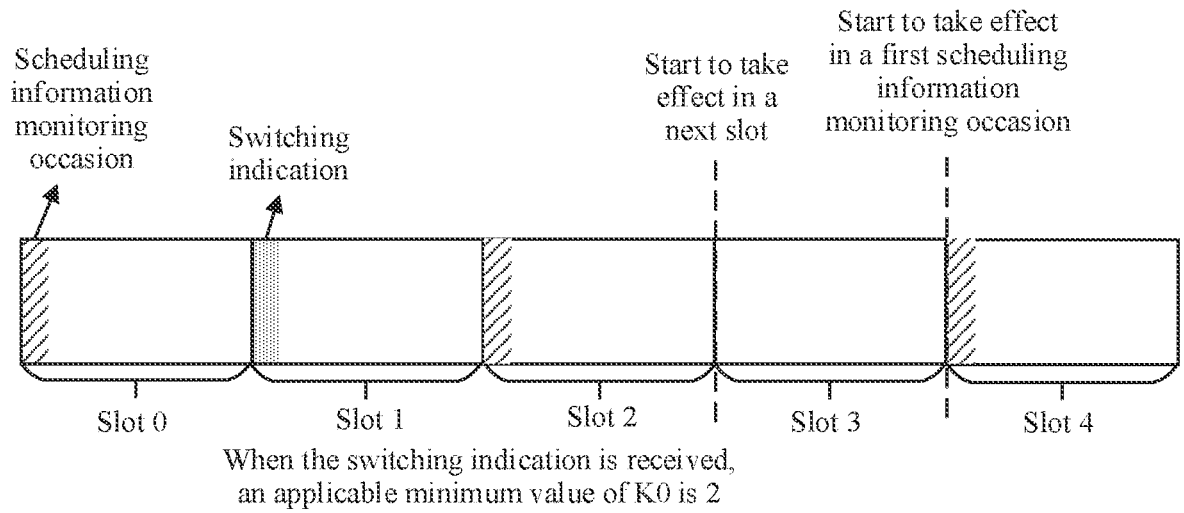
FIG. 9b is a schematic diagram of application time of a scheduling mode according to an embodiment of this application.

For another example, as shown in FIG. 9b, a terminal detects scheduling information in a slot 0, a slot 2 and a slot 4, and receives, on a tenth symbol in a slot 1, a PDCCH including a switching indication. When the terminal receives the PDCCH including the switching indication, an applicable minimum value of K0 is 2. Assuming that a second value uses a slot as a granularity, the second value is 1, and M=max(1, minimum value of K0)=2. Therefore, application time of a second scheduling mode may be a $(1+2)^{rd}$ slot, namely, the slot 3. Alternatively, application time of a second scheduling mode takes effect not earlier than a first scheduling information monitoring occasion of the slot 3.

Alternatively, assuming that M=minimum value of K0+1=3, application time of a second scheduling mode may be a $(1+2)^{rd}$ slot, namely, the slot 3. Alternatively, application time of a second scheduling mode takes effect not earlier than a first scheduling information monitoring occasion in the slot 3. Assuming that a second value uses a symbol as a granularity, application time of a second scheduling mode uses a symbol as a granularity, the second value are five symbols, a first value are eight symbols, and each slot includes 14 symbols, M=max (5, 2×14)=28. The application time of the second scheduling mode may be a tenth symbol in the slot 3. Alternatively, assuming that M=8+product of a minimum value of K0 and a quantity of symbols included in each slot=28+8=36, the application time of the second scheduling mode may be a fourth symbol in the slot 4.

It should be noted that, in Manner 4, when the PDCCH including the switching indication is not used to schedule the data channel and/or the reference signal, the application time of the second scheduling mode is irrelevant to the time domain location occupied by the feedback information of the PDCCH, or the application time of the second scheduling mode is related to the time domain location occupied by the feedback information of the PDCCH. The application time of the second scheduling mode is subject to latest time in the application time determined in (4.1) or (4.2) in Manner 4 and the time domain location occupied by the feedback information of the PDCCH. Second scheduling time takes effect after the latest time.

When the PDCCH including the switching indication is used to schedule the downlink data channel, the application time of the second scheduling mode is irrelevant to the time domain occupied by the feedback information of the downlink data channel scheduled by using the PDCCH. Alternatively, the application time of the second scheduling mode is related to the time domain location occupied by the feedback information of the downlink data channel scheduled by using the PDCCH. The application time of the second scheduling mode is subject to latest time in the application time determined in (4.1) or (4.2) in Manner 4 and the time domain location occupied by the feedback information of the downlink data channel scheduled by using the PDCCH. Second scheduling time takes effect after the latest time.

When the PDCCH including the switching indication is used to schedule the uplink data channel, the application time of the second scheduling mode is irrelevant to a time domain location occupied by the uplink data channel scheduled by using the PDCCH. Alternatively, the application time of the second scheduling mode is related to a time domain location occupied by the uplink data channel scheduled by using the PDCCH. The application time of the second scheduling mode is subject to latest time in the application time determined in (4.1) or (4.2) in Manner 4 and the time domain location occupied by the uplink data channel scheduled by using the PDCCH. Second scheduling time takes effect after the latest time.

Manner 5: The switching indication is included in a media access control control element (media access control control element, MAC CE), and the MAC CE is included in a PDSCH.

That the MAC CE is included in a PDSCH may also be described as that the MAC CE is carried on a PDSCH, or the MAC CE is sent to the terminal through a PDSCH, or the like. This is not limited in this application.

In Manner 5, to ensure that the terminal receives the MAC CE, and further learns, based on the received MAC CE, a scheduling mode indicated by using the switching indication, the second scheduling mode needs to take effect after a slot occupied by feedback information of the PDSCH. For example, the application time of the second scheduling mode is later than the slot occupied by the feedback information of the PDSCH, and an offset between the application time of the second scheduling mode and the slot occupied by the feedback information of the PDSCH is first duration. Alternatively, the application time of the second scheduling mode is after first duration that is after the slot occupied by the feedback information of the PDSCH.

The feedback information of the PDSCH is used to indicate whether the terminal correctly receives the PDSCH. The first duration is related to time at which a physical layer of the terminal receives the PDSCH and transmits the MAC CE included in the PDSCH to a MAC layer of the terminal. For example, the first duration may be greater than or equal to the time at which the physical layer of the terminal receives the PDSCH and transmits the MAC CE included in the PDSCH to the MAC layer of the terminal. For example, the first duration may be 3 ms.

Manner 6: The application time of the second scheduling mode is after all data channels scheduled by using scheduling information that is not later than the switching indication are transmitted, to ensure normal transmission of the data channels.

In Manner 6, the switching indication may be included in a PDCCH. The PDCCH may be used to schedule a data channel and/or a reference signal, or may not be used to schedule a data channel and/or a reference signal. This is not limited m this application. The data channel may be a downlink data channel or an uplink data channel, and the reference signal may be a CSI-RS or an SRS.

Specifically, for example, the scheduling information that is not later than the switching indication is first scheduling information, and the application time of the second scheduling mode may be designed as described in (6.1), (6.2), or (6.3).

(6.1) The application time of the second scheduling mode is a next symbol of a last symbol occupied by a data channel scheduled by using the first scheduling information.

The next symbol of the last symbol occupied by the data channel scheduled by using the first scheduling information may be a symbol adjacent to the last symbol occupied by the data channel scheduled by using the first scheduling information, or may be any symbol after the last symbol occupied by the data channel scheduled by using the first scheduling information. This is not limited in this application.

The symbol in this embodiment of this application has a specific length, and a time length of one symbol may be tens of us. For example, the time length of the symbol may be 71 us. When a time length of a symbol is tens of us, that the application time of the second scheduling mode is the next symbol of the last symbol occupied by the data channel scheduled by using the first scheduling information may include: The application time of the second scheduling mode is a start moment of the next symbol of the last symbol occupied by the data channel scheduled by using the first scheduling information, or is another moment of the next symbol of the last symbol occupied by the data channel scheduled by using the first scheduling information. For example, the application time of the second scheduling mode may be a $Q^{th}$ us of the next symbol of the last symbol occupied by the data channel scheduled by using the first scheduling information, where Q is a positive integer.

Figure 10A:
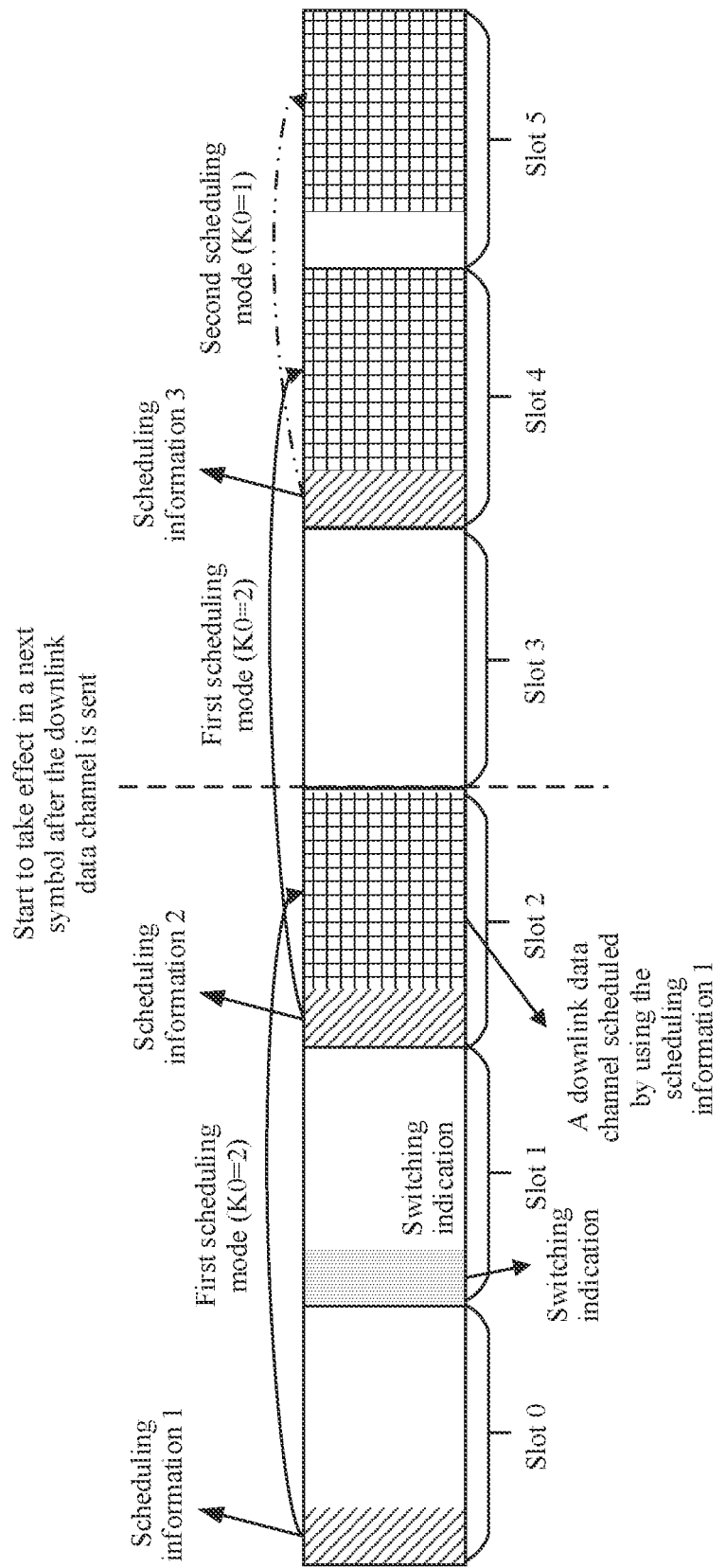
FIG. 10a is a schematic diagram of application time of a scheduling mode according to an embodiment of this application.

For example, each slot includes 14 symbols, both a first scheduling mode and a second scheduling mode are cross-slot scheduling, K0 in the first scheduling mode is 2, and K0 in the second scheduling mode is 1. For example, scheduling information is used to schedule a downlink data channel. As shown in FIG. 10a, a terminal detects a switching indication in a slot 1. There is scheduling information 1 before the switching indication (including a time domain location at which the switching indication is located). The scheduling information 1 is located in a slot 0, and a data channel invoked by using the scheduling information 1 is located in a fifth symbol to a fourteenth symbol in a slot 2. As shown by a dashed line in FIG. 10a, application time of the second scheduling mode may be a next symbol after the fourteenth symbol in the slot 2, for example, may be a first symbol in a slot 3. For example, a time length of each symbol is 71 us. The application time of the second scheduling mode may be specifically a start moment of the first symbol in the slot 3, for example, a $1^{st}$ us of the first symbol in the slot 3, a $50^{th}$ us of the first symbol in the slot 3, or a $71^{st}$ us of the first symbol in the slot 3. This is not limited in this application. Before a location indicated by the dashed line in FIG. 10a, the first scheduling mode is used to schedule the downlink data channel. For example, before the dashed line, the scheduling information 1 is in the slot 0, the downlink data channel scheduled by using the scheduling information 1 is received in the slot 2, and a downlink data channel scheduled by using scheduling information 2 is received in a slot 4. After the dashed line, a downlink data channel scheduled by using scheduling information 3 is received in a slot 5.

(6.2) The application time of the second scheduling mode is a next slot of a slot occupied by a data channel scheduled by using the first scheduling information.

The next slot of the slot occupied by the data channel scheduled by using the first scheduling information may be a slot that is after the slot occupied by the data channel scheduled by using the first scheduling information and that is adjacent to the slot occupied by the data channel scheduled by using the first scheduling information, or may be any slot after the slot occupied by the data channel scheduled by using the first scheduling information. This is not limited in this application.

The slot in this embodiment of this application may include a plurality of symbols. For example, one slot may include 12 or 14 symbols. When one slot includes a plurality of symbols, that the application time of the second scheduling mode is the next slot of the slot occupied by the data channel scheduled by using the first scheduling information may include: The application time of the second scheduling mode is a start symbol in the next slot of the slot occupied by the data channel scheduled by using the first scheduling information, or another symbol in the next slot of the slot occupied by the data channel scheduled by using the first scheduling information. For example, the application time of the second scheduling mode is an $R^{th}$ symbol in the next slot of the slot occupied by the data channel scheduled by using the first scheduling information, where R is a positive integer. Alternatively, when one slot includes a plurality of symbols, and a time length of each symbol is dozens of us, that the application time of the second scheduling mode is the next slot of the slot occupied by the data channel scheduled by using the first scheduling information may include: The application time of the second scheduling mode is a start moment of a symbol (a start symbol or any other symbol) in the next slot of the slot occupied by the data channel scheduled by using the first scheduling information, or the application time of the second scheduling mode may be any other moment of a symbol (a start symbol or any other symbol) in the next slot of the slot occupied by the data channel scheduled by using the first scheduling information.

For example, the application time of the second scheduling mode is a $Q^{th}$ us of the symbol (the start symbol or any other symbol) in the next slot of the slot occupied by the data channel scheduled by using the first scheduling information, where Q is an integer.

Figure 10B:
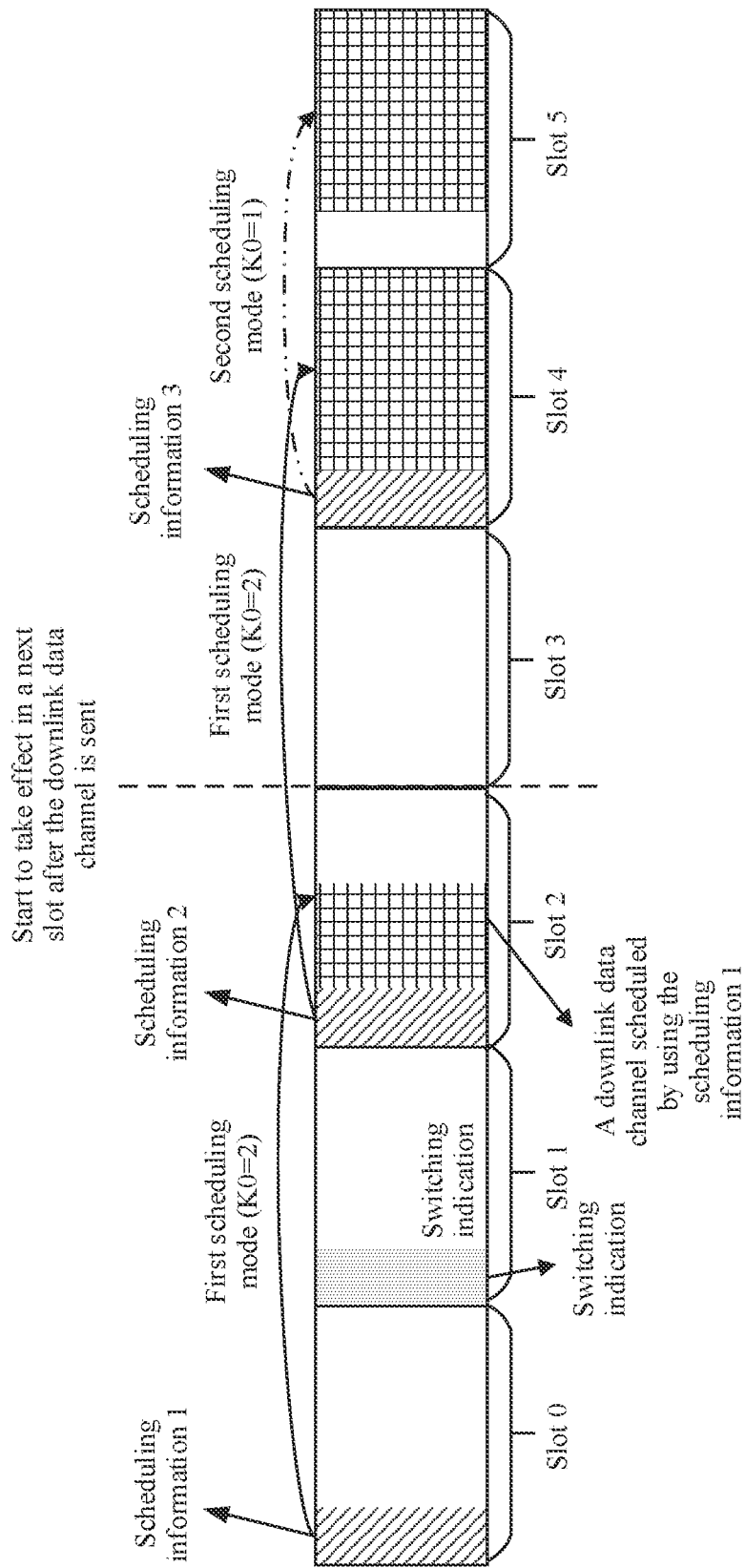
FIG. 10b is a schematic diagram of application time of a scheduling mode according to an embodiment of this application.

For example, each slot includes 14 symbols, both a first scheduling mode and a second scheduling mode are cross-slot scheduling, K0 in the first scheduling mode is 2, and K0 in the second scheduling mode is 1. For example, scheduling information is used to schedule a downlink data channel. As shown in FIG. 10b, a terminal detects a switching indication in a slot 1. There is scheduling information 1 before the switching indication (including a time domain location at which the switching indication is located). The scheduling information 1 is located in a slot 0, and a data channel invoked by using the scheduling information 1 is located in a fifth symbol to a tenth symbol in a slot 2. As shown by a dashed line in FIG. 10b, application time of the second scheduling mode may be a next slot of the slot 2, for example, may be a start moment of a slot 3. Specifically, when the slot includes 14 symbols, the application time of the second scheduling mode may be a start symbol in the slot 3, for example, may be a first symbol in the slot 3, may be a tenth symbol in the slot 3, or may be a fourteenth symbol in the slot 3. Alternatively, when a time length of each symbol is tens of us, the application time of the second scheduling mode may be a start moment of the first symbol in the slot 3, for example, may be a $1^{st}$ us of the first symbol in the slot 3, may be a $10^{th}$ us of the first symbol in the slot 3, or may be a $71^{st}$ us of the first symbol in the slot 3. Before a location indicated by the dashed line in FIG. 10b, the first scheduling mode is used to schedule the downlink data channel. For example, before the dashed line, the scheduling information 1 is in the slot 0, the downlink data channel scheduled by using the scheduling information 1 is received in the slot 2, and a downlink data channel scheduled by using scheduling information 2 is received in a slot 4. After the dashed line, a downlink data channel scheduled by using scheduling information 3 is received in a slot 5.

(6.3) The application time of the second scheduling mode is a first scheduling information monitoring occasion after a time domain location occupied by a data channel scheduled by using the first scheduling information.

Descriptions related to the scheduling information monitoring occasion are described in Manner 1, and details are not described again. It should be noted that, in (6.3), the first scheduling information monitoring occasion after the time domain location occupied by the data channel scheduled by using the first scheduling information may be a scheduling information monitoring occasion that appears for the first time after the time domain location occupied by the data channel scheduled by using the first scheduling information, or may be any other scheduling information monitoring occasion after the time domain location occupied by the data channel scheduled by using the first scheduling information. For example, the first scheduling information monitoring occasion after the time domain location occupied by the data channel scheduled by using the first scheduling information may be an $N^{th}$ scheduling information monitoring occasion after the time domain location occupied by the data channel scheduled by using the first scheduling information, where N is a positive integer.

To avoid a problem that a data channel cannot be correctly transmitted because a terminal cannot detect a PDCCH used to schedule the data channel, the second scheduling mode starts to take effect when the first scheduling information monitoring occasion after the time domain location occupied by the data channel scheduled by using the first scheduling information arrives.

When the first scheduling information monitoring occasion occupies a plurality of symbols, that the application time of the second scheduling mode is the first scheduling information monitoring occasion after the time domain location occupied by the data channel scheduled by using the first scheduling information may include: The application time of the second scheduling mode is a start symbol of the first scheduling information monitoring occasion after the time domain location occupied by the data channel scheduled by using the first scheduling information, or may be any other symbol in the first scheduling information monitoring occasion after the time domain location occupied by the data channel scheduled by using the first scheduling information. Alternatively, when the first scheduling information monitoring occasion occupies a plurality of symbols, and each symbol occupies dozens of us, that the application time of the second scheduling mode is the first scheduling information monitoring occasion after the time domain location occupied by the data channel scheduled by using the first scheduling information may include: The application time of the second scheduling mode is a start moment of a symbol (for example, a start symbol or any other symbol) of the first scheduling information monitoring occasion after the time domain location occupied by the data channel scheduled by using the first scheduling information, or the application time of the second scheduling mode is any other moment of a symbol (for example, a start symbol or any other symbol) of the first scheduling information monitoring occasion after the time domain location occupied by the data channel scheduled by using the first scheduling information. This is not limited in this application.

Figure 10C:
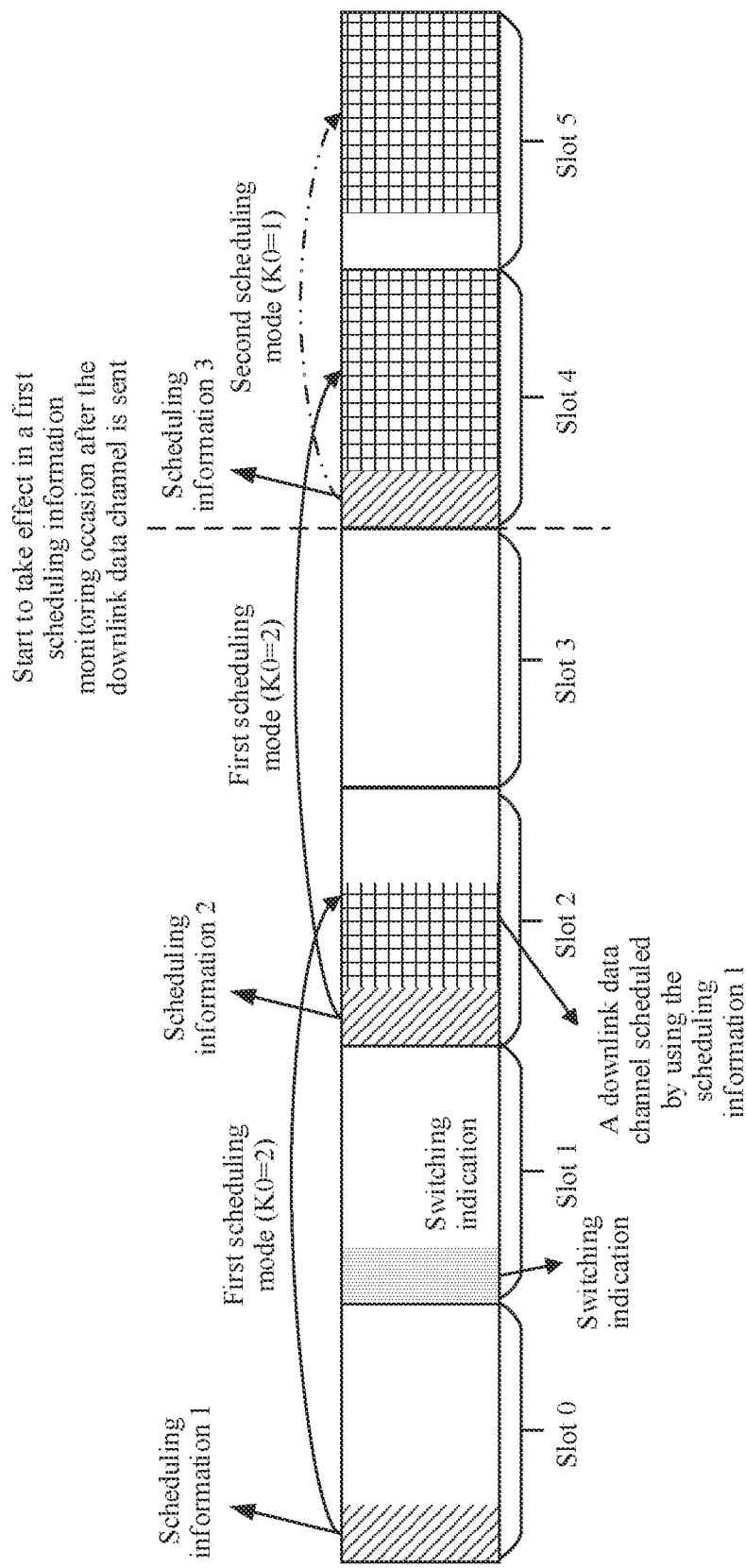
FIG. 10c is a schematic diagram of application time of a scheduling mode according to an embodiment of this application.

For example, each slot includes 14 symbols, both a first scheduling mode and a second scheduling mode are cross-slot scheduling, K0 in the first scheduling mode is 2, and K0 in the second scheduling mode is 1. For example, scheduling information is used to schedule a downlink data channel. As shown in FIG. 10c, a terminal detects a switching indication in a slot 1. There is scheduling information 1 before the switching indication (including a time domain location at which the switching indication is located). The scheduling information 1 is located in a slot 0, and a data channel invoked by using the scheduling information 1 is located in a fifth symbol to a tenth symbol in a slot 2. A first scheduling information monitoring occasion of a time domain location occupied by the data channel scheduled by using the scheduling information 1 is located in a slot 4. As shown by a dashed line in FIG. 10c, application time of the second scheduling mode may be a start moment of the slot 4. Specifically, when the slot includes 14 symbols, the application time of the second scheduling mode may be a start symbol in the slot 4, for example, may be a first symbol in the slot 4, may be a tenth symbol in the slot 4, or may be a fourteenth symbol in the slot 4. Alternatively, when a time length of each symbol is tens of us, the application time of the second scheduling mode may be a start moment of the first symbol in the slot 4, for example, may be a $1^{st}$ us of the first symbol in the slot 4, may be a $10^{th}$ us of the first symbol in the slot 4, or may be a $71^{st}$ us of the first symbol in the slot 4. Before a location indicated by the dashed line in FIG. 10c, the first scheduling mode is used to schedule the downlink data channel. For example, before the dashed line, the scheduling information 1 is in the slot 0, the downlink data channel scheduled by using the scheduling information 1 is received in the slot 2, and a downlink data channel scheduled by using scheduling information 2 is received in a slot 4. After the dashed line, a downlink data channel scheduled by using scheduling information 3 is received in a slot 5.

In Manner 6, when the scheduling information is used to schedule the downlink data channel, to ensure transmission reliability of the downlink data channel, after the terminal sends the feedback information of the downlink data channel scheduled by using the scheduling information, the second scheduling mode takes effect. Specifically, the application time of the second scheduling mode may be the described in (6.4), (6.5), or (6.6):

(6.4) The application time of the second scheduling mode is a next symbol of a last symbol occupied by feedback information of a downlink data channel scheduled by using the first scheduling information.

The next symbol of the last symbol occupied by the feedback information of the downlink data channel scheduled by using the first scheduling information may be a symbol adjacent to the last symbol occupied by the feedback information of the downlink data channel scheduled by using the first scheduling information, or may be any symbol after the last symbol occupied by the feedback information of the downlink data channel scheduled by using the first scheduling information. This is not limited in this application.

The symbol in this embodiment of this application has a specific length, and a time length of one symbol may be tens of us. For example, the time length of the symbol may be 71 us. When a time length of a symbol is tens of us, that the application time of the second scheduling mode is the next symbol of the last symbol occupied by the feedback information of the downlink data channel scheduled by using the first scheduling information may include: The application time of the second scheduling mode is a start moment of the next symbol of the last symbol occupied by the feedback information of the downlink data channel scheduled by using the first scheduling information, or is any other moment of the next symbol of the last symbol occupied by the feedback information of the downlink data channel scheduled by using the first scheduling information. For example, the application time of the second scheduling mode may be a $Q^{th}$ us of the next symbol of the last symbol occupied by the feedback information of the downlink data channel scheduled by using the first scheduling information, where Q is a positive integer.

Figure 11A:
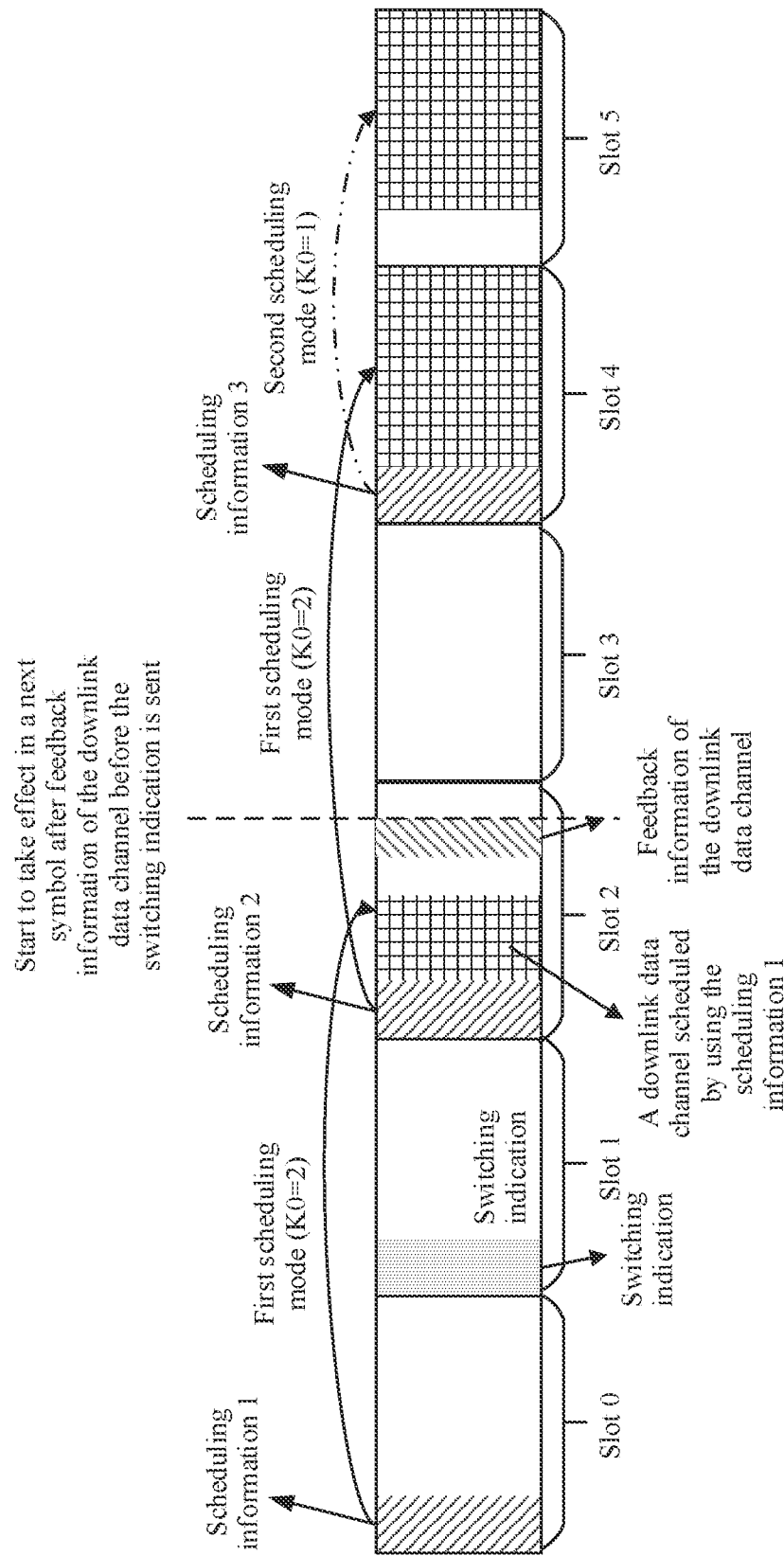
FIG. 11a is a schematic diagram of application time of a scheduling mode according to an embodiment of this application.

For example, each slot includes 14 symbols, both a first scheduling mode and a second scheduling mode are cross-slot scheduling, K0 in the first scheduling mode is 2, and K0 in the second scheduling mode is 1. For example, scheduling information is used to schedule a downlink data channel. As shown in FIG. 11a, a terminal detects a switching indication in a slot 1. There is scheduling information 1 before the switching indication (including a time domain location at which the switching indication is located). The scheduling information 1 is located in a slot 0, and a downlink data channel invoked by using the scheduling information 1 is located in a first symbol to a seventh symbol in a slot 2. Feedback information of the downlink data channel is located in a twelfth symbol in the slot 2. As shown by a dashed line in FIG. 11a, application time of the second scheduling mode may be a next symbol after the twelfth symbol in the slot 2, for example, may be a thirteenth symbol in the slot 2. For example, a time length of each symbol is 71 us. The application time of the second scheduling mode may be specifically a start moment of the thirteenth symbol in the slot 2, for example, a $1^{st}$ us of the thirteenth symbol in the slot 2, a $50^{th}$ us of the thirteenth symbol in the slot 2, or a $71^{st}$ us of the thirteenth symbol in the slot 2. This is not limited in this application. Before a location indicated by the dashed line in FIG. 11a, the first scheduling mode is used to schedule the downlink data channel. For example, before the dashed line, the scheduling information 1 is in the slot 0, the downlink data channel scheduled by using the scheduling information 1 is received in the slot 2, and a downlink data channel scheduled by using scheduling information 2 is received in a slot 4. After the dashed line, a downlink data channel scheduled by using scheduling information 3 is received in a slot 5.

(6.5) The application time of the second scheduling mode is a next slot of a slot occupied by feedback information of a downlink data channel scheduled by using the first scheduling information.

The next slot of the slot occupied by the feedback signal of the downlink data channel scheduled by using the first scheduling information may be a slot that is after the slot occupied by the feedback signal of the downlink data channel scheduled by using the first scheduling information and that is adjacent to the slot occupied by the feedback signal of the downlink data channel scheduled by using the first scheduling information, or may be any slot after the slot occupied by the feedback signal of the downlink data channel scheduled by using the first scheduling information. This is not limited in this application.

The slot in this embodiment of this application may include a plurality of symbols. For example, one slot may include 12 or 14 symbols. When one slot includes a plurality of symbols, that the application time of the second scheduling mode is the next slot of the slot occupied by the feedback information of the downlink data channel scheduled by using the first scheduling information may include: The application time of the second scheduling mode is a start symbol in the next slot of the slot occupied by the feedback signal of the downlink data channel scheduled by using the first scheduling information; or is another symbol in the next slot of the slot occupied by the feedback signal of the downlink data channel scheduled by using the first scheduling information. For example, the application time of the second scheduling mode may be an $R^{th}$ symbol in the next slot of the slot occupied by the feedback signal of the downlink data channel scheduled by using the first scheduling information, where R is a positive integer. Alternatively, when one slot includes a plurality of symbols, and a time length of one symbol is dozens of us, that the application time of the second scheduling mode is the next slot of the slot occupied by the feedback information of the downlink data channel scheduled by using the first scheduling information may include: The application time of the second scheduling mode is a start moment of a symbol (a start symbol or any other symbol) in the next slot of the slot occupied by the feedback information of the downlink data channel scheduled by using the first scheduling information; or the application time of the second scheduling mode may be any moment of a symbol (a start symbol or any other symbol) in the next slot of the slot occupied by the feedback information of the downlink data channel scheduled by using the first scheduling information. For example, the application time of the second scheduling mode is a $Q^{th}$ us of the symbol (the start symbol or any other symbol), where Q is an integer.

Figure 11B:
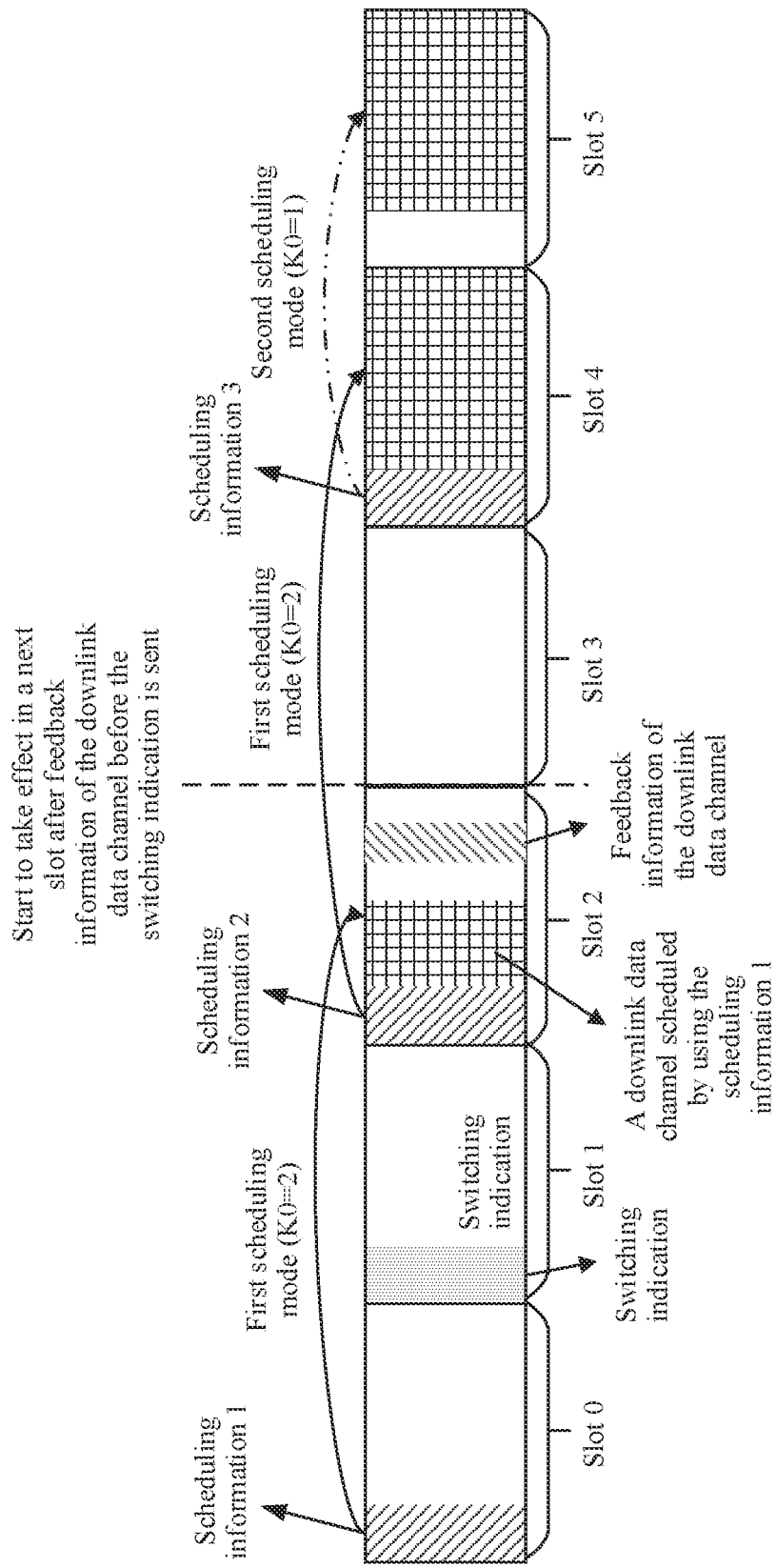
FIG. 11b is a schematic diagram of application time of a scheduling mode according to an embodiment of this application.

For example, each slot includes 14 symbols, both a first scheduling mode and a second scheduling mode are cross-slot scheduling, K0 in the first scheduling mode is 2, and K0 in the second scheduling mode is 1. For example, scheduling information is used to schedule a downlink data channel. As shown in FIG. 11b, a terminal detects a switching indication in a slot 1. There is scheduling information 1 before the switching indication (including a time domain location at which the switching indication is located). The scheduling information 1 is located in a slot 0, and a downlink data channel invoked by using the scheduling information 1 is located in a first symbol to a seventh symbol in a slot 2. Feedback information of the downlink data channel is located in a twelfth symbol in the slot 2. As shown by a dashed line in FIG. 11b, application time of the second scheduling mode may be a next slot of the slot 2, for example, may be a start moment of a slot 3. Specifically, when the slot includes 14 symbols, the application time of the second scheduling mode may be a start symbol in the slot 3, for example, may be a first symbol in the slot 3, may be a tenth symbol in the slot 3, or may be a fourteenth symbol in the slot 3. Alternatively, when a time length of each symbol is tens of us, the application time of the second scheduling mode may be a start moment of the first symbol in the slot 3, for example, may be a $1^{st}$ us of the first symbol in the slot 3, may be a $10^{th}$ us of the first symbol in the slot 3, or may be a $71^{st}$ us of the first symbol in the slot 3. Before a location indicated by the dashed line in FIG. 11b, the first scheduling mode is used to schedule the downlink data channel. For example, before the dashed line, the scheduling information 1 is in the slot 0, the downlink data channel scheduled by using the scheduling information 1 is received in the slot 2, and a downlink data channel scheduled by using scheduling information 2 is received in a slot 4. After the dashed line, a downlink data channel scheduled by using scheduling information 3 is received in a slot 5.

(6.6) The application time of the second scheduling mode is a first scheduling information monitoring occasion after a time domain location occupied by feedback information of a downlink data channel scheduled by using the first scheduling information.

Descriptions related to the scheduling information monitoring occasion are described in Manner 1, and details are not described again. It should be noted that, in (6.6), the first scheduling information monitoring occasion after the time domain location occupied by the feedback information of the downlink data channel scheduled by using the first scheduling information may be a scheduling information monitoring occasion that appears for the first time after the time domain location occupied by the feedback information of the downlink data channel scheduled by using the first scheduling information, or may be any other scheduling information monitoring occasion after the time domain location occupied by the feedback information of the downlink data channel scheduled by using the first scheduling information. For example, the first scheduling information monitoring occasion after the time domain location occupied by the feedback information of the downlink data channel scheduled by using the first scheduling information may be an $N^{th}$ scheduling information monitoring occasion after the time domain location occupied by the feedback information of the downlink data channel scheduled by using the first scheduling information, where N is a positive integer.

To avoid a problem that the data channel cannot be correctly transmitted because the terminal cannot detect the PDCCH used to schedule the data channel, the second scheduling mode starts to take effect when the first scheduling information monitoring occasion after the time domain location occupied by the feedback signal of the downlink data channel scheduled by using the first scheduling information arrives.

When the first scheduling information monitoring occasion occupies a plurality of symbols, that the application time of the second scheduling mode is the first scheduling information monitoring occasion after the time domain location occupied by the feedback information of the downlink data channel scheduled by using the first scheduling information may include: The application time of the second scheduling mode is a start symbol of the first scheduling information monitoring occasion after the time domain location occupied by the feedback signal of the downlink data channel scheduled by using the first scheduling information, or may be any other symbol of the first scheduling information monitoring occasion after the time domain location occupied by the feedback signal of the downlink data channel scheduled by using the first scheduling information. Alternatively, when the first scheduling information monitoring occasion occupies a plurality of symbols, and each symbol occupies dozens of us, that the application time of the second scheduling mode is the first scheduling information monitoring occasion after the time domain location occupied by the feedback information of the downlink data channel scheduled by using the first scheduling information may include: The application time of the second scheduling mode is a start moment of a symbol (for example, a start symbol or any other symbol) of the first scheduling information monitoring occasion after the time domain location occupied by the feedback signal of the downlink data channel scheduled by using the first scheduling information, or the application time of the second scheduling mode is any other moment of a symbol (for example, a start symbol or any other symbol) of the first scheduling information monitoring occasion after the time domain location occupied by the feedback signal of the downlink data channel scheduled by using the first scheduling information. This is not limited in this application.

Figure 11C:
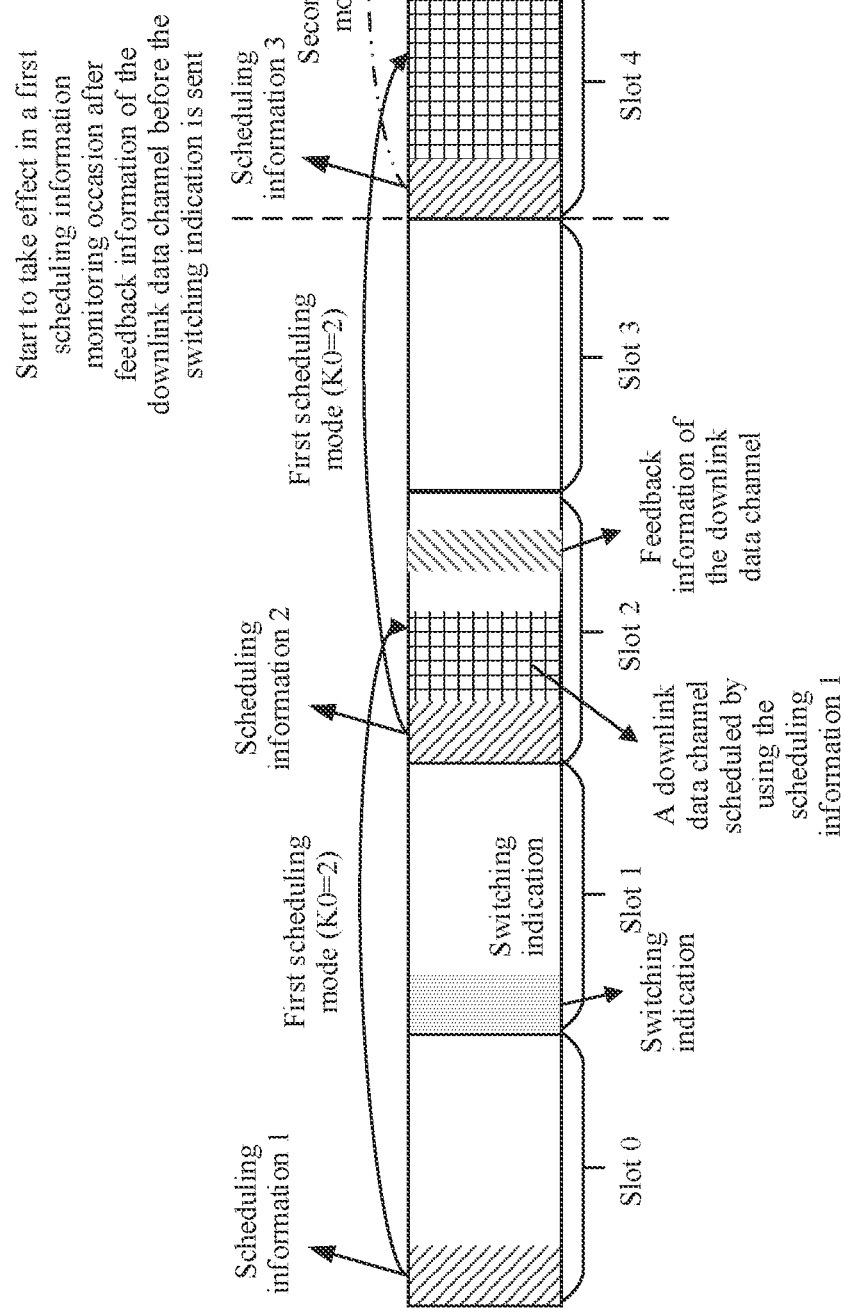
FIG. 11c is a schematic diagram of application time of a scheduling mode according to an embodiment of this application.

For example, each slot includes 14 symbols, both a first scheduling mode and a second scheduling mode are cross-slot scheduling, K0 in the first scheduling mode is 2, and K0 in the second scheduling mode is 1. For example, scheduling information is used to schedule a downlink data channel. As shown in FIG. 11c, a terminal detects a switching indication in a slot 1. There is scheduling information 1 before the switching indication (including a time domain location at which the switching indication is located). The scheduling information 1 is located in a slot 0, and a downlink data channel invoked by using the scheduling information 1 is located in a first symbol to a seventh symbol in a slot 2. Feedback information of the downlink data channel is located in a fourteenth symbol in the slot 2. A first scheduling information monitoring occasion (scheduling information 3) of a time domain location occupied by the feedback information of the downlink data channel is located in a slot 4. As shown by a dashed line in FIG. 11c, application time of the second scheduling mode may be a start moment of the slot 4. Specifically, when the slot includes 14 symbols, the application time of the second scheduling mode may be a start symbol in the slot 4, for example, may be a first symbol in the slot 4, may be a tenth symbol in the slot 4, or may be a fourteenth symbol in the slot 4. Alternatively, when a time length of each symbol is tens of us, the application time of the second scheduling mode may be a start moment of the first symbol in the slot 4, for example, may be a $1^{st}$ us of the first symbol in the slot 4, may be a $10^{th}$ us of the first symbol in the slot 4, or may be a $71^{st}$ us of the first symbol in the slot 4. Before a location indicated by the dashed line in FIG. 11c, the first scheduling mode is used to schedule the downlink data channel. For example, before the dashed line, the scheduling information 1 is in the slot 0, the downlink data channel scheduled by using the scheduling information 1 is received in the slot 2, and a downlink data channel scheduled by using scheduling information 2 is received in a slot 4. After the dashed line, a downlink data channel scheduled by using the scheduling information 3 is received in a slot 5.

In Manner 6, the first scheduling information may be specifically scheduling information that schedules a last transmitted downlink data channel in all scheduling information not later than the switching indication, to ensure that the second scheduling mode takes effect after all downlink data channels scheduled by using the scheduling information that is not later than the switching indication are transmitted.

It should be noted that rules for determining the application time of the second scheduling mode in Manner 1 to Manner 6 may be pre-specified in a protocol. Once the terminal receives the PDCCH including the switching indication, the terminal may search the protocol and determine the application time of the second scheduling mode according to the protocol. In addition, any one or a combination of Manner 1 to Manner 6 may be used to determine the application time of the second scheduling mode, that is, latest time in the time determined in any one or more of Manner 1 to Manner 6 may be used as the application time of the second scheduling mode. For example, latest time of the time shown in (1.1) of Manner 1, the time shown in (2.1) of Manner 2, and the time shown in (4.1) of Manner 4 may be used as the application time of the second scheduling mode. Alternatively, latest time of the time shown in (1.1) of Manner 1, the time shown in (2.1) of Manner 2, the time shown in (3.1) of Manner 3, the time shown in (4.1) of Manner 4, the time shown in Manner 5, and the time shown in (6.1) of Manner 6 is used as the application time of the second scheduling mode, and the like.

In addition to the foregoing Manner 1 to Manner 6, the network device may further indicate the application time of the second scheduling mode to the terminal through dynamic signaling, as described in the following Manner 7.

Manner 7: The terminal receives an application indication sent by the network device, where the application indication may be used to indicate the application time of the second scheduling mode; and the terminal determines the application time of the second scheduling mode based on the application indication.

The application indication may be included in a PDCCH or a PDSCH. For example, the application indication may be DCI in the PDCCH or DCI included in the PDCCH, or the application indication may be a MAC CE in the PDSCH or a MAC CE included in the PDSCH. This is not limited in this application.

In this way, the network device may indicate the application time of the second scheduling mode to the terminal. This is simple and easy to implement.

It should be noted that, in this embodiment of this application, after determining the application time of the second scheduling mode, the terminal may schedule the data channel and/or the reference signal by using the second scheduling mode when the application time of the second scheduling mode arrives or after the application time of the second scheduling mode. The terminal stops the second scheduling mode only when the terminal receives a new switching indication again and the new switching indication is used to indicate the terminal to switch from a second scheduling mode to a first scheduling mode.

A method for determining the application time of the second scheduling mode in the foregoing solution may be applicable to a scenario in which a subcarrier spacing of a BWP in which the terminal works remains unchanged. In actual application, the BWP (an uplink BWP and/or a downlink BWP) on which the terminal works may be switched. Numerology of a BWP used after switching may be different from numerology of a BWP used before switching. A subcarrier spacing of the BWP used after switching may be different from a subcarrier spacing of the BWP used before switching.

When subcarrier spacings of BWPs are different, slot lengths corresponding to the BWPs are different. Therefore, when the scheduling mode of the terminal is switched, if the BWP in which the terminal works is also switched, the application time determined in the foregoing manner needs to be adjusted based on a system parameter of the BWP, to obtain the application time of the second scheduling mode. Specifically, a process of determining the application time of the second scheduling mode is described as follows.

When the switching indication in step 501 is included in the PDCCH, and the switching indication is further used to indicate the terminal to switch from a first BWP to a second BWP, the terminal determines the application time of the second scheduling mode on a target BWP based on the slot N in which the PDCCH is located, an applicable minimum slot offset, and a target coefficient.

The applicable minimum slot offset may be an applicable minimum value of K0 when the terminal receives the switching indication.

N is a natural number. For example, N may be 0 or 1.

The target coefficient is determined based on numerology of the target BWP and numerology of a first downlink BWP. The first downlink BWP is an active downlink BWP when the terminal receives the switching indication.

The target BWP may be an uplink BWP, or may be a downlink BWP. When the second scheduling mode is used to indicate an offset between a slot in which the PDCCH is located and a slot in which an uplink data channel scheduled by using the PDCCH is located, the target BWP is the uplink BWP. When the second scheduling mode is used to indicate an offset between a slot in which the PDCCH is located and a slot in which a downlink data channel scheduled by using the PDCCH is located, the target BWP is the downlink BWP.

For example, the target BWP may be determined based on a scheduling mode and a BWP switching status. For example, the first BWP is the first downlink BWP, the second BWP is a second downlink BWP, the first scheduling mode is a first downlink scheduling mode, the second scheduling mode is a second downlink scheduling mode, and the target BWP is the second downlink BWP.

The first BWP is the first downlink BWP, the second BWP is a second downlink BWP, the first scheduling mode is a first uplink scheduling mode, the second scheduling mode is a second uplink scheduling mode, and the target BWP is a first uplink BWP.

The first BWP is a first uplink BWP, the second BWP is a second uplink BWP, the first scheduling mode is a first downlink scheduling mode, the second scheduling mode is a second downlink scheduling mode, and the target BWP is the first downlink BWP.

The first BWP is a first uplink BWP, the second BWP is a second uplink BWP, the first scheduling mode is a first uplink scheduling mode, the second scheduling mode is a second uplink scheduling mode, and the target BWP is the second uplink BWP.

For example, the target coefficient may be equal to $$\frac{2^{\mu_T}}{2^{\mu_1}},$$

where $\mu_T$ is the parameter numerology of the target BWP, and $\mu_1$ is the numerology of the first downlink BWP. Alternatively, it may be described as that the target coefficient is equal to $$\frac{\text{Slot length of target } BWP}{\text{Slot length of first } BWP},$$

or the like. This is not limited.

For example, the application time of the second scheduling mode is not earlier than a $Q^{th}$ slot. For example, the application time of the second scheduling mode may be a start location of the $Q^{th}$ slot or a start symbol in the $Q^{th}$ slot. Alternatively, the application time of the second scheduling mode may be any other symbol in the $Q^{th}$ slot, another slot after the $Q^{th}$ slot, or the like. This is not limited.

Q is equal to $\lceil (N+M) \times \text{Target coefficient} \rceil$. M is equal to the applicable minimum slot offset, M is equal to a sum of the applicable minimum slot offset and the first value, or M is a maximum value between the second value and the applicable minimum slot offset.

As described above, the first value may be 1, and the second value may be 1. M=minimum value of K0, M=max [1, minimum value of K0], or M=minimum value of K0+1.

It should be noted that the terminal may determine, in a scenario in which an uplink scheduling mode, a downlink scheduling mode, an uplink BWP, and a downlink BWP are switched, with reference to the foregoing manner, an application time of a switched scheduling mode. Details are not described.

The following uses M=max[1, minimum value of K0] as an example to describe, with reference to the following Case 1 to Case 5, an application time of a scheduling mode in the scenario in which a scheduling mode of the terminal and a BWP in which the terminal works are switched.

Case 1: A switching indication received by a terminal from a network device is used to indicate the terminal to switch from a first downlink scheduling mode to a second downlink scheduling mode, and is used to indicate the terminal to switch from a first downlink BWP to a second downlink BWP.

That the terminal determines application time of the second downlink scheduling mode includes: The terminal determines the application time of the second downlink scheduling mode on the second downlink BWP based on a slot N in which a PDCCH is located, an applicable minimum slot offset, and a coefficient $$\frac{2^{\mu_{DL,new}}}{2^{\mu_{DL,old}}}.$$

For example, the application time of the second downlink scheduling mode is not earlier than an $$\left\lceil (N+\max(1, K0_{min})) \cdot \frac{2^{\mu_{DL,new}}}{2^{\mu_{DL,old}}} \right\rceil^{th}_{th}$$

slot, that is, the terminal uses the second downlink scheduling mode not earlier than a slot $$\left\lceil (N+\max(1, K0_{min})) \cdot \frac{2^{\mu_{DL,new}}}{2^{\mu_{DL,old}}} \right\rceil$$

of the second downlink BWP.

$K0_{min}$ is an applicable minimum value of K0 when the terminal receives the switching indication on the first downlink BWP, $\mu_{DL,new}$ is numerology of the second downlink BWP, $\mu_{DL,old}$ is numerology of the first downlink BWP, and $\lceil \ \rceil$ represents a ceiling operation.

Figure 11D:
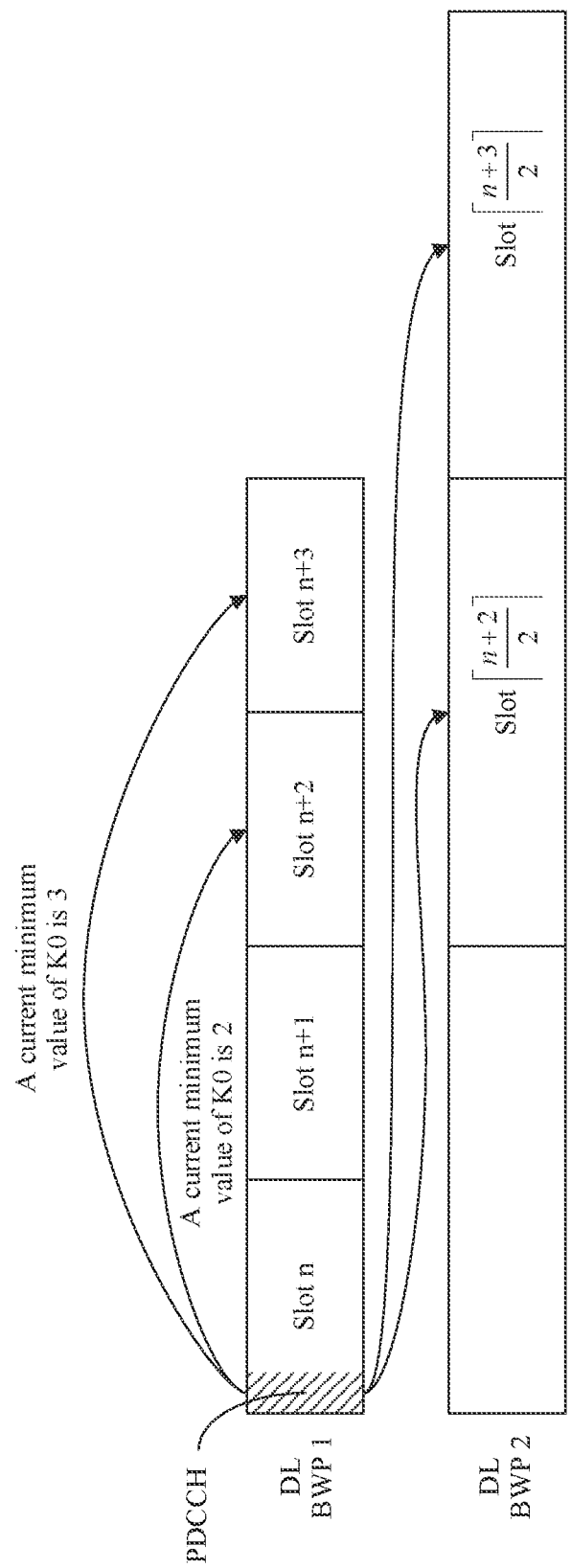
FIG. 11d is a schematic diagram of application time of a scheduling mode according to an embodiment of this application.
Figure 11E:
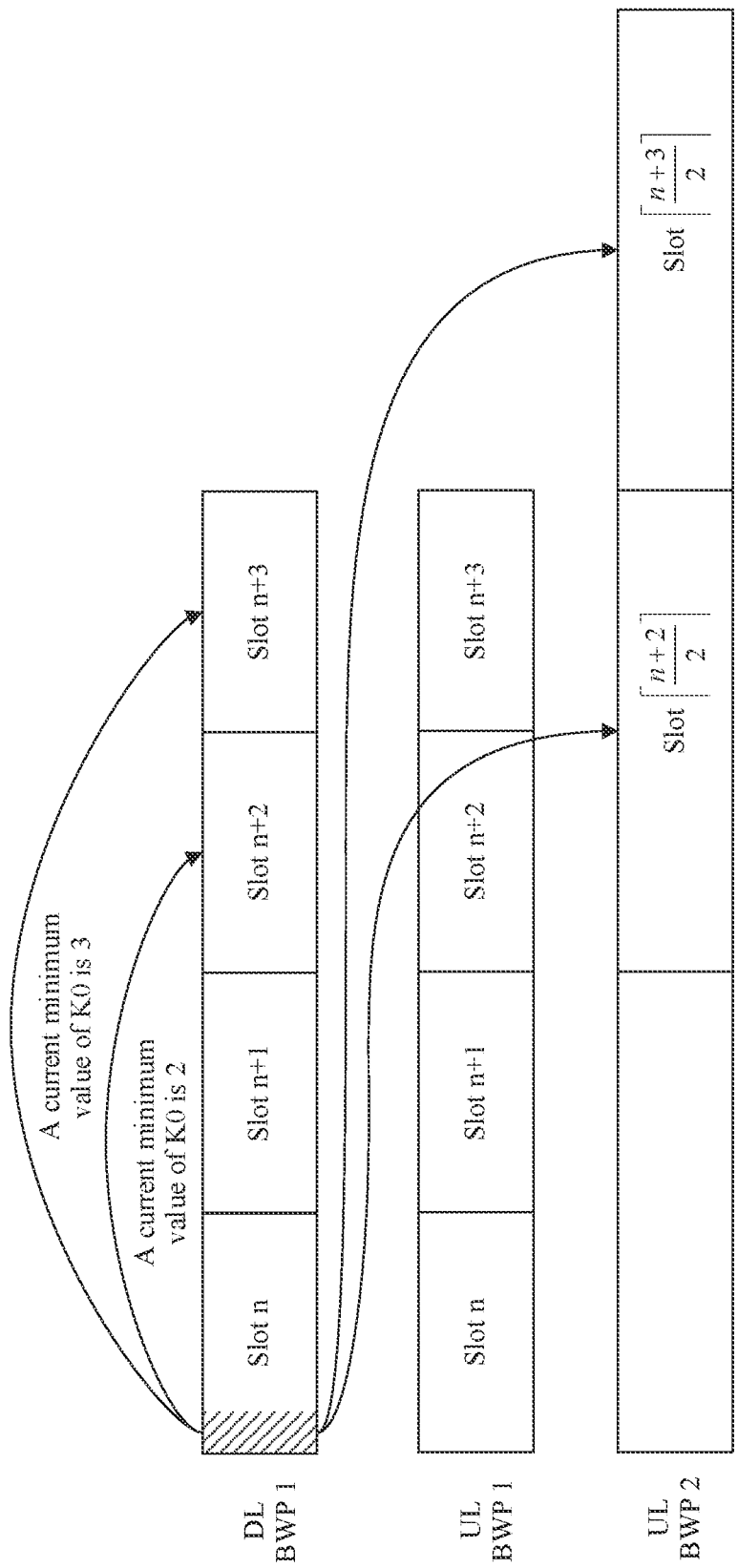
FIG. 11e is another schematic diagram of application time of a scheduling mode according to an embodiment of this application.

For example, a downlink BWP currently activated by the terminal is a DL BWP 1, numerology of the DL BWP 1 is 1, and a subcarrier spacing of the DL BWP 1 is 30 kHz. If the terminal receives, in a slot n, the PDCCH including the switching indication, and the switching indication is only used to indicate the terminal to switch from the first downlink scheduling mode to the second downlink scheduling mode (for example, indicate a new minimum value of K0), but does not indicate BWP switching, assuming that a current applicable minimum value of K0 corresponding to the terminal is 2, as shown in FIG. 11d, on a DL BWP 1, application time of a second downlink scheduling mode is not earlier than an $(n+\max(1, 2))^{th}$ slot, for example, may be a start location of an $(n+2)^{th}$ slot. If the switching indication is further used to indicate the terminal to switch from a DL BWP 1 to a DL BWP 2, numerology of the DL BWP 2 is 0, and a subcarrier spacing of the DL BWP 1 is 15 kHz, as shown in FIG. 11d, because a slot length of the DL BWP 2 is twice a length of the DL BWP 1, application time of a second downlink scheduling mode is an $$\left\lceil (n+\max(1, 2)) \cdot \frac{2^0}{2^1} \right\rceil = \left\lceil \frac{n+2}{2} \right\rceil^{th}$$

slot of the DL BWP 2, for example, is a start location of the $$\left\lceil \frac{n+2}{2} \right\rceil^{th}$$

slot on the DL BWP 2.

For another example, assuming that a current applicable minimum value of K0 corresponding to the terminal is 3, as shown in FIG. 11d, application time of a second downlink scheduling mode is an $(n+\max(1, 3))^{th}$ slot on a DL BWP 1, for example, may be a start location of the $(n+3)^{th}$ slot. If the switching indication is further used to indicate the terminal to switch from a DL BWP 1 to a DL BWP 2, numerology of the DL BWP 2 is 0, and a subcarrier spacing of the DL BWP 1 is 15 kHz, as shown in FIG. 11d, because a slot length of the DL BWP 2 is twice a length of the DL BWP 1, application time of a second downlink scheduling mode is an $$\left\lceil (n+\max(1, 3)) \cdot \frac{2^0}{2^1} \right\rceil = \left\lceil \frac{n+3}{2} \right\rceil^{th}$$

slot on the DL BWP 2, for example, is a start location of the $$\left\lceil \frac{n+3}{2} \right\rceil^{th}$$

slot on the DL BWP 2.

Case 2: A switching indication received by a terminal from a network device is used to indicate the terminal to switch from a first uplink scheduling mode to a second uplink scheduling mode, and is used to indicate the terminal to switch from a first uplink BWP to a second uplink BWP.

That the terminal determines application time of the second uplink scheduling mode includes: The terminal determines the application time of the second uplink scheduling mode on the second uplink BWP based on a slot N in which a PDCCH is located, an applicable minimum slot offset, and a coefficient $$\frac{2^{\mu_{UL,new}}}{2^{\mu_{DL,old}}}.$$

For example, the application time of the second uplink scheduling mode is not earlier than an $$\left\lceil (N + \max(1, K0_{min})) \cdot \frac{2^{\mu_{DL,new}}}{2^{\mu_{DL,old}}} \right\rceil^{th}$$

slot, that is, the terminal uses the second uplink scheduling mode not earlier than a slot $$\left\lceil (N + \max(1, K0_{min})) \cdot \frac{2^{\mu_{UL,new}}}{2^{\mu_{DL,old}}} \right\rceil$$

on the second uplink BWP.

$K0_{min}$ is an applicable minimum value of K0 when the terminal receives the switching indication on the first downlink BWP, $\mu_{UL,new}$ is numerology of the second uplink BWP, $\mu_{DL,old}$ is numerology of the first downlink BWP, and $\lceil \ \rceil$ represents a ceiling operation.

For example, an uplink BWP currently activated by the terminal is a UL BWP1, a downlink BWP is a DL BWP1, numerology of the UL BWP1 and the DL BWP1 are 1, and a subcarrier spacing is 30 kHz. If the terminal receives, in a slot n, the PDCCH including the $$\left\lceil (n + \max(1, 2)) \cdot \frac{2^0}{2^1} \right\rceil = \left\lceil \frac{n+2}{2} \right\rceil^{th}$$

slot on the UL BWP 2, for example, is a start location of the $$\left\lceil \frac{n+2}{2} \right\rceil^{th}$$

slot on the UL BWP 2.

For another example, assuming that a current applicable minimum value of K0 corresponding to the terminal is 3, as shown in FIG. 11d, application time of a second uplink scheduling mode is an $(n+3)^{th}$ slot on a UL BWP 1, for example, may be a start location of the $(n+3)^{th}$ slot. If the switching indication is further used to indicate the terminal to switch from a UL BWP 1 to a UL BWP 2, numerology of the UL BWP 2 is 0, and a subcarrier spacing of the UL BWP 1 is 15 kHz, as shown in FIG. 11d, because a slot length of the UL BWP 2 is twice a length of the UL BWP 1, application time of a second uplink scheduling mode is an $$\left\lceil (n + \max(1, 3)) \cdot \frac{2^0}{2^1} \right\rceil = \left\lceil \frac{n+3}{2} \right\rceil^{th}$$

slot on the UL BWP 2, for example, may be a start location of the $$\left\lceil \frac{n+3}{2} \right\rceil^{th}$$

slot on the UL BWP 2.

Case 3: A switching indication is used to indicate a terminal to switch from a first downlink scheduling mode to a second downlink scheduling mode, and is used to indicate the terminal to switch from a first uplink BWP to a second uplink BWP.

In Case 3, a network device indicates downlink scheduling mode switching and uplink BWP switching. In this case, a downlink BWP is not switched, and the downlink BWP in which the terminal works is still a first downlink BWP activated when the terminal receives the switching indication. Therefore, that the terminal determines application time of the second downlink scheduling mode includes: The terminal determines the application time of the second downlink scheduling mode on the first downlink BWP based on a slot N in which a PDCCH is located, an applicable minimum slot offset, and a coefficient $$\frac{2^{\mu_{DL,old}}}{2^{\mu_{DL,old}}}.$$

For example, the application time of the second uplink scheduling mode is not earlier than an $$\left\lceil (N + \max(1, K0_{min})) \cdot \frac{2^{\mu_{DL,old}}}{2^{\mu_{DL,old}}} \right\rceil^{th}$$

slot on the first downlink BWP, where $$\frac{2^{\mu_{DL,old}}}{2^{\mu_{DL,old}}} = 1,$$

that is, the terminal uses the second downlink scheduling mode not earlier than a slot N+max (1, $K0_{min}$) on the first downlink BWP.

$K0_{min}$ is an applicable minimum value of K0 when the terminal receives the switching indication on the first downlink BWP, and $\mu_{DL,old}$ is numerology of the first downlink BWP.

In Case 3, the switching indication may be further used to indicate the terminal to switch from a first uplink scheduling mode to a second uplink scheduling mode. In this case, application time of the second uplink scheduling mode may be determined with reference to Case 2. For example, that the terminal determines the application time of the second uplink scheduling mode includes: The terminal determines the application time of the second uplink scheduling mode on a second uplink BWP based on a slot N in which a PDCCH is located, an applicable minimum slot offset, and a coefficient $$\frac{2^{\mu_{UL,new}}}{2^{\mu_{DL,old}}}.$$

Specifically, the application time of the second uplink scheduling mode is not earlier than an $$\left[(N + \max(1, K0_{min})) \cdot \frac{2^{\mu_{UL,new}}}{2^{\mu_{DL,old}}}\right]^{th}$$

slot, that is, the terminal uses the second downlink scheduling mode not earlier than a slot $$\left[(N + \max(1, K0_{min})) \cdot \frac{2^{\mu_{UL,new}}}{2^{\mu_{DL,old}}}\right]$$

on the second uplink BWP.

Case 4: A switching indication is used to indicate a terminal to switch from a first uplink scheduling mode to a second uplink scheduling mode, and is used to indicate the terminal to switch from a first downlink BWP to a second downlink BWP.

In Case 4, the network device indicates uplink scheduling mode switching and downlink BWP switching. In this case, an uplink BWP is not switched, and the uplink BWP in which the terminal works is still a first uplink BWP activated when the terminal receives the switching indication. Therefore, that the terminal determines application time of the second uplink scheduling mode includes: The terminal determines the application time of the second uplink scheduling mode on the first uplink BWP based on a slot N in which a PDCCH is located, an applicable minimum slot offset, and a coefficient $$\frac{2^{\mu_{UL,old}}}{2^{\mu_{DL,old}}}.$$

For example, the application time of the second uplink scheduling mode is not earlier than an $$\left[(N + \max(1, K0_{min})) \cdot \frac{2^{\mu_{UL,old}}}{2^{\mu_{DL,old}}}\right]^{th}$$

slot on the first uplink BWP, that is, the terminal uses the second uplink scheduling mode not earlier than a slot $$\left[(N + \max(1, K0_{min})) \cdot \frac{2^{\mu_{UL,old}}}{2^{\mu_{DL,old}}}\right]$$

on the first uplink BWP.

$K0_{min}$ is an applicable minimum value of K0, $\mu_{DL,old}$ is numerology of the first downlink BWP, and $\mu_{UL,old}$ is numerology of the first uplink BWP.

In Case 4, the switching indication may be further used to indicate the terminal to switch from a first downlink scheduling mode to a second downlink scheduling mode. In this case, that the terminal may determine, with reference to Case 1, application time of the second downlink scheduling mode includes: The terminal determines the application time of the second downlink scheduling mode on a second downlink BWP based on a slot N in which the PDCCH is located, an applicable minimum slot offset, and a coefficient $$\frac{2^{\mu_{DL,new}}}{2^{\mu_{DL,old}}}.$$

For example, the application time of the second downlink scheduling mode is not earlier than an $$\left[(N + \max(1, K0_{min})) \cdot \frac{2^{\mu_{DL,new}}}{2^{\mu_{DL,old}}}\right]^{th}$$

slot, that is, the terminal uses the second downlink scheduling mode not earlier than a slot $$\left[(N + \max(1, K0_{min})) \cdot \frac{2^{\mu_{DL,new}}}{2^{\mu_{DL,old}}}\right]$$

of the second downlink BWP.

Case 5: A terminal switches from a first downlink scheduling mode to a second downlink scheduling mode, switches from a first downlink BWP to a second downlink BWP, switches from a first uplink scheduling mode to a second uplink scheduling mode, and switches from a first uplink BWP to a second uplink BWP.

The terminal may determine application time of the second downlink scheduling mode on the second downlink BWP based on a slot N in which a PDCCH is located, an applicable minimum slot offset, and a coefficient $$\frac{2^{\mu_{DL,new}}}{2^{\mu_{DL,old}}},$$

and determine, application time of the second uplink scheduling mode on the second uplink BWP based on a slot N in which a PDCCH is located, an applicable minimum slot offset, and a coefficient $$\frac{2^{\mu_{UL,new}}}{2^{\mu_{DL,old}}}.$$

In other words, the application time of the second downlink scheduling mode and the application time of the second uplink scheduling mode may be determined with reference to the processes described in Case 1 and Case 2. Details are not described again.

It should be noted that, in Case 1 to Case 5, the terminal may be located in a frequency division duplex (frequency division duplexing, FDD) system. In Case 5, the terminal may be located in a time division duplex (time division duplexing, TDD) system. In the TDD system, an uplink BWP and a downlink BWP are switched in pairs. Once the uplink BWP is switched, the downlink BWP is definitely switched. In other words, at a same moment, if the uplink BWP is switched, the downlink BWP is inevitably switched. In the FDD system, uplink BWP switching and downlink BWP switching are decoupled, and uplink BWP switching or downlink BWP switching may be performed at a same moment.

In addition, content indicated by the network device to the terminal is not limited in this embodiment of this application. In addition to indicating the terminal to switch the scheduling mode and/or switch the BWP, the switching indication sent by the network device to the terminal may be further used to indicate one or more of the following parameters: PDCCH skipping (skipping) of the terminal, a period in which the terminal monitors the PDCCH, a multi-input multi-output (multi-input multi-out, MIMO) parameter of the terminal, search space and/or a CORESET monitored by the terminal, and the like. After receiving the one or more parameters indicated by the network device, the terminal may determine application time of these parameters, and use these parameters when the determined application time arrives.

Specifically, the application time of the one or more parameters may be the same as the application time of the second scheduling mode. For example, when the BWP of the terminal is not switched, the application time of the foregoing one or more parameters may be not earlier than an $(N+\max(1, \text{minimum value of } K0))^{th}$ slot, where N is a slot in which the PDCCH including the switching indication, received by the terminal is located.

The PDCCH skipping may indicate that the terminal skips one or more slots/subframes/monitoring occasions (monitor occasion, MO) to monitor a PDCCH used to schedule data.

The period in which the terminal monitors the PDCCH may be a period in which the terminal monitors a PDCCH used to schedule data.

The MIMO parameter of the terminal may be a quantity of transmit/receive antennas (antenna), a quantity of antenna ports (antenna port), a quantity of transport layers (layer), or a maximum quantity of transport layers of the terminal.

The search space (search space) and/or the CORESET monitored by the terminal may indicate a CORESET and/or search space that needs to be monitored by the terminal to monitor a PDCCH used to schedule data.

In the embodiments of this application, a network device may indicate a minimum slot offset of a BWP to a terminal, so that the terminal schedules a data channel based on the indication of the network device. Specifically, the process may include the following steps.

The terminal receives minimum slot offset indication information sent by the network device. The minimum slot offset indication information is used to indicate a minimum slot offset of a target BWP. The terminal determines the minimum slot offset of the target BWP based on the minimum slot offset indication information and numerology of the target BWP. The minimum slot offset of the target BWP is based on the numerology of the target BWP.

The target BWP may bean uplink BWP, or may be a downlink BWP. This is not limited. In addition, the target BWP may be an active uplink BWP or an active downlink BWP when the terminal receives the minimum slot offset indication information, or may be an uplink BWP or a downlink BWP to which the terminal is to be switched to.

The minimum slot offset of the target BWP may be a slot offset between a slot in which a PDCCH is located and a slot in which a data channel scheduled by using the PDCCH on the target BWP is located. When the target BWP is the uplink BWP, the minimum slot offset of the target BWP is a slot offset between a slot in which a PDCCH is located and a slot in which an uplink data channel scheduled by using the PDCCH on the uplink BWP is located. When the target BWP is the downlink BWP, the minimum slot offset of the target BWP is a slot offset between a slot in which a PDCCH is located and a slot in which a downlink data channel scheduled by using the PDCCH on the downlink BWP is located.

That the minimum slot offset of the target BWP is based on the numerology of the target BWP may also be described as that the minimum slot offset of the target BWP corresponds to the numerology of the target BWP, the minimum slot offset of the target BWP is associated with the numerology of the target BWP, the minimum slot offset of the target BWP is related to the numerology of the target BWP, the minimum slot offset of the target BWP uses the numerology of the target BWP as a reference, or the like.

The minimum slot offset, of the target BWP, finally determined by the terminal may be duration of an offset that is between a slot in which the PDCCH is located and the slot in which the data channel scheduled by using the PDCCH is located and that is of the target BWP. A unit of the minimum slot offset, of the target BWP, finally determined by the terminal may be ms.

For example, it is assumed that the numerology of the target BWP is 1, a subcarrier spacing of the target BWP is 30 kHz, and a length of one slot of the target BWP is 0.5 ms. In this case, if the minimum slot offset, of the target BWP, indicated by using the minimum slot offset indication information is two slots, the terminal may determine, based on the minimum slot offset indication information and the system parameter numerology of the target BWP, that the minimum slot offset of the target BWP is 2×0.5 ms=1 ms.

In a possible design, the minimum slot offset indication information includes a value corresponding to the minimum slot offset of the target BWP. In other words, the network device may directly indicate the value of the minimum slot offset to the terminal, so that the terminal directly determines the minimum slot offset of the target BWP based on the value of the minimum slot offset of the target BWP and the numerology of the target BWP.

The value of the minimum slot offset of the target BWP may be a quantity of slots in an offset that is between a slot in which a PDCCH is located and a slot in which a data channel scheduled by using the PDCCH is located and that is on the target BWP. For example, when the target BWP is the downlink BWP, the network device may indicate a minimum value of K0 to the terminal. When the target BWP is the uplink BWP, the network device may indicate a minimum value of K2 to the terminal.

It should be noted that in this embodiment of this application, the minimum slot offset of the target BWP is not limited to being indicated by using K0 or K2, and the minimum slot offset of the BWP may be indirectly indicated in another manner. For details, refer to the following several possible designs.

In still another possible design, the minimum slot offset indication information includes a value corresponding to a reference minimum slot offset. That the terminal determines the minimum slot offset of the target BWP based on the minimum slot offset indication information and numerology of the target BWP includes: The terminal determines the minimum slot offset of the target BWP based on the value corresponding to the reference minimum slot offset, reference numerology, and the numerology of the target BWP.

The value corresponding to the reference minimum slot offset may be a value of a minimum slot offset corresponding to the reference numerology, or may be described as that the value corresponding to the reference minimum slot offset is a value of a minimum slot offset corresponding to a reference BWP. When the target BWP is the uplink BWP, the value of the reference minimum slot offset may be a reference minimum value of K0. When the target BWP is the downlink BWP, the value of the reference minimum slot offset may be a minimum value of K2.

For example, the terminal may determine, based on a product of a coefficient $$\frac{2^{\mu_{target}}}{2^{\mu_{reference}}}$$

and the value corresponding to the reference minimum slot offset, a quantity of slots in an offset that is between the slot in which the PDCCH is located and the slot in which the data channel scheduled by using the PDCCH is located and that is of the target BWP. Then, the terminal determines, based on the numerology of the target BWP and the quantity of slots in the offset that is between the slot in which the PDCCH is located and the slot in which the data channel scheduled by using the PDCCH is located and that is of the target BWP, duration of the offset that is between the slot in which the PDCCH is located and the slot in which the data channel scheduled by using the PDCCH is located and that is of the target BWP.

$\mu_{target}$ is the numerology of the target BWP, and $\mu_{reference}$ is the reference numerology.

For example, if the reference minimum slot offset is a reference minimum value of K0=2, the reference numerology is 1, and the numerology of the target BWP is 0, the minimum slot offset of the target BWP is $$2 \times \frac{2^0}{2^1} = 1$$

slot. Because the numerology of the target BWP is 0, and one slot of the target BWP is 1 ms, the minimum slot offset of the target BWP is 1 ms.

In yet another possible design, the minimum slot offset indication information includes a first index. That the terminal determines the minimum slot offset of the target BWP based on the minimum slot offset indication information and numerology of the target BWP includes: The terminal determines the minimum slot offset of the target BWP based on the first index, a first correspondence, and the numerology of the target BWP For example, the terminal may first determine, based on the first index and the first correspondence, a quantity of slots corresponding to the minimum slot offset of the target BWP, and then determine, based on the quantity of slots corresponding to the minimum slot offset of the target BWP and the numerology of the target BWP, duration corresponding to the minimum slot offset of the target BWP The first correspondence includes a correspondence between an index and the minimum slot offset of the BWP. The minimum slot offset included in the first correspondence may be a minimum slot offset of the downlink BWP, or may be a minimum slot offset of the uplink BWP. This is not limited. For example, the minimum slot offset, of the BWP, included in the first correspondence may be a minimum value of K0 of the downlink BWP, or may be a minimum value of K2 of the uplink BWP.

The first correspondence may be a correspondence in an array form, or may be a correspondence in a list form. For example, the first correspondence may be an array: an index 0 {a minimum value of K0 of a BWP 1 is 0, a minimum value of K0 of a BWP 2 is 0}, an index 1 {a minimum value of K0 of a BWP 1 is 2, a minimum value of K0 of a BWP 2 is 1}. Alternatively, the first correspondence is shown in the following Table 3. This is not limited.

For example, the first correspondence is the correspondence in the list form, and the minimum slot offset, of the BWP, in the first correspondence is the minimum value of K0 of the downlink BWP. As shown in Table 3, when an index is 0, a corresponding minimum value of K0 of a DL BWP 1 is 0, and a corresponding minimum value of K0 of a DL BWP 2 is 0. When an index is 1, a corresponding minimum value of K0 of the DL BWP 1 is 2, and a corresponding minimum value of K0 of the DL BWP 2 is 1. When an index is 2, a corresponding minimum value of K0 of the DL BWP 1 is 3, and a corresponding minimum value of K0 of the DL BWP 2 is 2. If the target BWP is the DL BWP 2, numerology of the DL BWP 2 is 1, a length of one slot of the DL BWP 2 is 0.5 ms, and the first index included in the minimum slot offset indication information is 1, Table 3 is queried by using the index 1 as an index to determine that the minimum value of K0 of the DL BWP 2 is 1, and determine that the minimum slot offset of the DL BWP 2 is 0.5 ms based on the numerology of the DL BWP 2 and the minimum value of K0 of the DL BWP 2.

TABLE 3

| Index | Minimum value of K0 of DL BWP 1 | Minimum value of K0 of DL BWP 2 |
|---|---|---|
| 0 | 0 | 0 |
| 1 | 2 | 1 |
| 2 | 3 | 2 |

For another example, the first correspondence is the correspondence in the list form, and the minimum slot offset, of the BWP, in the first correspondence is the minimum value of K2 of the uplink BWP. As shown in Table 4, when an index is 0, a corresponding minimum value of K2 of a UL BWP 1 is 1, and a corresponding minimum value of K2 of a UL BWP 2 is 2. When an index is 1, a corresponding minimum value of K2 of the UL BWP 1 is 2, and a corresponding minimum value of K2 of the UL BWP 2 is 3. If the target BWP is the UL BWP 2, numerology of the UL BWP 2 is 1, a length of one slot of the UL BWP 2 is 0.5 ms, and the first index included in the minimum slot offset indication information is 1, Table 4 is queried by using the index 1 as an index to determine that the minimum value of K2 of the UL BWP 2 is 3, and determine that the minimum slot offset of the UL BWP 2 is 0.5 ms×3=1.5 ms based on the numerology of the UL BWP 2 and the minimum value of K2 of the UL BWP 2.

TABLE 4

| Index | Minimum value of K2 of UL BWP 1 | Minimum value of K2 of UL BWP 2 |
|---|---|---|
| 0 | 1 | 2 |
| 1 | 2 | 3 |

It should be noted that Table 3 and Table 4 are merely example tables. In addition to the minimum value of K0 of the BWP 1 and the minimum value of K0 of the BWP 2 shown in Table 3, Table 3 may further include minimum values of one or more other BWPs. Alternatively, Table 3 may be split into two tables, and each table includes only a correspondence between an index and a minimum value of K0 of one BWP. This is not limited. Likewise, in addition to the minimum value of K0 of the BWP 1 and the minimum value of K0 of the BWP 2 shown in Table 4, Table 4 may further include minimum values of one or more other BWPs. Alternatively, Table 4 may be split into two tables, and each table includes only a correspondence between an index and a minimum value of K0 of one BWP. This is not limited.

In yet another possible design, the minimum slot offset indication information includes a second index. That the terminal determines the minimum slot offset of the target BWP based on the minimum slot offset indication information and numerology of the target BWP includes:

The terminal determines the minimum slot offset of the target BWP based on the second index, a second correspondence, reference numerology, and the numerology of the target BWP.

For example, the terminal may first determine a reference minimum slot offset based on the second index and the second correspondence, determine, based on the reference minimum slot offset and $$\frac{2^{\mu_{target}}}{2^{\mu_{reference}}},$$

a quantity of slots corresponding to the minimum slot offset of the target BWP, and then determine, based on the quantity of slots corresponding to the minimum slot offset of the target BWP and the numerology of the target BWP, duration corresponding to the minimum slot offset of the target BWP. $\mu_{target}$ is the numerology of the target BWP, and $\mu_{reference}$ is the reference numerology.

The second correspondence includes a correspondence between an index and a reference minimum slot offset. The reference minimum slot offset is described above. When the target BWP is the downlink BWP, the reference numerology may be numerology of a reference DL BWP, and the reference minimum slot offset may be a reference minimum value of K0. When the target BWP is the uplink BWP, the reference numerology may be numerology of a reference UL BWP, and the reference minimum slot offset may be a reference minimum value of K2.

The second correspondence may be a correspondence in an array form, or may be a correspondence in a list form. For example, the second correspondence may be an array: {an index 0, a reference minimum value of K0 is 0}, {an index1, a reference minimum value of K0 is 1}, or the like. Alternatively, the second correspondence is shown in the following Table 5. This is not limited.

For example, the second correspondence is the correspondence in the list form, the reference minimum slot offset is the reference minimum value of K0, and the target BWP is the DL BWP. As shown in Table 5, when an index is 0, a corresponding reference minimum value of K0 is 0. When an index is 1, a corresponding reference minimum value of K0 is 1. When an index is 2, a corresponding reference minimum value of K0 is 2. If the reference numerology is 1, the target BWP is a DL BWP 1, numerology of the DL BWP 1 is 0, a length of one slot of the DL BWP 1 is 1 ms, and the second index included in the minimum slot offset indication information is 2, Table 5 is queried by using the index 2 as an index to determine that the reference minimum value of K0 is 2, and determine that the minimum slot offset of the DL BWP 1 is $$2 \times \frac{2^0}{2^1} = 1$$

slot. Because the slot of the DL BWP 1 is 1 ms, the minimum slot offset of the BWP 1 is 1 ms.

TABLE 5

| Index | Reference minimum value of K0 |
| --- | --- |
| 0 | 0 |
| 1 | 1 |
| 2 | 2 |

For example, the second correspondence is the correspondence in the list form, the reference minimum slot offset is the reference minimum value of K2, and the target BWP is the UL BWP. As shown in Table 6, when an index is 0, a corresponding reference minimum value of K2 is 1. When an index is 1, a corresponding reference minimum value of K2 is 2. If the reference numerology is 1, the target BWP is a UL BWP 1, numerology of the DL BWP 1 is 0, a length of one slot on the UL BWP 1 is 1 ms, and the second index included in the minimum slot offset indication information is 1, Table 6 is queried by using the index 1 as an index to determine that the reference minimum value of K2 is 2, and determine that the minimum slot offset of the UL BWP 1 is $$2 \times \frac{2^0}{2^1} = 1$$

slot. Because the slot of the UL BWP 1 is 1 ms, the minimum slot offset of the BWP 1 is 1 ms.

TABLE 6

| Index | Reference minimum value of K2 |
| --- | --- |
| 0 | 1 |
| 1 | 2 |

In addition, in the embodiments of this application, there is the following scenario: A BWP of a terminal is switched, where numerology of a BWP used before switching is different from numerology of a BWP used after switching, but a scheduling mode of the terminal is not switched. In this scenario, because the numerology of the BWP used before switching is different from the numerology of the BWP used after switching, a length of a slot of the BWP used after switching is different from a length of a slot of the BWP used before switching, and a minimum slot offset of the BWP used before switching is not used in the BWP used after switching. In view of this, when the BWP of the terminal is switched, this application further provides the following method for determining a minimum slot offset of the BWP used after switching. Specifically, the method may include:

A terminal receives a switching indication sent by a network device. The switching indication is used to indicate to switch the terminal from a first BWP to a second BWP. The terminal determines a minimum slot offset of the second BWP based on a minimum slot offset of the first BWP, numerology of the first BWP, and numerology of the second BWP.

The first BWP may be a first downlink BWP, and the second BWP may be a second downlink BWP. Alternatively, the first BWP is a first uplink BWP, and the second BWP is a second uplink BWP. This is not limited. When the second BWP is a downlink BWP, the minimum slot offset of the second BWP is a minimum value of K0 of the downlink BWP. When the second BWP is an uplink BWP, the minimum slot offset of the second BWP is a minimum value of K2 of the uplink BWP.

For example, that the terminal determines a minimum slot offset of the second BWP based on a minimum slot offset of the first BWP, numerology of the first BWP, and numerology of the second BWP may include. The terminal determines the minimum slot offset of the second BWP based on the minimum slot offset of the first BWP and a first coefficient. For example, the terminal may determine a product of the minimum slot offset of the first BWP and the first coefficient as the minimum slot offset of the second BWP.

The first coefficient is determined based on the numerology of the second BWP and the numerology of the first BWP. The first coefficient is equal to $$\frac{2^{\mu_2}}{2^{\mu_1}},$$

where $\mu_2$ is the numerology of the second BWP, and $\mu_1$ is the numerology of the first BWP.

Specifically, when the network device indicates the terminal to switch from the first downlink BWP to the second downlink BWP, a minimum value of K0 changes, and a new minimum value of K0 may be $$K0_{min,new} = \left\lceil K0_{min,old} \cdot \frac{2^{\mu_{DL,new}}}{2^{\mu_{DL,old}}} \right\rceil \cdot K0_{min,new}$$

is the new minimum value of K0, $K0_{min,old}$ is an applicable minimum value of K0 when the terminal receives the switching indication, $2^{\mu_{DL,new}}$ is numerology of the second downlink BWP, and $2^{\mu_{DL,old}}$ is numerology of the first downlink BWP.

When the network device indicates the terminal to switch from the first uplink BWP to the second uplink BWP, a minimum value of K2 changes, and a new minimum value of K2 may be $$K2_{min,new} = \left\lceil K2_{min,old} \cdot \frac{2^{\mu_{UL,new}}}{2^{\mu_{UL,old}}} \right\rceil \cdot K2_{min,new}$$

is the new minimum value of K2, $K2_{min,old}$ is an applicable minimum value of K2 when the terminal receives the switching indication, $2^{\mu_{UL,new}}$ is numerology of the second uplink BWP, and $2^{\mu_{UL,old}}$ is numerology of the first uplink BWP.

For example, if the network device indicates the terminal to switch from the first downlink BWP to the second downlink BWP, the numerology of the first downlink BWP is 1, the numerology of the second downlink BWP is 0, and the minimum slot offset is K0=2, the minimum slot offset of the second downlink BWP is $$2 \times \frac{2^0}{2^1} = 1$$

slots.

For another example, if the network device indicates the terminal to switch from the first uplink BWP to the second uplink BWP, the numerology of the first uplink BWP is 0, the numerology of the second uplink BWP is 1, and the minimum slot offset is K2=2, the minimum slot offset of the second uplink BWP is $$2 \times \frac{2^1}{2^0} = 4$$

slots.

The foregoing mainly describes the solutions provided in the embodiments of this application from a perspective of interaction between nodes. It may be understood that to implement the foregoing functions, the nodes, such as the terminal and the network device, include a corresponding hardware structure and/or software module for performing each function. A person of ordinary skill in the art should easily be aware that, in combination with the examples described in the embodiments disclosed in this specification, algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, division into the functional modules may be performed on the first device and the second device based on the foregoing method example. For example, each functional module may be obtained through division based on a corresponding function, or two or more functions may be integrated into one processing module. The integrated module may be implemented in a form of hardware, or may be implemented in a form of a software functional module. It should be noted that, in the embodiments of this application, division into modules is an example, and is merely a logical function division. In actual implementation, another division manner may be used.

Figure 12:
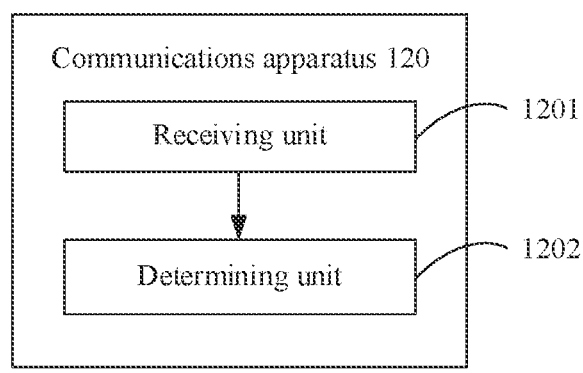
FIG. 12 is a schematic composition diagram of a communications apparatus 120 according to an embodiment of this application.

FIG. 12 is a structural diagram of a communications apparatus 120. The communications apparatus 120 may be a terminal, a chip in a terminal, or a system-on-a-chip. The communications apparatus 120 may be configured to perform functions of the terminal in the foregoing embodiments. In a possible implementation, the communications apparatus 120 shown in FIG. 12 includes a receiving unit 1201 and a determining unit 1202.

The receiving unit 1201 is configured to receive a switching indication sent by a network device and used to indicate a terminal to switch from a first scheduling mode to a second scheduling mode. For example, the receiving unit 1201 is configured to support the communications apparatus 120 in performing step 501.

The determining unit 1202 is configured to determine application time of the second scheduling mode. For example, the determining unit 1202 is configured to support the communications apparatus 120 in performing step 502.

Specifically, the application time of the second scheduling mode may be determined with reference to Manner 1 to Manner 7 described in the foregoing method embodiment. Details are not described again. Alternatively, when a BWP of the terminal is switched, the determining unit 1202 may determine the application time of the second scheduling mode with reference to Case 1 to Case 5. Details are not described again.

In another possible design, the receiving unit 1201 is configured to receive minimum slot offset indication information sent by a network device. The minimum slot offset indication information is used to indicate a minimum slot offset of a target BWP.

The determining unit 1202 is configured to determine, by the terminal, the minimum slot offset of the target BWP based on the minimum slot offset indication information and numerology of the target BWP. The minimum slot offset of the target BWP is based on the numerology of the target BWP.

In this way, the network device may indicate the minimum slot offset of the BWP to the terminal, so that the terminal schedules a data channel based on the indication of the network device. Specifically, for several possible designs of the minimum slot offset indication information, refer to the descriptions in the foregoing method embodiment. Details are not described again.

In yet another possible design, in a scenario in which a BWP of a terminal is switched, where numerology of a BWP used before switching is different from numerology of a BWP used after switching, but a scheduling mode of the terminal is not switched, the receiving unit 1201 is configured to receive a switching indication sent by a network device. The switching indication is used to indicate to switch the terminal from a first BWP to a second BWP.

The determining unit 1202 is configured to determine a minimum slot offset of the second BWP based on a minimum slot offset of the first BWP, numerology of the first BWP, and numerology of the second BWP.

Specifically, for a detailed process of the yet another possible design, refer to the description in the foregoing method embodiment. Details are not described again.

In still another possible implementation, the communications apparatus 120 shown in FIG. 12 includes a processing module and a communications module. The processing module is configured to control and manage an action of the communications apparatus 120. For example, the processing module may integrate a function of the determining unit 1202, and may be configured to support the communications apparatus 120 in performing step 502 and another process of the technology described in this specification. The communications module may integrate a function of the receiving unit 1201, and may be configured to support the communications apparatus 120 in performing step 501 and communicating with another network entity, for example, communicating with a functional module or a network entity shown in FIG. 2. The communications apparatus 120 may further include a storage module, configured to store program code and data that are of the communications apparatus 120.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like.

The storage module may be a memory. When the processing module is the processor, the communications module is the communications interface, and the storage module is the memory, the communications apparatus 120 in this embodiment of this application may be the communications apparatus shown in FIG. 4.

Figure 13:
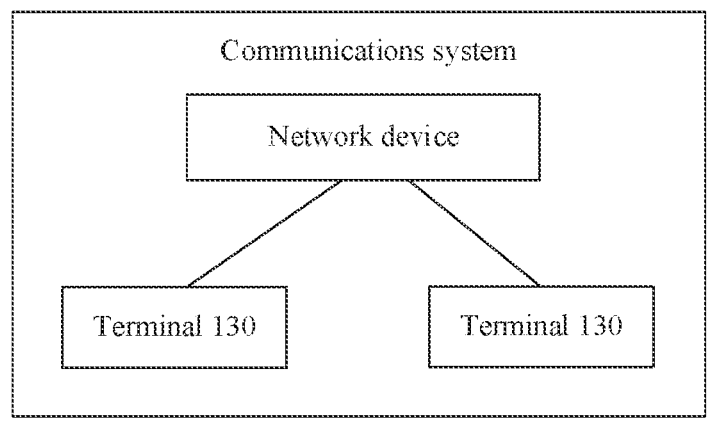
FIG. 13 is a schematic composition diagram of a scheduling switching system according to an embodiment of this application.

FIG. 13 is a structural diagram of a scheduling switching system according to an embodiment of this application. As shown in FIG. 13, the communications system may include a plurality of terminals 130 and a network device.

A function of the terminal 130 is similar to a function of the communications apparatus 120 shown in FIG. 12. The terminal 130 may be configured to receive a switching indication sent by a network device and used to indicate the terminal 130 to switch from a first scheduling mode to a second scheduling mode, and determine application time of the second scheduling mode.

The terminal 130 may determine the application time of the second scheduling mode with reference to the foregoing Manner 1 to Manner 7. Details are not described again. Alternatively, when a BWP of the terminal is switched, the terminal 130 may determine the application time of the second scheduling mode with reference to Case 1 to Case 5. Details are not described again.

In still another possible design, the terminal 130 is configured to: receive minimum slot offset indication information sent by a network device, where the minimum slot offset indication information is used to indicate a minimum slot offset of a target BWP; and determine the minimum slot offset of the target BWP based on the minimum slot offset indication information and numerology of the target BWP, where the minimum slot offset of the target BWP is based on the numerology of the target BWP.

In this way, the network device may indicate the minimum slot offset of the BWP to the terminal, so that the terminal schedules a data channel based on the indication of the network device. Specifically, for several possible designs of the minimum slot offset indication information, refer to the descriptions in the foregoing method embodiment. Details are not described again.

In yet another possible design, in a scenario in which a BWP of the terminal is switched, where numerology of a BWP used before switching is different from numerology of a BWP used after switching, but a scheduling mode of the terminal is not switched, the terminal 130 is configured to: receive a switching indication sent by a network device, where the switching indication is used to indicate to switch the terminal from a first BWP to a second BWP; and determine a minimum slot offset of the second BWP based on a minimum slot offset of the first BWP, numerology of the first BWP, and numerology of the second BWP Specifically, for a detailed process of the yet another possible design, refer to the description in the foregoing method embodiment. Details are not described again.

It should be noted that all related content of the steps in the foregoing method embodiment may be cited in function descriptions of the corresponding functional entities in the embodiment shown in FIG. 5. Details are not described herein again.

In the communications system shown in FIG. 13, the terminal 130 may receive, from the network device, the switching indication used to indicate the terminal to switch from the first scheduling mode to the second scheduling mode, and clarify the application time of the switched scheduling mode after receiving the switching indication, so that the terminal 130 schedules a data channel and/or triggers a reference signal by using the second scheduling mode when the application time of the second scheduling mode arrives. Particularly, when the second scheduling mode is cross-slot scheduling, the terminal 130 disables a radio frequency module of the terminal to enter a power saving state.

The foregoing descriptions about implementations allow a person skilled in the art to understand that, for the purpose of convenient and brief description, division into the foregoing functional modules is taken as an example for illustration. In actual application, the foregoing functions can be allocated to different functional modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A scheduling switching method implemented by a terminal, wherein the scheduling switching method comprises:
   receiving, from a network device, a switching indication indicating the terminal to switch from a first scheduling mode to a second scheduling mode, wherein the first scheduling mode is different from the second scheduling mode; and
   determining an application time of the second scheduling mode,
   wherein the application time is when the terminal can schedule a first data channel or trigger a first reference signal using the second scheduling mode,
   wherein the switching indication is received via a first physical downlink control channel (PDCCH), wherein the first PDCCH is associated with an $N^{th}$ slot, wherein N is an integer, and wherein the application time is an $(N+M)^{th}$ slot,
   wherein M is based on an applicable minimum value of a slot offset when the terminal receives the switching indication, wherein the slot offset is between a slot associated with a second PDCCH for scheduling a second data channel and a slot associated with the second data channel, wherein M is a maximum value of a second value and the applicable minimum value, and wherein the second value is related to a subcarrier spacing configured for the terminal.

2. The scheduling switching method of claim 1, wherein the second value is 1.

3. The scheduling switching method of claim 1, wherein the first scheduling mode or the second scheduling mode is indicated in at least one of an applicable minimum value of K0, an applicable minimum value of K2, or an applicable minimum value of an aperiodic channel state information reference signal (CSI-RS) triggering offset.

4. The scheduling switching method of claim 1, wherein the switching indication comprises an index indicating the second scheduling mode.

5. The scheduling switching method of claim 4, wherein the index corresponds to a minimum value of K0 or a minimum value of K2.

6. The scheduling switching method of claim 1, wherein the PDCCH is for further scheduling a second reference signal, wherein the second data channel is a downlink data channel or an uplink data channel, and wherein the second reference signal is a channel state information reference signal (CSI-RS).

7. A communications apparatus comprising:
   a processor; and
   a memory coupled to the processor and configured to store programming instructions that, when executed by the processor, cause the communications apparatus to:
   receive, from a network device, a switching indication indicating the communications apparatus to switch from a first scheduling mode to a second scheduling mode, wherein the first scheduling mode is different from the second scheduling mode; and
   determine an application time of the second scheduling mode,
   wherein the application time is when the communications apparatus can schedule a first data channel or trigger a first reference signal using the second scheduling mode,
   wherein the switching indication is received via a first physical downlink control channel (PDCCH), wherein the first PDCCH is associated with an $N^{th}$ slot, wherein N is an integer, wherein the application time is an $(N+M)^{th}$ slot, wherein M is based on an applicable minimum value of a slot offset when the communications apparatus receives the switching indication, wherein the slot offset is between a slot associated with a second PDCCH for scheduling a second data channel and a slot associated with the second data channel, wherein M is a maximum value of a second value and the applicable minimum value, and wherein the second value is related to a subcarrier spacing configured for the communications apparatus.

8. The communications apparatus of claim 7, wherein the second value is 1.

9. The communications apparatus of claim 7, wherein the first scheduling mode or the second scheduling mode is indicated in at least one of an applicable minimum value of K0, an applicable minimum value of K2, or an applicable minimum value of an aperiodic channel state information reference signal (CSI-RS) triggering offset.

10. The communications apparatus of claim 7, wherein the switching indication comprises an index indicating the second scheduling mode.

11. The communications apparatus of claim 10, wherein the index corresponds to a minimum value of K0 or a minimum value of K2.

12. The communications apparatus of claim 7, wherein the PDCCH for further scheduling a second reference signal, wherein the second data channel is a downlink data channel or an uplink data channel, and wherein the second reference signal is a channel state information reference signal (CSI-RS).

13. A computer program product comprising computer-executable instructions that are stored on a non-transitory computer readable medium and that, when executed by a processor of a communications apparatus, cause the communications apparatus to:

receive, from a network device, a switching indication indicating the communications apparatus to switch from a first scheduling mode to a second scheduling mode, wherein the first scheduling mode is different from the second scheduling mode; and determine an application time of the second scheduling mode, wherein the application time is when the communications apparatus can schedule a first data channel or trigger a first reference signal using the second scheduling mode, wherein the switching indication is received via a first physical downlink control channel (PDCCH), wherein the first PDCCH is associated with an $N^{th}$ slot, wherein N is an integer, wherein the application time is an $(N+M)^{th}$ slot, wherein M is based on an applicable minimum value of a slot offset when the communications apparatus receives the switching indication, wherein the slot offset is between a slot associated with a second PDCCH for scheduling a second data channel and a slot associated with the second data channel, wherein M is a maximum value of a second value and the applicable minimum value, and wherein the second value is related to a subcarrier spacing configured for the communications apparatus.

14. The computer program product of claim 13, wherein the second value is 1.

* * * * *

UNITED STATES PATENT AND TRADEMARK OFFICE
CERTIFICATE OF CORRECTION

| | | |
|---|---|---|
| PATENT NO. | : 12,356,399 B2 | Page 1 of 1 |
| APPLICATION NO. | : 17/607682 | |
| DATED | : July 8, 2025 | |
| INVENTOR(S) | : Yifan Xue, Jian Wang and Wenwen Huang | |

It is certified that error appears in the above-identified patent and that said Letters Patent is hereby corrected as shown below:

On the Title Page

Page 2, Item (56) References Cited, Other Publications: "EGPP TS 25.331 V15.4.0, Sep.2018," should read "3GPP TS 25.331 V15.4.0, Sep.2018,"

In the Claims

Claim 1, Column 70, Line 19: "integer, and wherein the" should read "integer, wherein the"

Signed and Sealed this
Fifth Day of August, 2025

Coke Morgan Stewart
*Acting Director of the United States Patent and Trademark Office*